Mar. 27, 1923.
J. S. BANCROFT ET AL.
TYPOGRAPHIC COMPOSING MACHINE.
ORIGINAL FILED MAR. 26, 1917.
1,449,489.
28 SHEETS—SHEET 24.
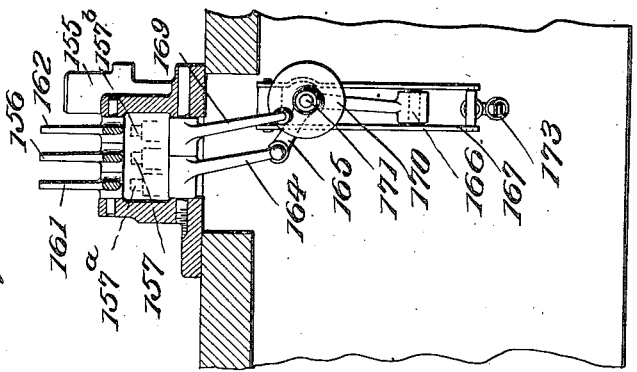
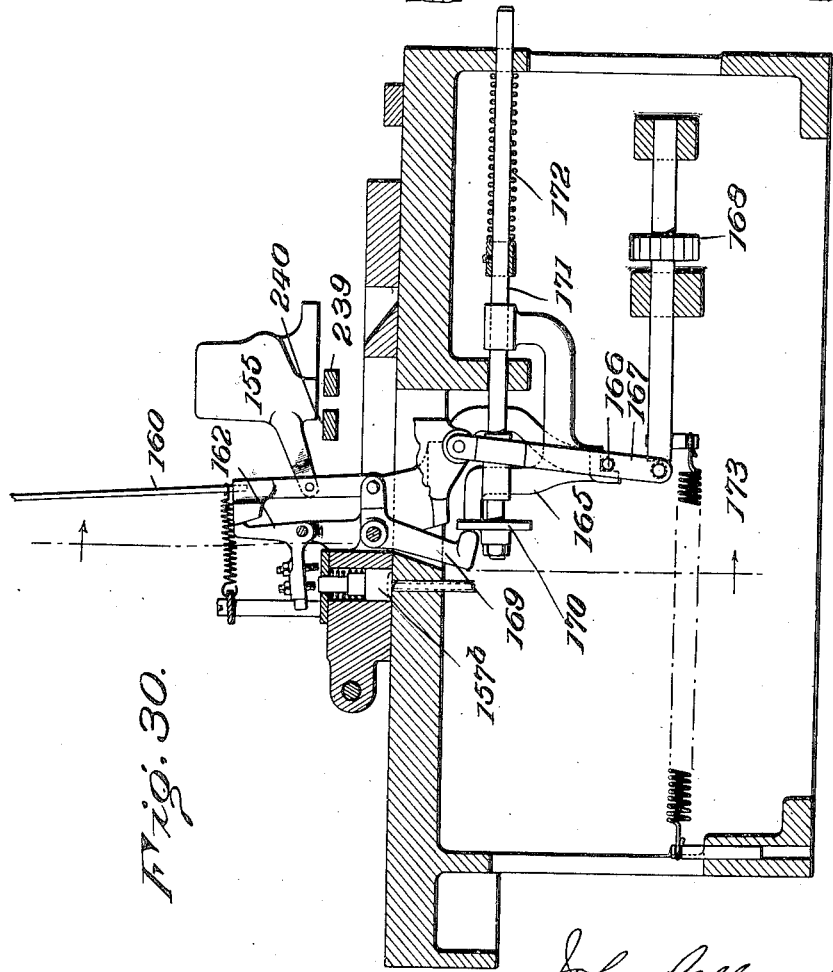

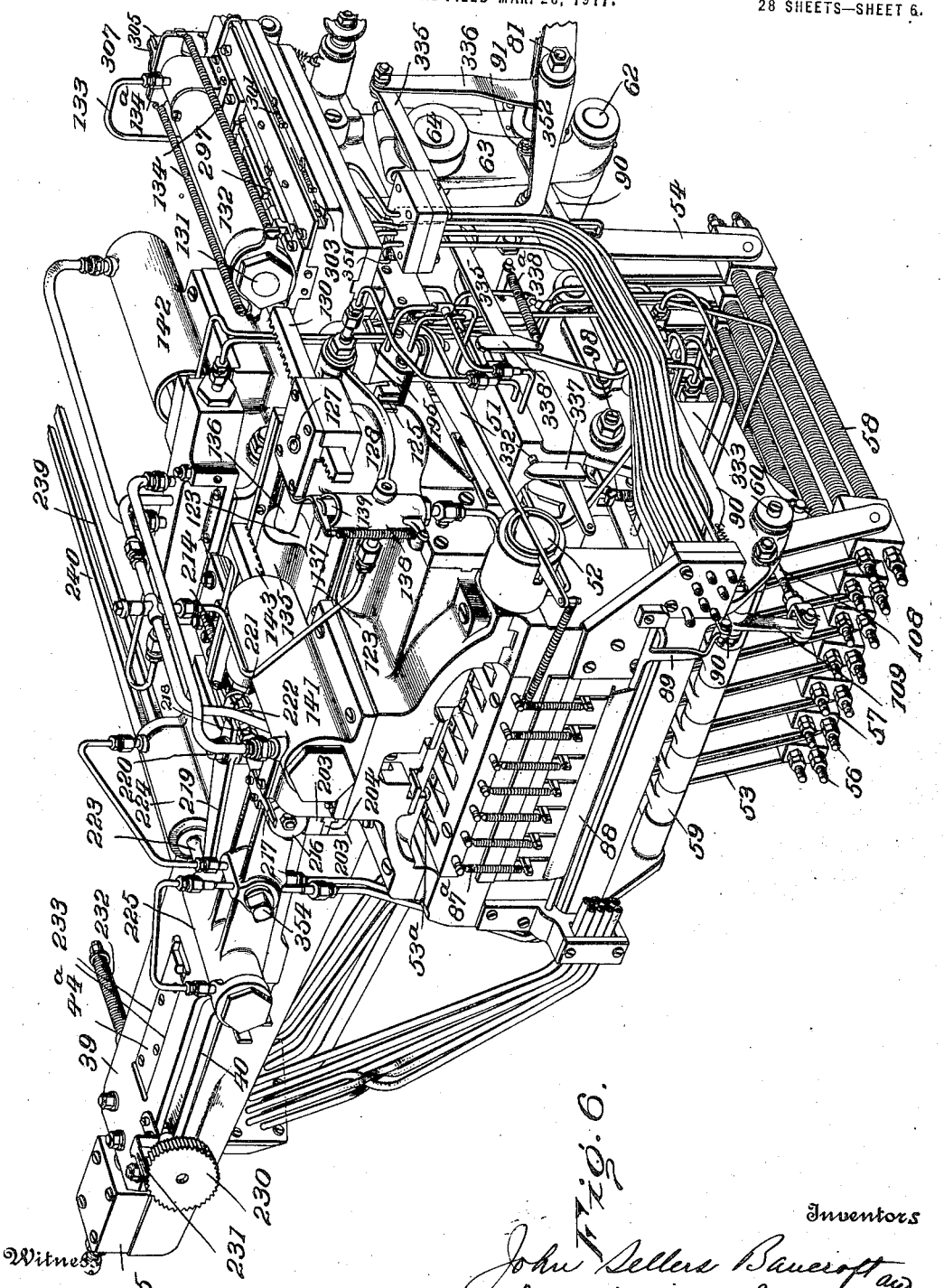

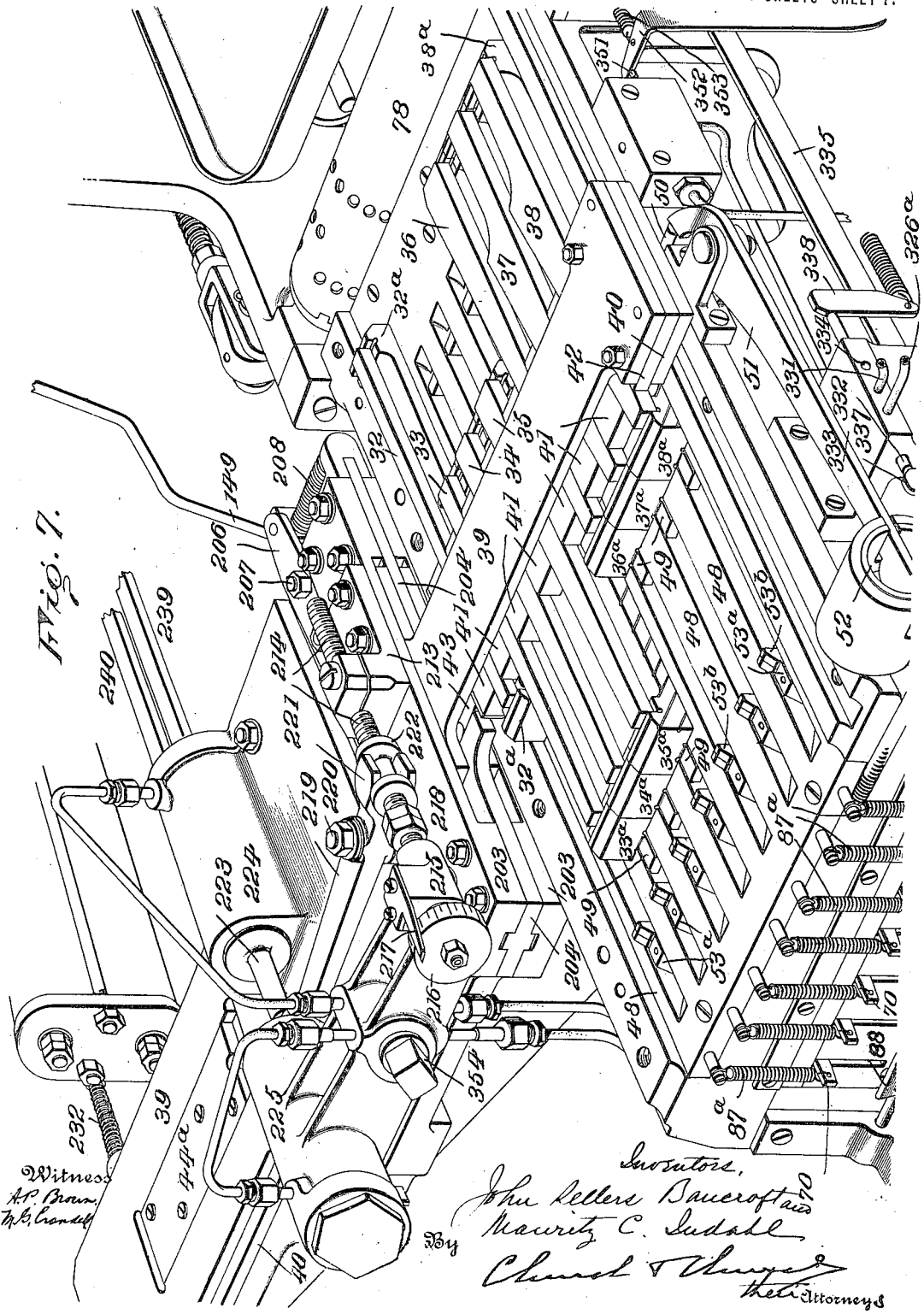

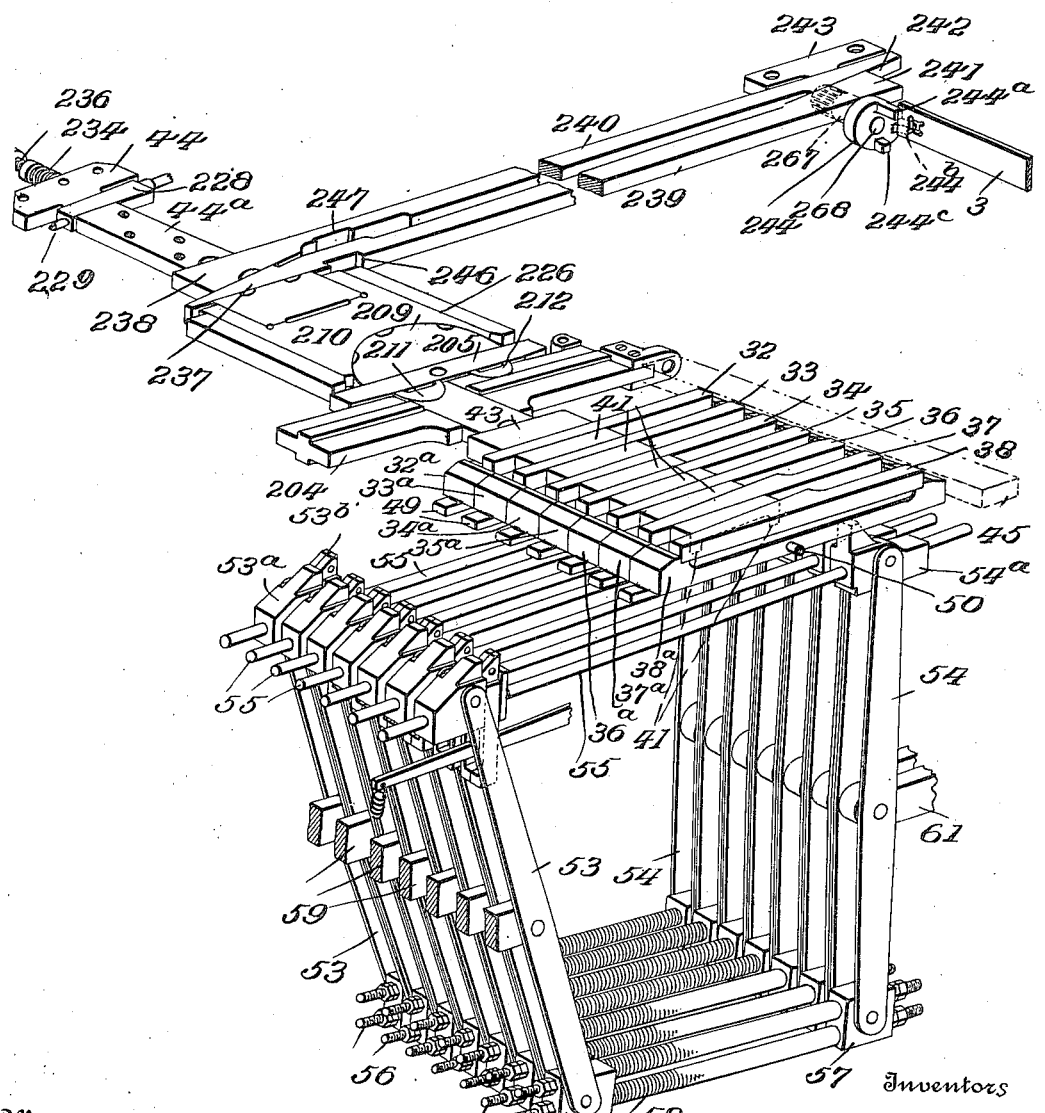

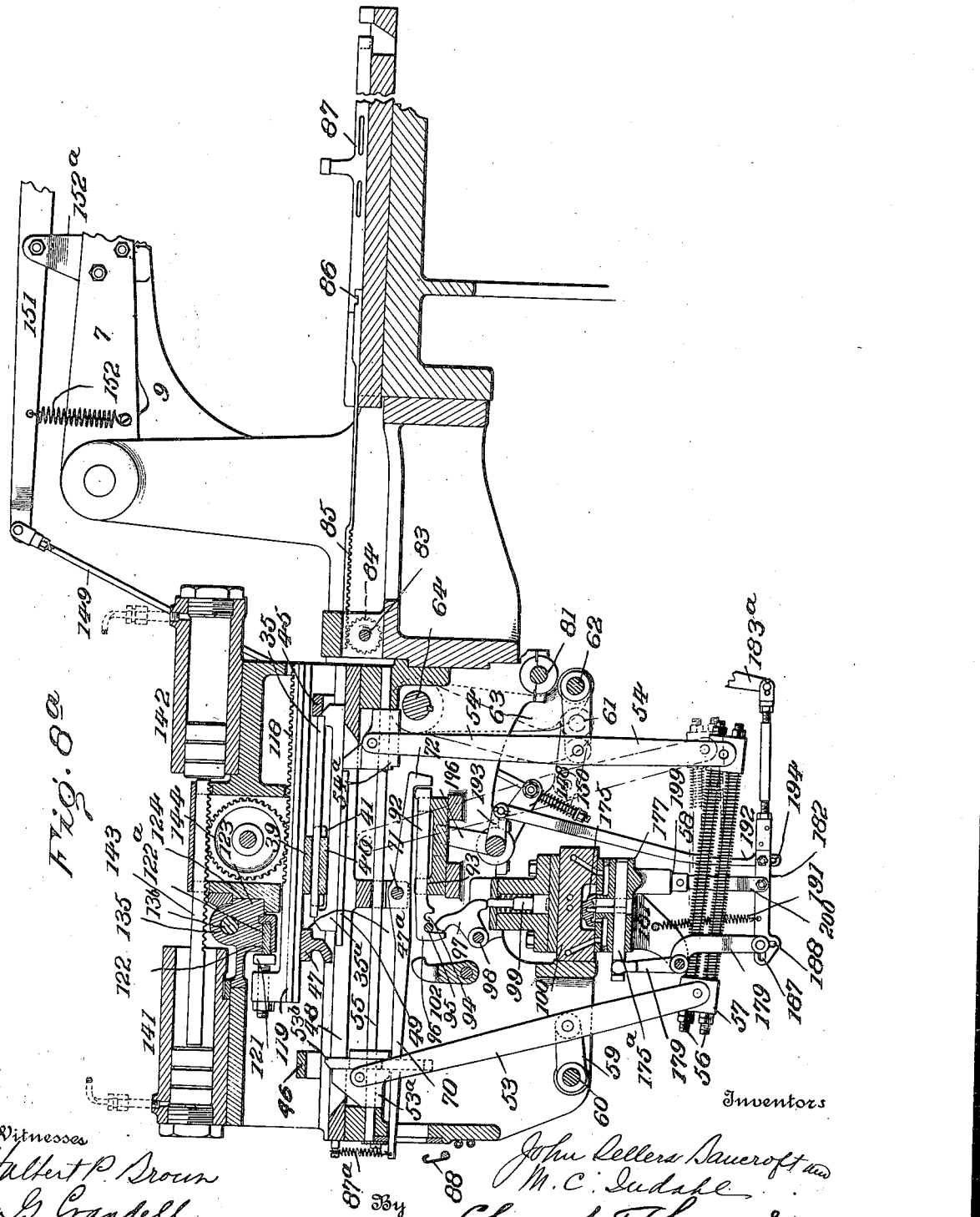

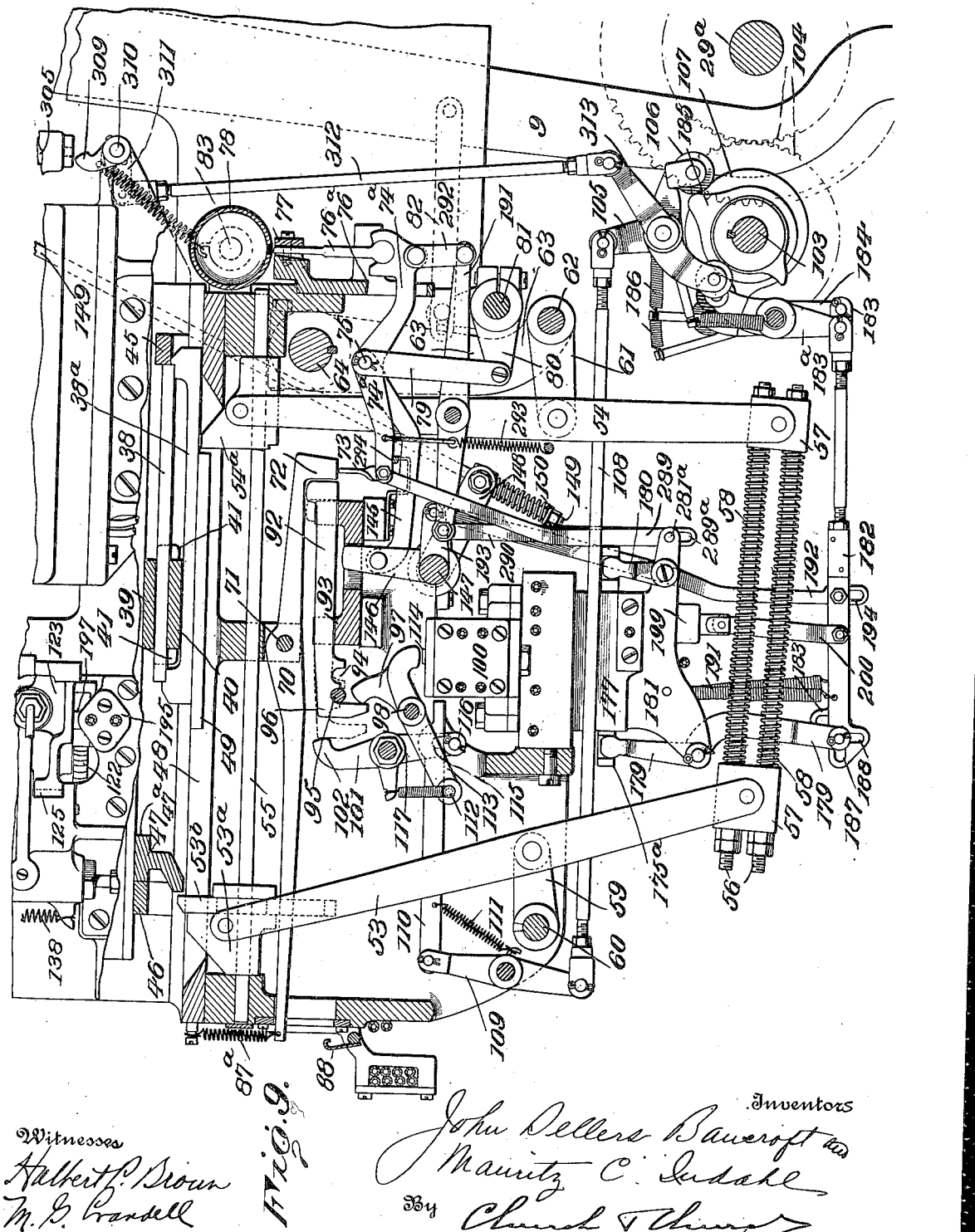

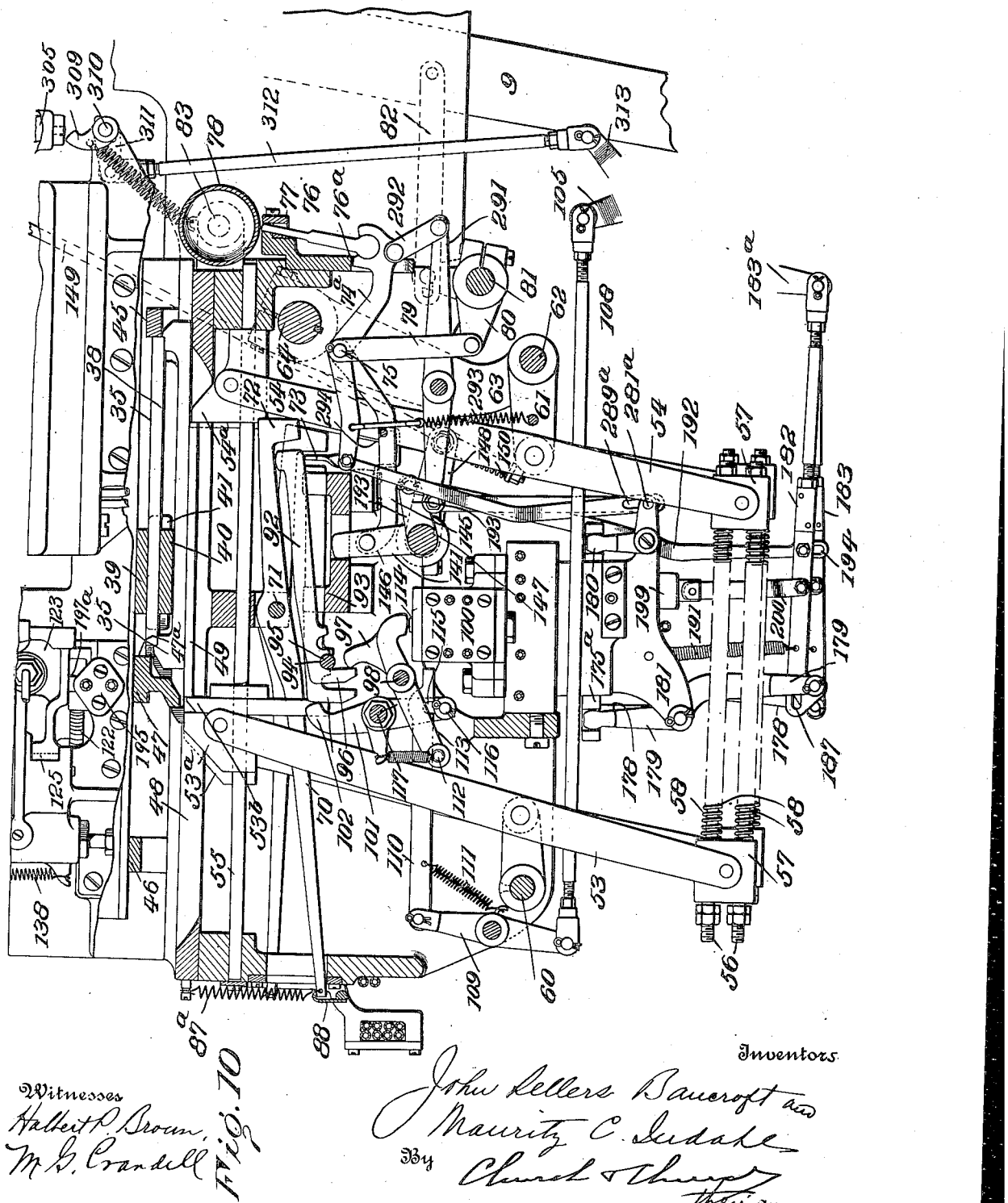

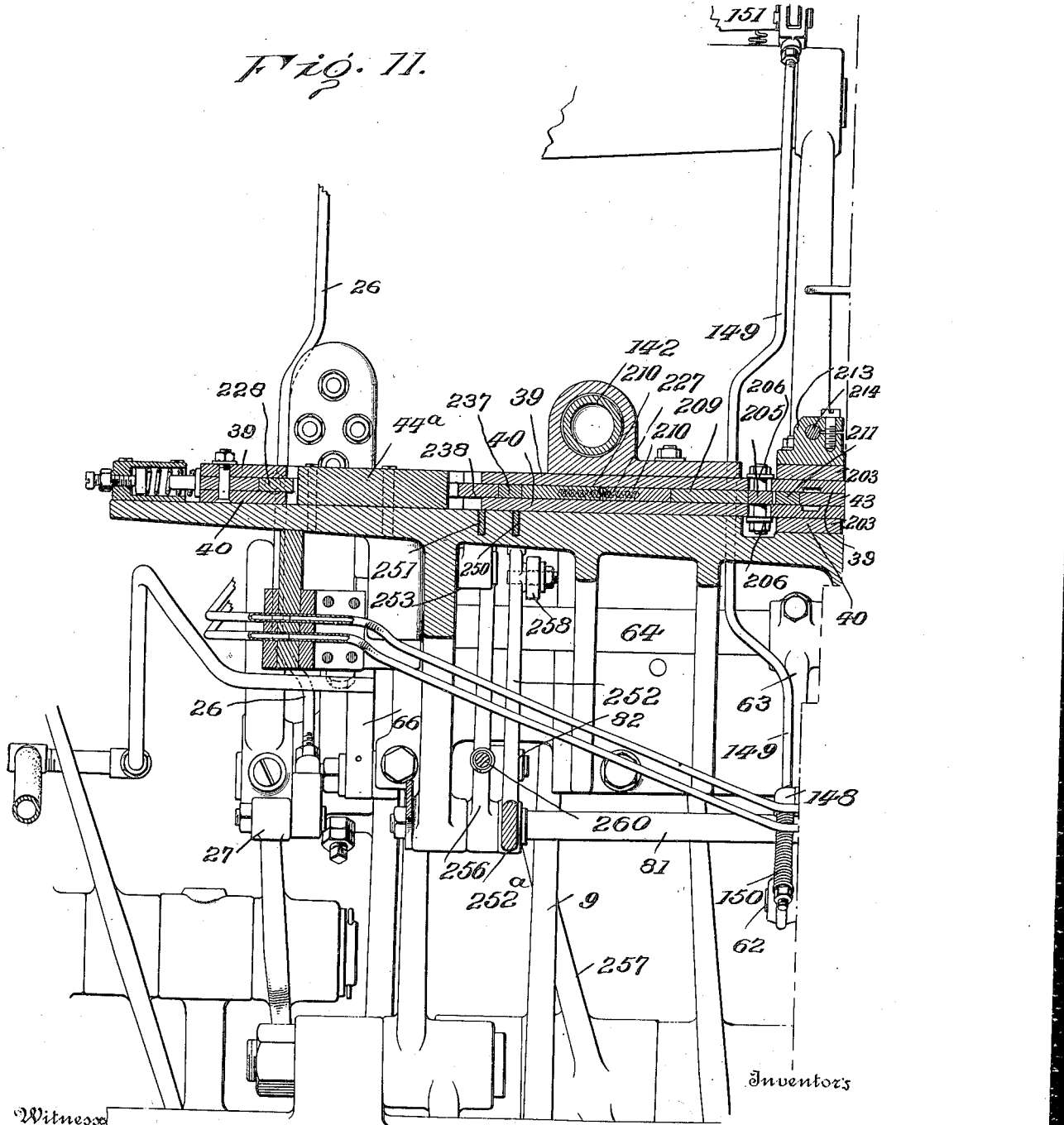

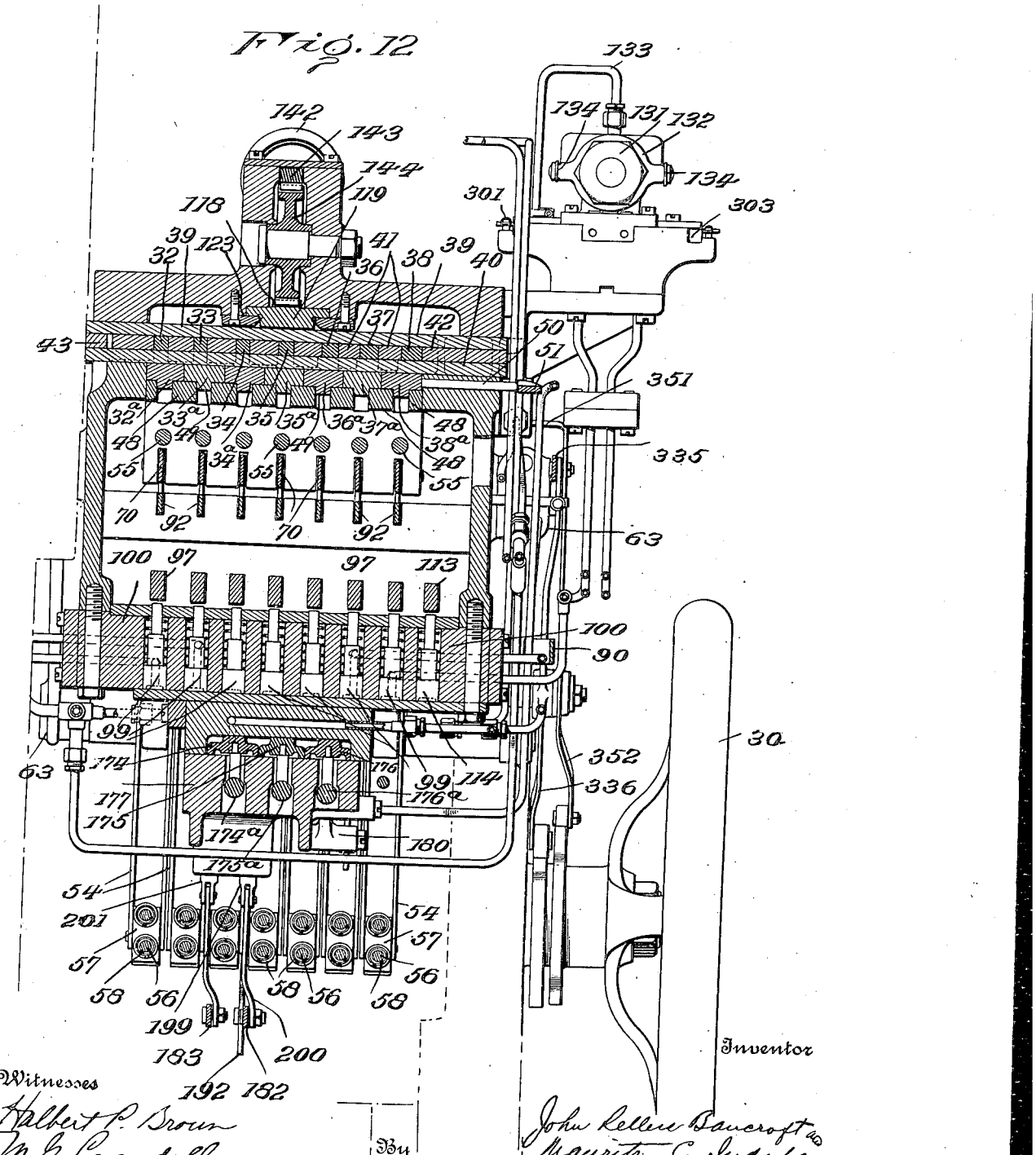

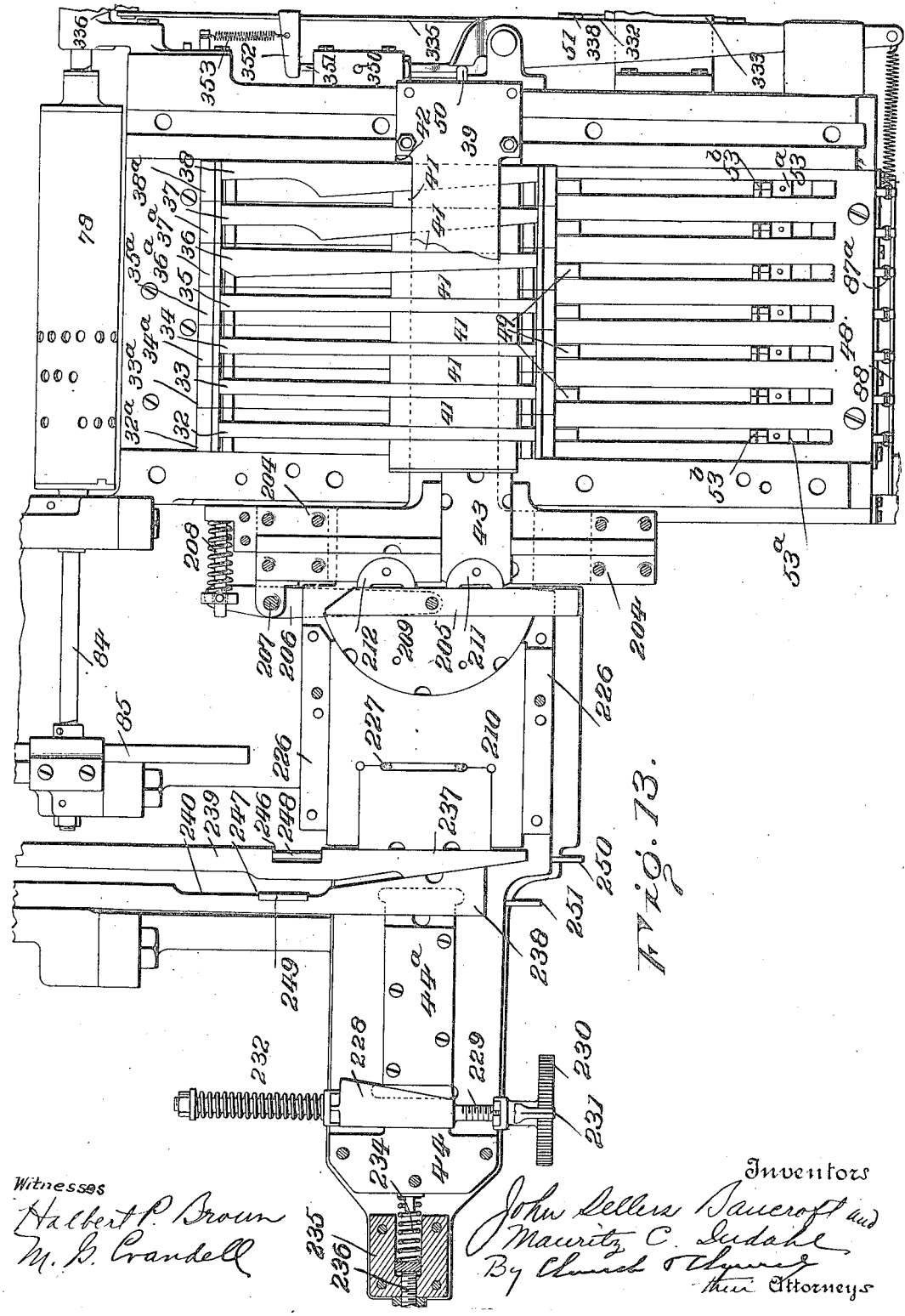

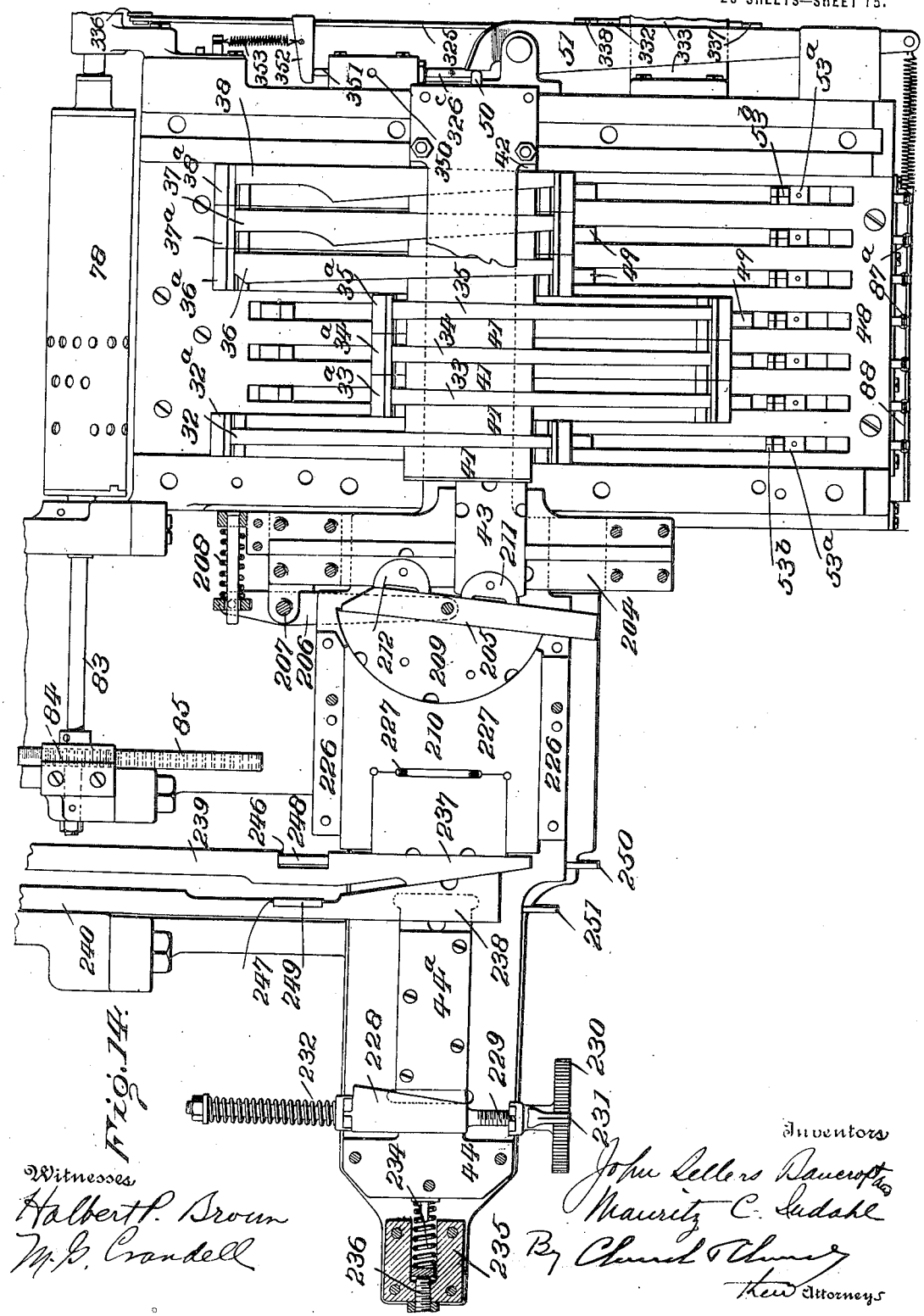

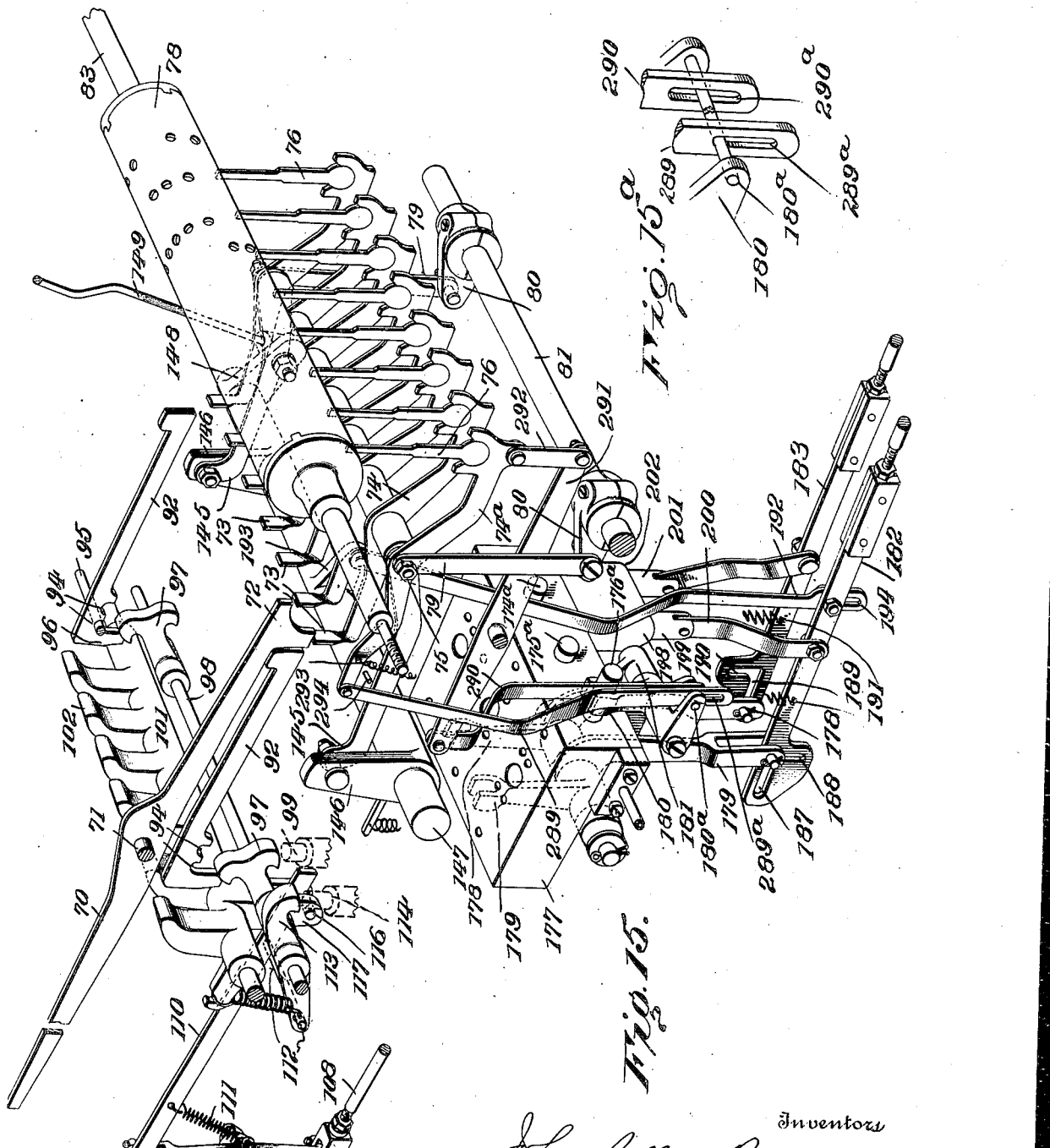

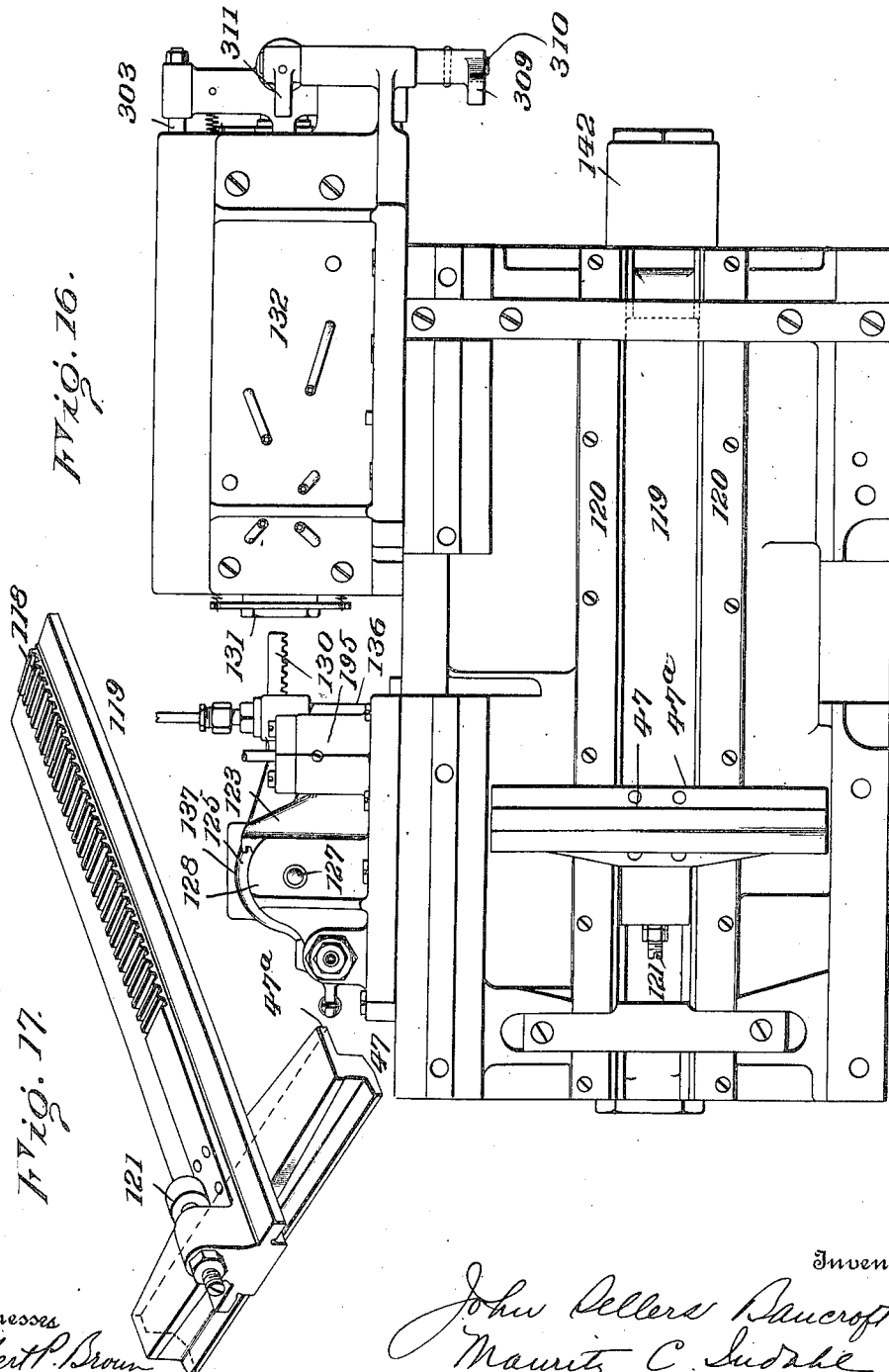

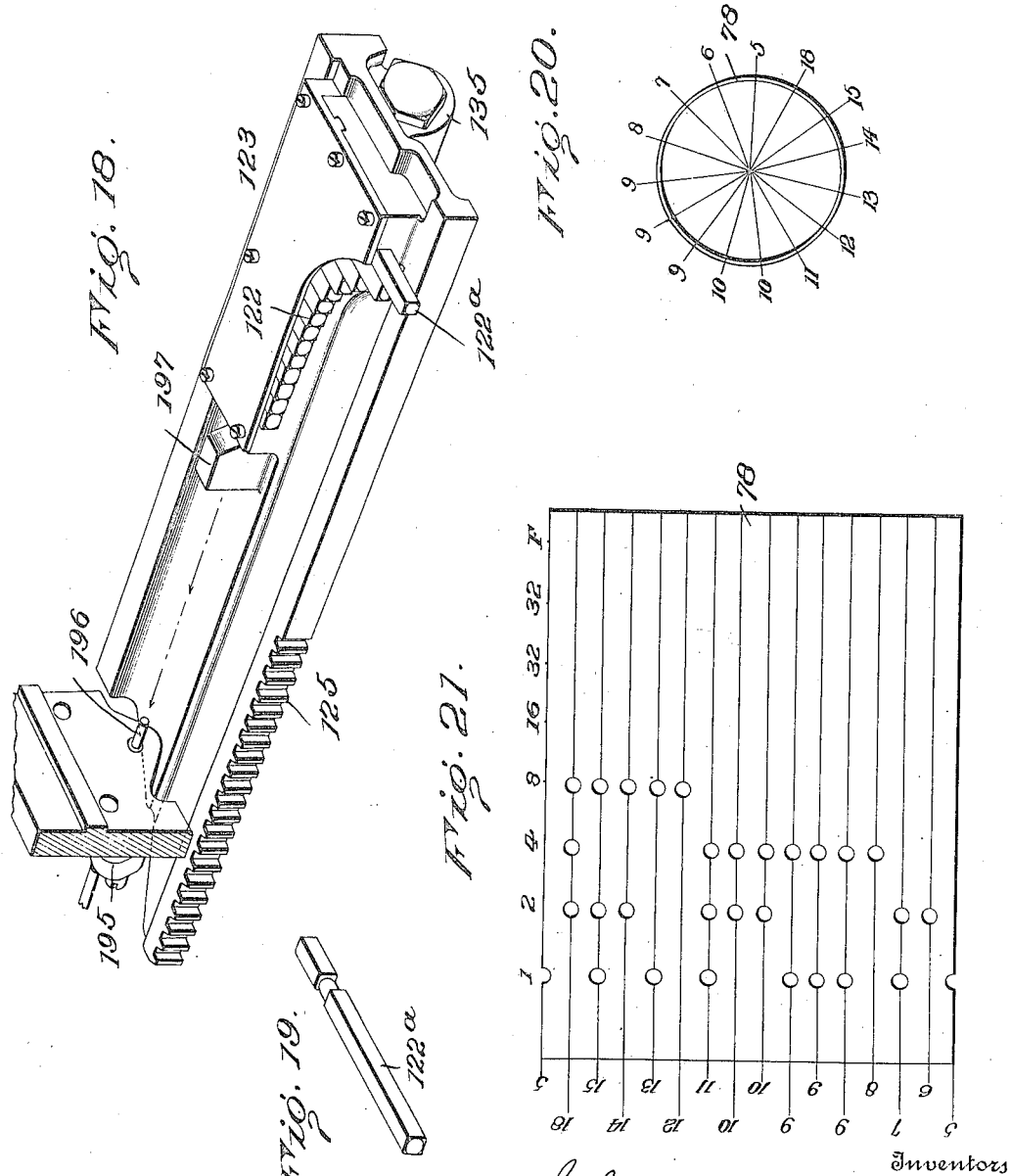

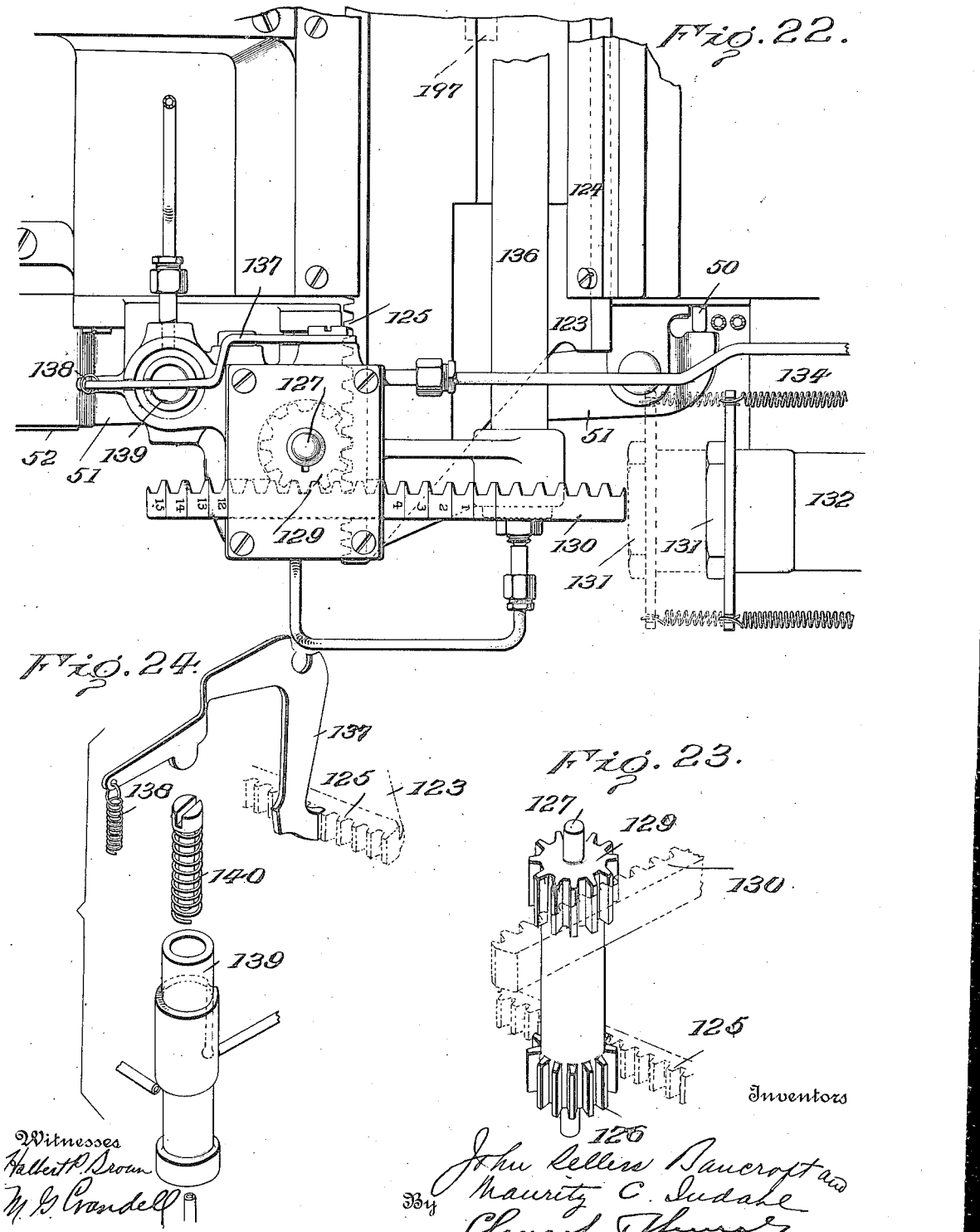

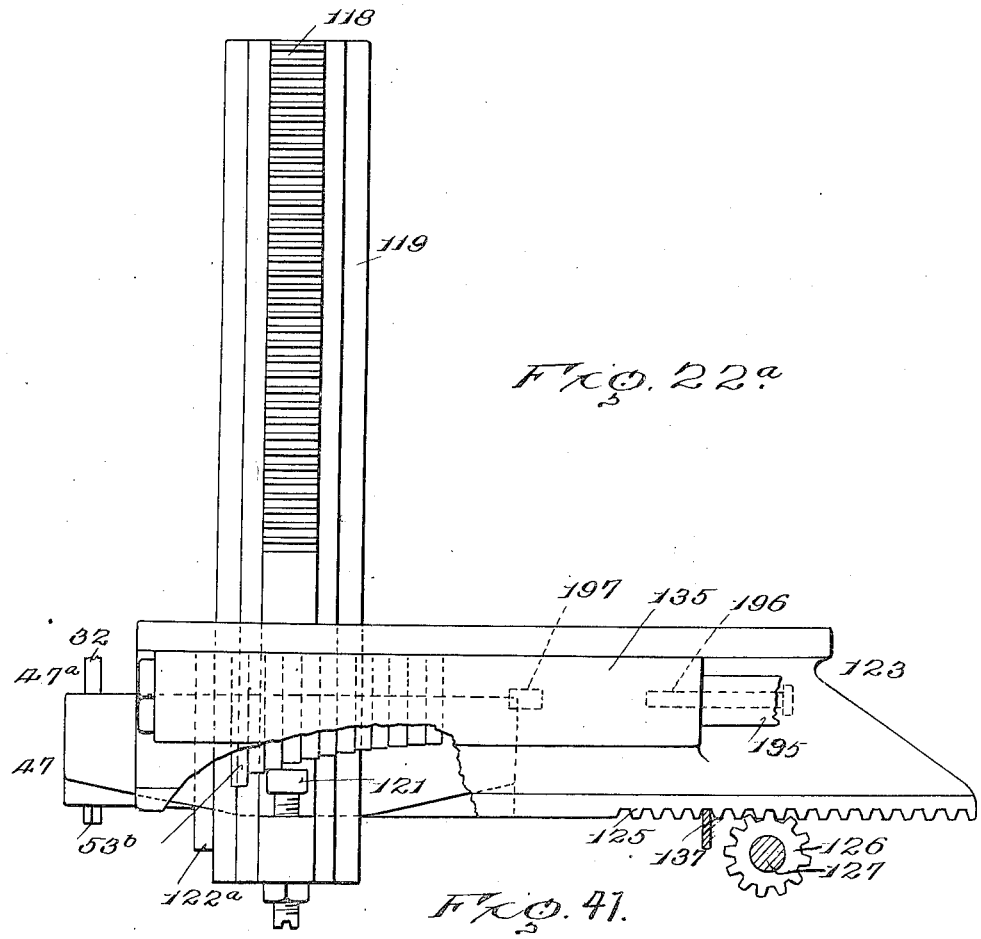
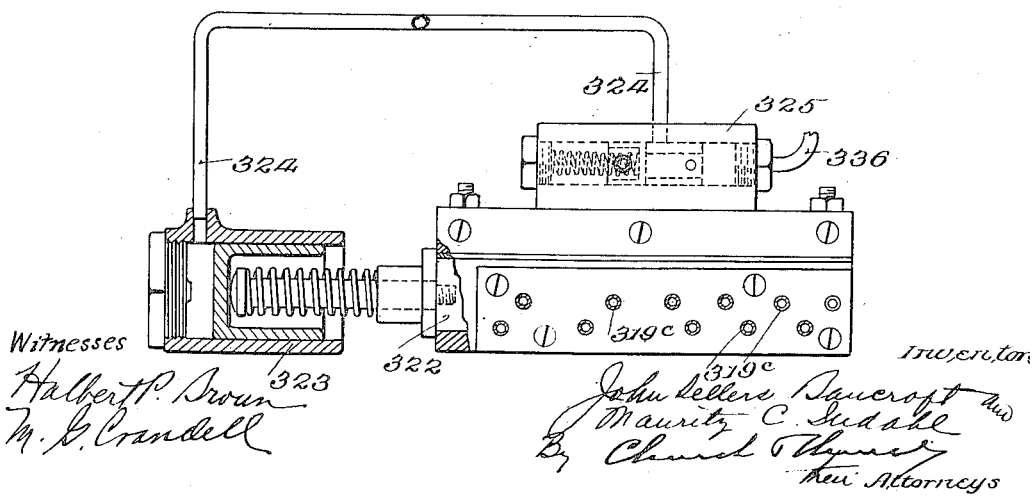

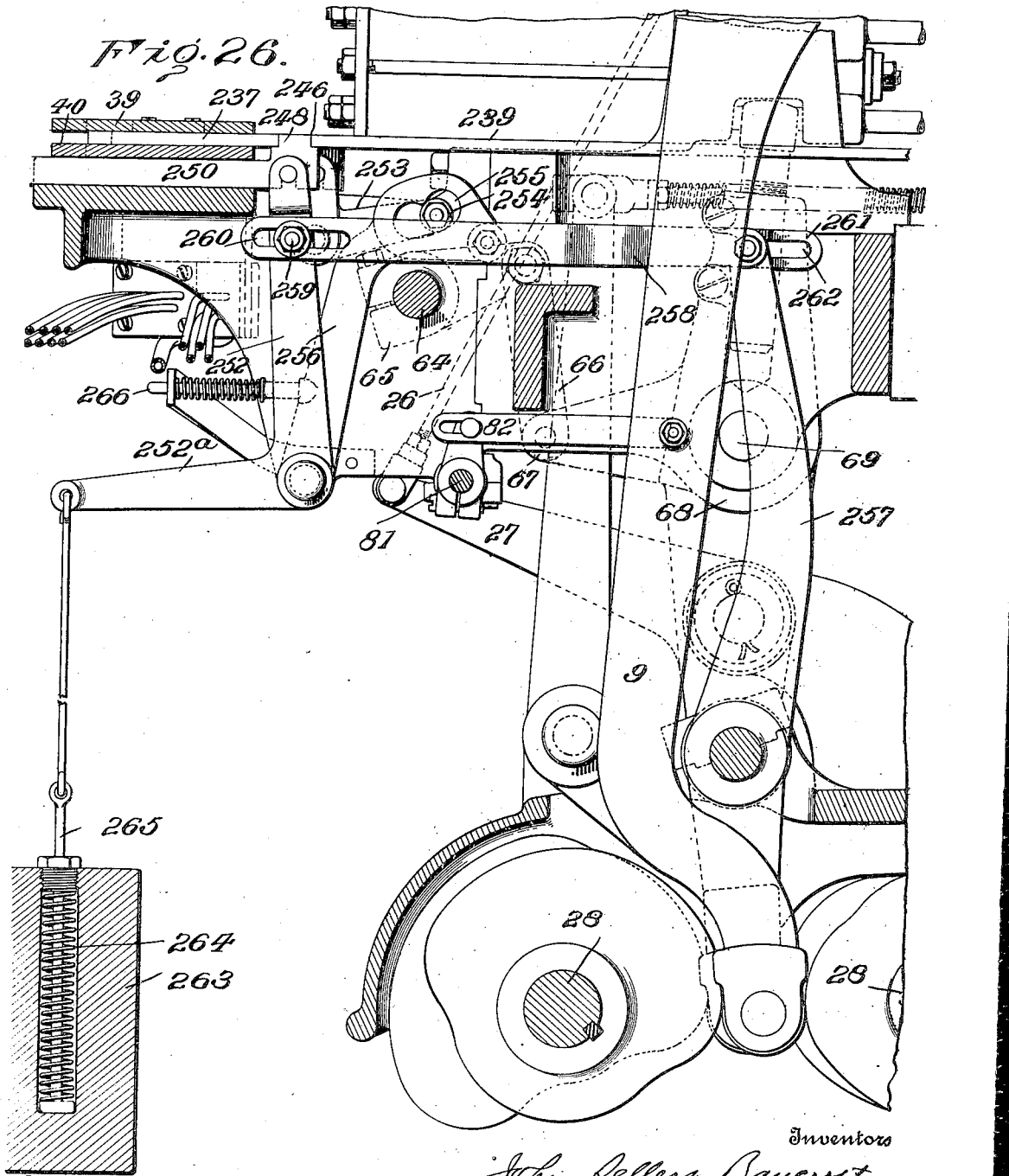

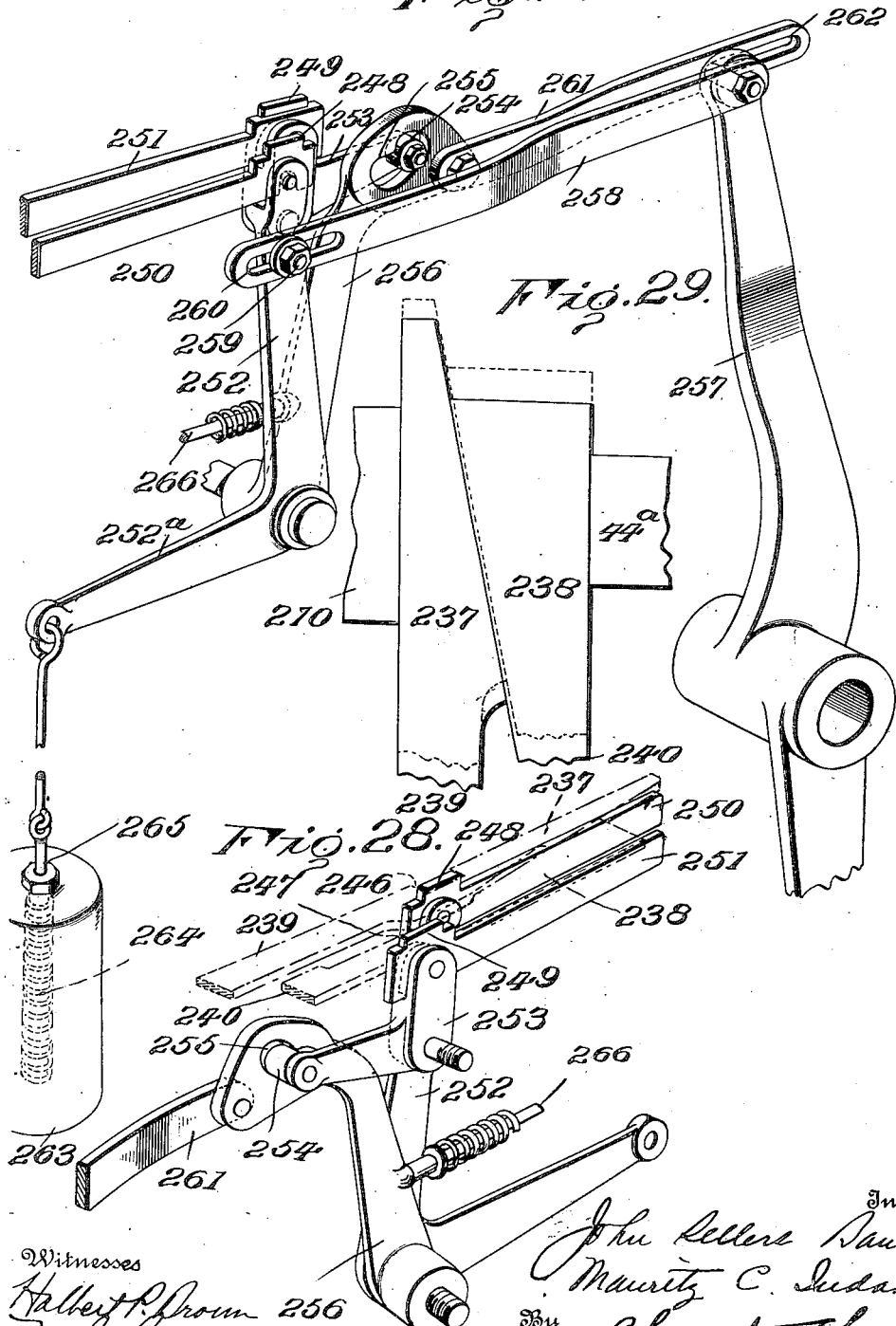

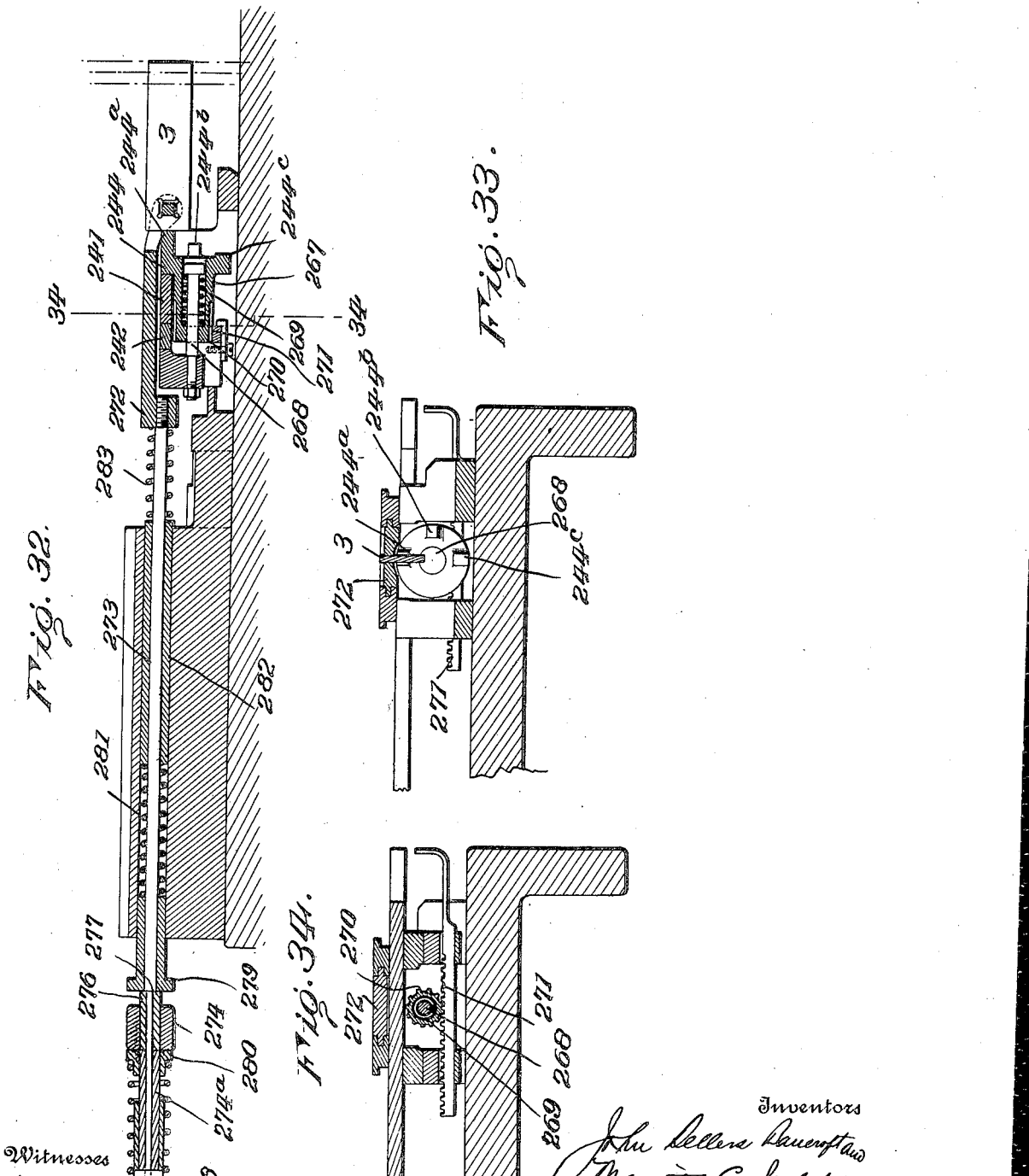

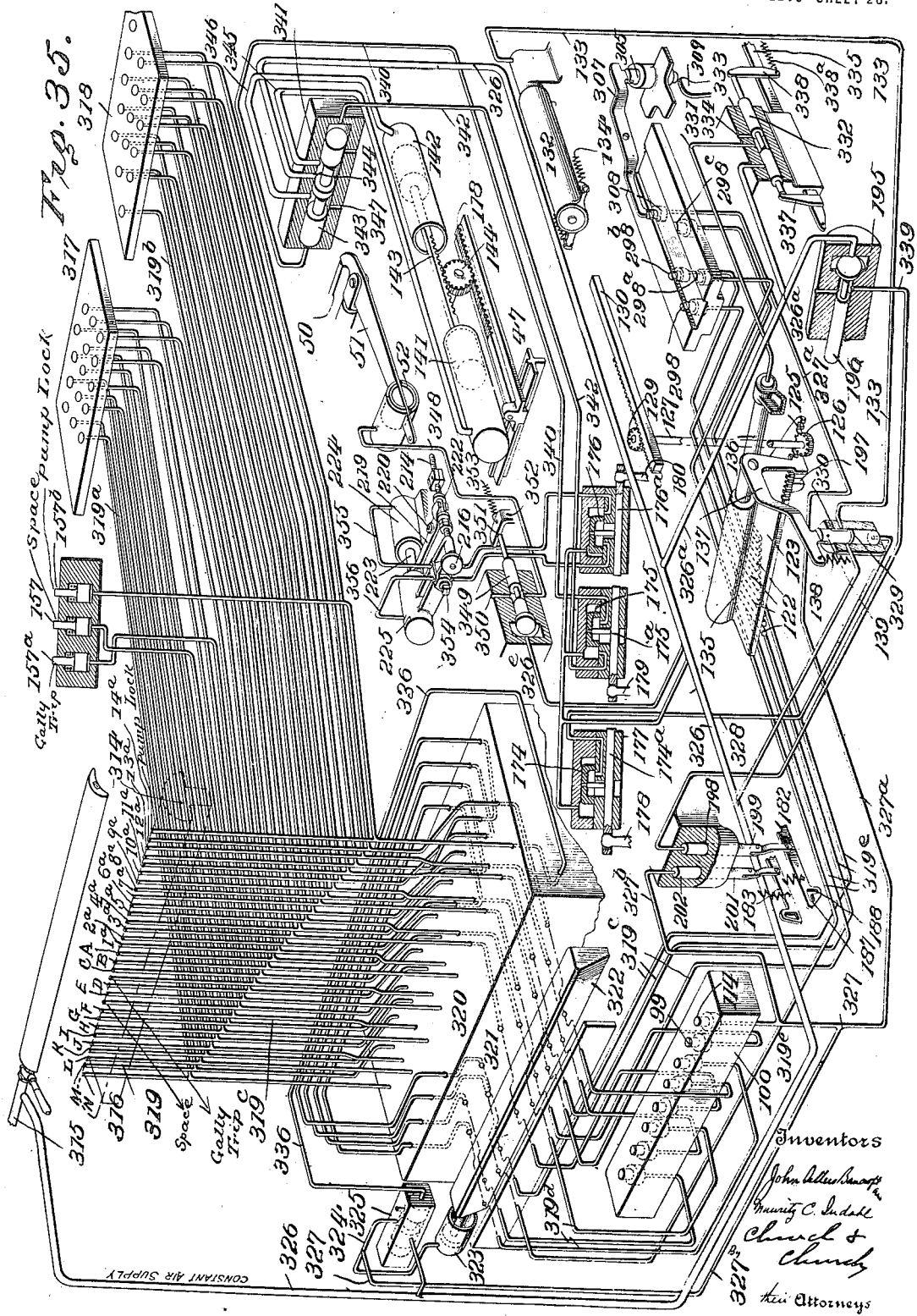

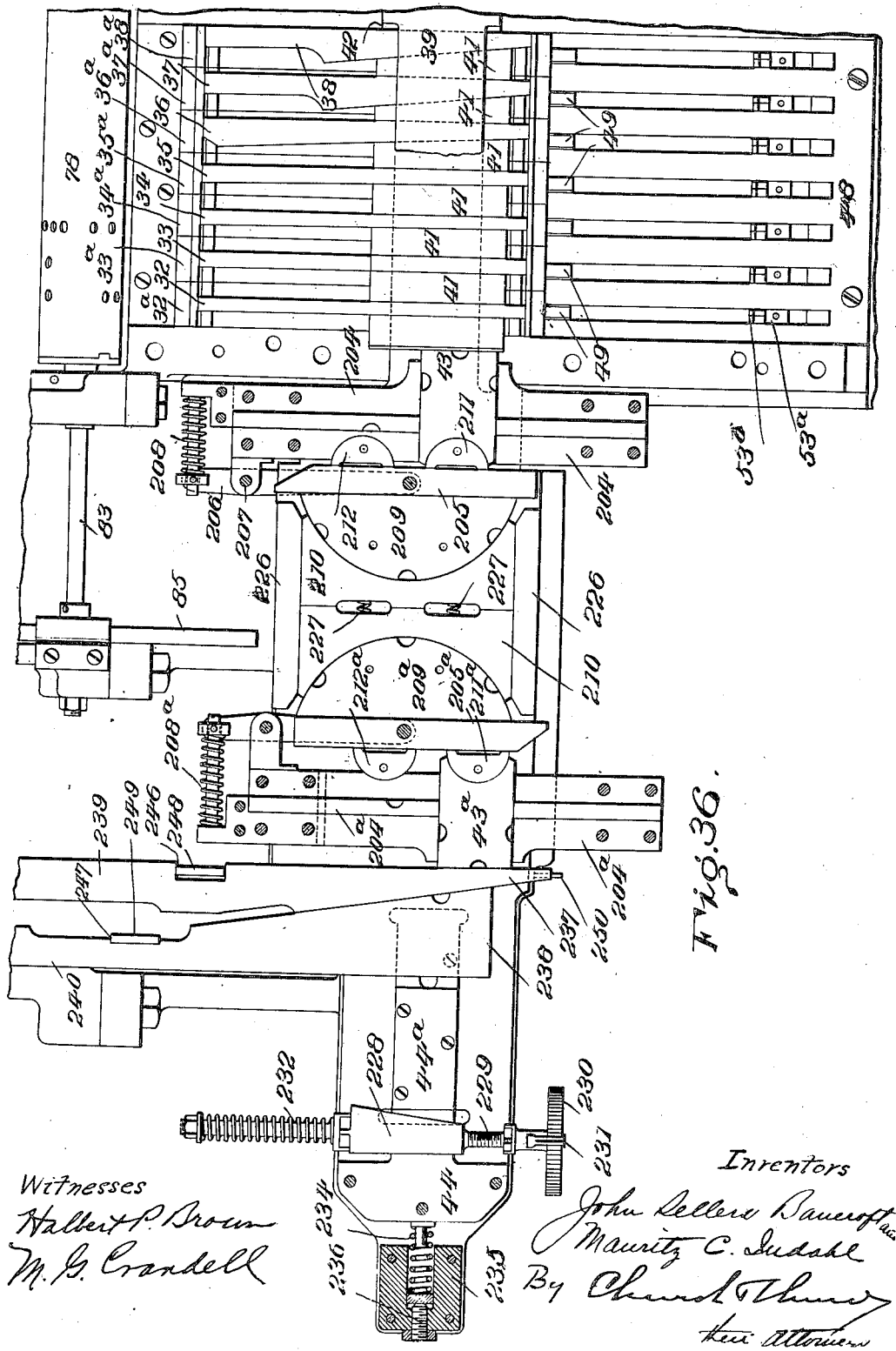

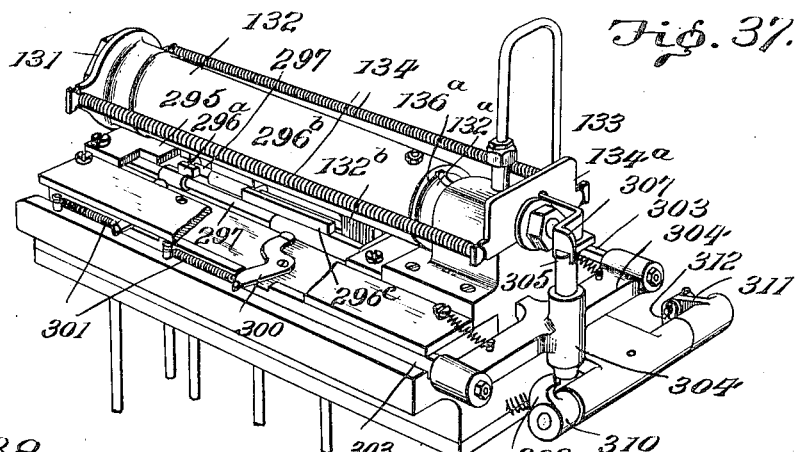
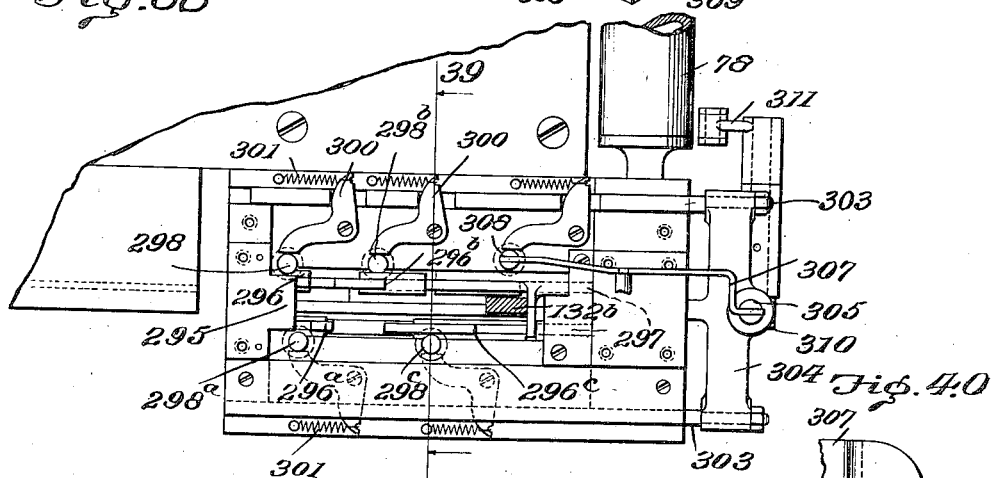
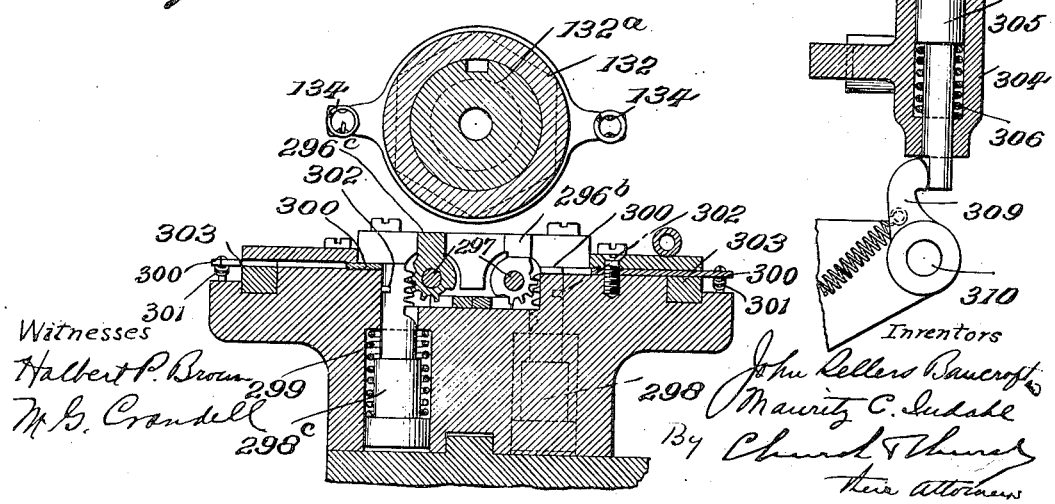

Patented Mar. 27, 1923.

1,449,489

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

TYPOGRAPHIC COMPOSING MACHINE.

Application filed March 26, 1917, Serial No. 157,448. Renewed November 30, 1920. Serial No. 427,413.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Typographic Composing Machines; and we do hereby declare the following to be a full, clear, and exact description of the same when taken in connection with the accompanying drawings, forming part of this specification.

The present invention relates to type making and composing machines of that class wherein the type, including character type, space type and quads, are cast or formed in succession in proper sequence and of proper size to form justified lines of composition. Exemplifications of composing machines of this class are found in the now well known casting and composing machines made by the Lanston Monotype Machine Company, and are well understood by those skilled in the art. An illustration of a machine of this class is found in United States patent granted to the Lanston Monotype Machine Company, May 30, 1899, No. 625,998.

For convenience in illustrating and imparting an understanding of the present invention it is shown as embodied in or forming part of a machine having certain features of construction and characteristics corresponding to the machine disclosed in the patent aforesaid, and as to those features and characteristics specific detail illustration and description will be omitted from the present disclosure. For example the means for moving and centering the die case, the pump mechanism for injecting molten metal into the mold, and the galley mechanism with the means for transferring the type from the mold to the galley, may, for the present purposes be similar to the commercial machine referred to, or the machine disclosed in said patent, but it will be understood that the invention is well adapted for incorporation in machines of widely different construction, in so far as the features mentioned are concerned, and, therefore, it is not desired to limit the invention in its application to any particular machine or to the particular machine adopted for illustrative purposes. Primarily, the invention has to do with that part of the casting and composing machine which controls and regulates the size of the mold in casting type bodies of proper size for the different characters and of proper size for accurately absorbing line shortage and producing a properly justified line of composition, one of the objects being to provide a single mold adjusting or dimensioning mechanism competent to perform several functions such as dimensioning the mold for both the production of normal bodies and the production of justification bodies with the further function of distributing or apportioning the line shortage equally among the justification bodies to produce exactly justified composition.

Another object is to provide a composing machine competent to produce justified composition of different "set sizes" under the control of the same record or controller, and if desired to change the "set size" during composition and still effect accurate justification. Another object is to provide operating and control mechanisms competent to respond to combinations of signals in the controller or record strip, whereby the number of individual signals required to control the functions of the machine may be reduced or many additional functions may be controlled without increasing the number of individual signals.

Other objects of the invention will hereinafter appear and the means for accomplishing the same pointed out particularly in the claims.

Referring to the accompanying drawings,—

Figure 1:
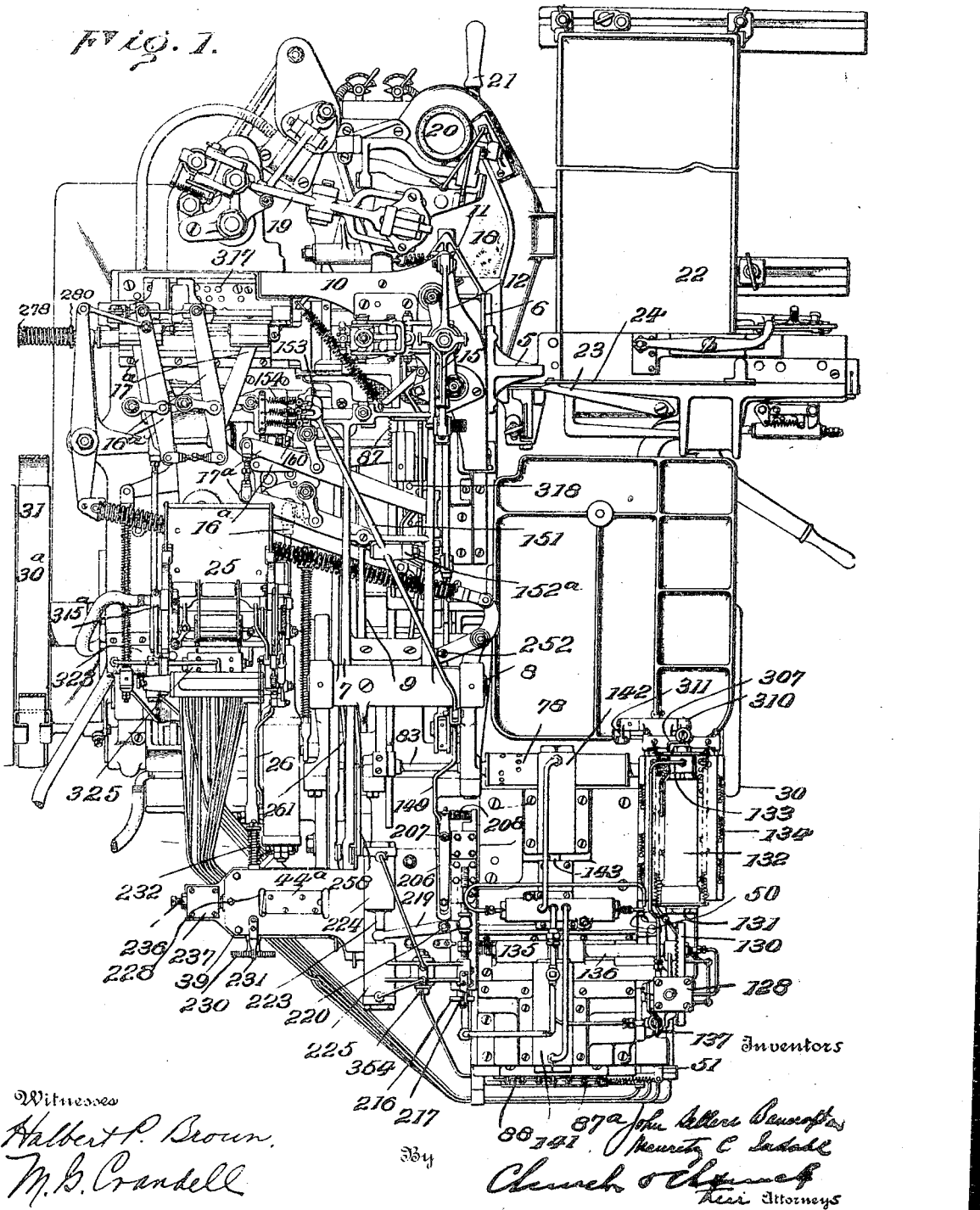
Figure 1 is a top plan view of a composing machine embodying the present invention.

Figure 6 is a perspective view of the mechanism at the lower right hand corner of the machine, as shown in Figure 1, and embodying generally the mechanism which may be collectively designated as the single adjusting or dimensioning mechanism for determining the sizes of the type bodies, such mechanism being under the control either directly or indirectly of signals in the controller or record strip and susceptible of manual adjustment to vary the result of its function, as will hereinafter appear.

Figure 7 is a perspective view on a somewhat enlarged scale, of a portion of the mechanism shown in Figure 6, but with parts removed to disclose underlying mechanism, the point of view of Figures 6 and 7 being approximately the same.

Figure 8 is a perspective view of the operating parts of the adjusting or dimension determining mechanism omitting the supporting frame and the controlling and operating means, but including the secondary dimensioning means and the dimension transferring means.

Figure 8ª is a section in a vertical plane through parts shown in Figure 6.

Figure 9 is a sectional elevation on an enlarged scale showing some of the operating and controlling means for the dimension adjusting devices.

Figure 10 is a similar view showing the parts in a position to which they may be set in dimensioning a justification type body, ordinarily a space body.

Figure 3:
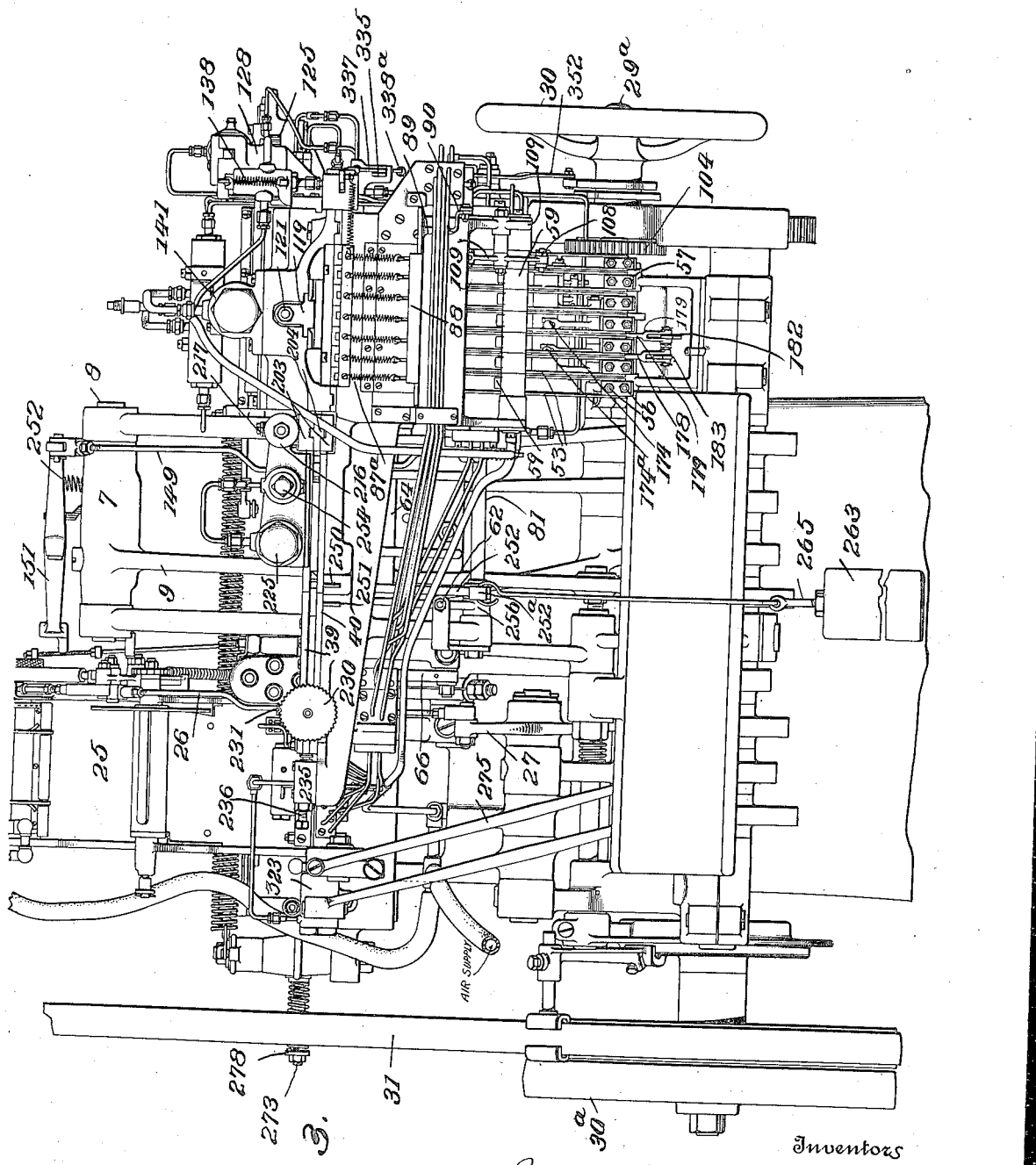
Figure 3 is an end elevation looking at the near end of the machine as shown in Figure 1.

Figures 11 and 12 are sections in a vertical plane substantially at right angles to the plane of the section in Figures 9 and 10, Figure 11 showing the left hand part of the machine and Figure 12 the right hand part of the machine, as viewed in Figures 1 and 3.

Figure 13 is a plan view mainly of the parts shown in perspective in Figure 8, but including additional elements in the way of parts of the framing and co-operating mechanism.

Figure 14 is a similar view with some of the dimensioning wedges advanced.

Figure 15 is a perspective view showing some of the control mechanism for the dimensioning wedges, many of the duplicate parts and the supporting bearings and framing being omitted to facilitate graphic illustration.

Figure 15ª is a detail of valve lever operating links shown in Figure 15.

Figure 16 is a bottom plan view of the cap frame which has been removed from the parts shown in Figure 7, this view also showing the secondary or intermediate stop.

Figure 17 is a perspective view of the secondary or intermediate stop, together with its operating rack.

Figure 18 is a perspective view of the adjustable stepped stop through the instrumentality of which the movement of the dimensioning wedges is controlled in the formation of justification type bodies.

Figure 19 is a perspective view of one of the members preferably employed in the formation of the steps constituting the functionally active members of the stop.

Figure 20 is a diagrammatic sectional view illustrating a drum which may be employed for controlling the selection of the dimensioning wedges adapted to be set in response to signals in the record strip.

Figure 21 is an evolved plan of the cylinder or drum shown in Figure 20.

Figure 22 is a top plan view of a portion of the mechanism for setting the stepped stop shown in Figure 18.

Figure 22ª is a plan of some of the same parts with portions broken away.

Figure 23 is a detail perspective view of the rack and pinion arrangement shown in Figure 22.

Figure 24 is a perspective view, with the parts separated, of the locking mechanism for the stepped stop.

Figure 25:
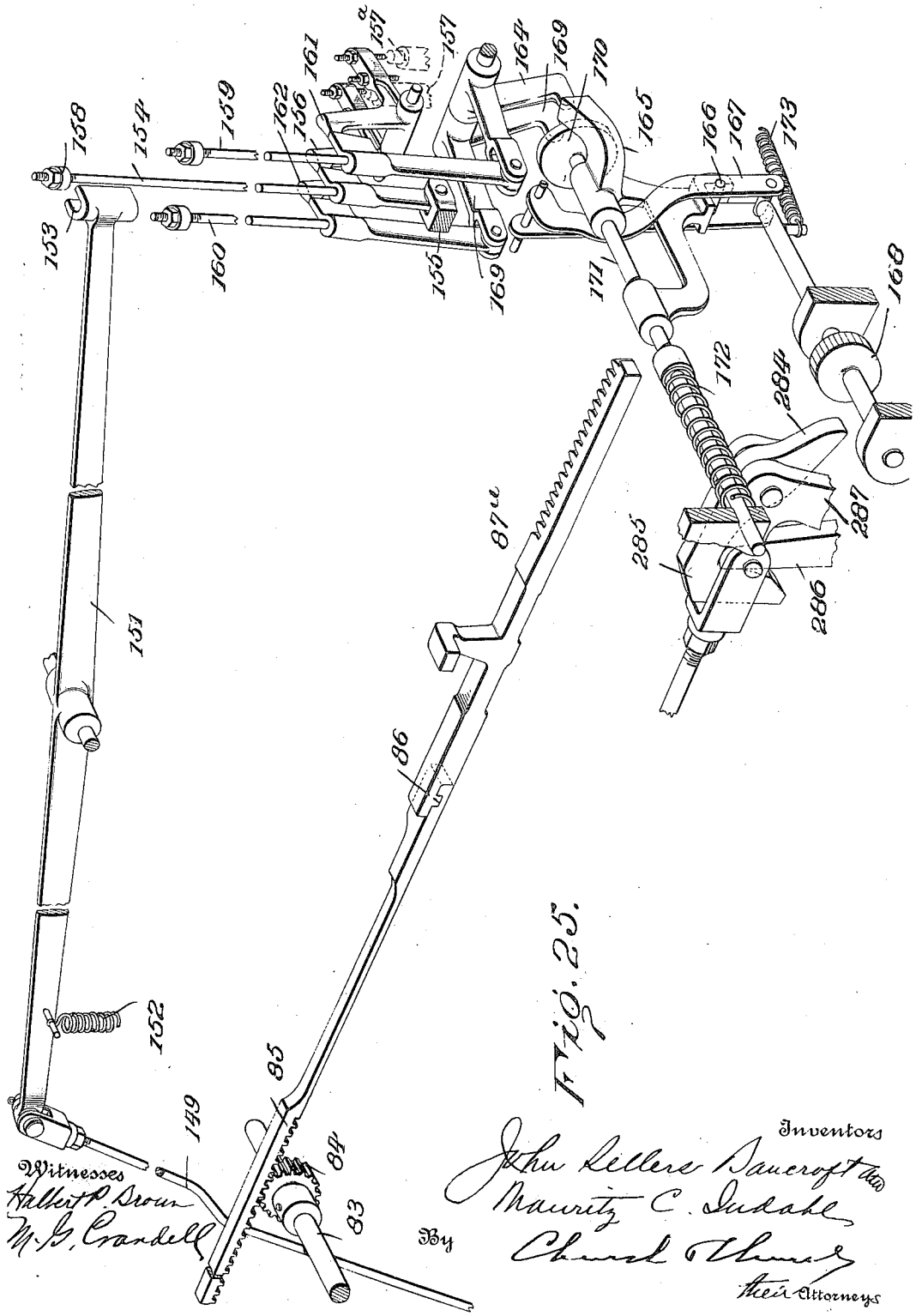

Figure 25 is a perspective view of certain of the operating parts for the control shifting mechanism of the mold dimensioning devices, the machine frame being entirely omitted.

Figure 26 is a detail sectional elevation showing the cam shaft and mechanism for operating the dimension transferring mechanism.

Figure 27 is a perspective view of the operating levers and links for the dimension transferring mechanism.

Figure 28 is a corresponding view of parts shown in Figure 27, but looking at the opposite side.

Figure 29 is an enlarged detail showing the inclines at one end of the dimension transferring mechanism.

Figures 30 and 31 are views showing the pump lock and galley trip connections.

Figure 32 is a detail sectional elevation showing the mold blade and the direct operating connections and stops or abutments associated therewith for controlling its position, and thereby varying the size of the mold.

Figure 33 is a view looking at the right hand end of the parts shown in Figure 32.

Figure 34 is a section on substantially the plane indicated at 34—34 in Figure 32.

Figure 35 is a schematic view illustrating the pneumatic system through the medium of which the control and operation of the several parts of the machine are effected.

Figure 36 is a view corresponding to Figures 13 and 14, and illustrating a further development of the secondary dimensioning means, whereby the effect of the primary dimensioning means may be varied to proportionately amplify or to proportionately diminish the dimensioning effect.

Figure 37 is a perspective view of the stepped stop abutment operating mechanism.

Figure 38 is a plan view of the same with certain of the overlying parts removed.

Figure 39 is a section in a vertical plane indicated by the line 39—39, Figure 38.

Figure 40 is a detail sectional elevation of part of the catch release mechanism.

Figure 41 is a detail sectional elevation of two of the valves.

Like characters of reference in the several figures indicate the same parts.

Many features of the machine which has been adopted for illustrating the embodiment of the present invention correspond to features of the commercial Lanston monotype machine and the essential parts of these known features of the machine are illustrated in the patent hereinbefore referred to, and in patents granted subsequently thereto. In order that the general characteristics of the prior machine may be recognized in the accompanying drawings, a preliminary brief description of the same will now be made.

Figure 4:
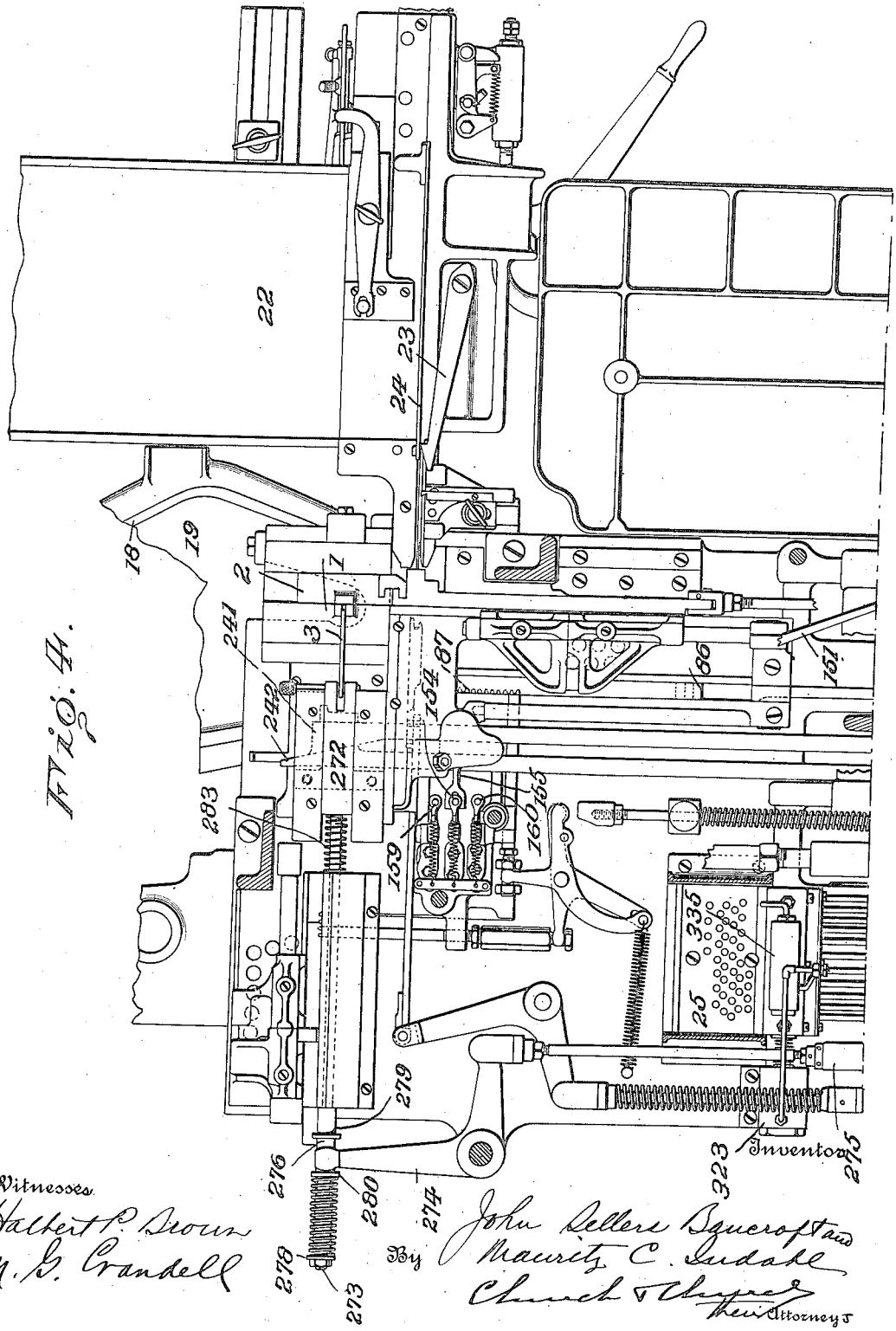
Figures 4 and 5 are top plan views on an enlarged scale, but with certain parts of the machine omitted and broken away in order to disclose features having particular reference to the present improvements.

A mold 1, best seen in top plan in Figure 4, is mounted in a fixed position in the frame, one wall of the mold cavity is formed by the cross block 2 and another wall by the mold blade 3, the mechanism for operating the cross block 2 being in all respects similar to the corresponding mechanism of the prior art, but the mechanism for positioning the mold blade for dimensioning the mold embodies features which relate to the present invention and will be hereinafter described in detail.

Figure 2:
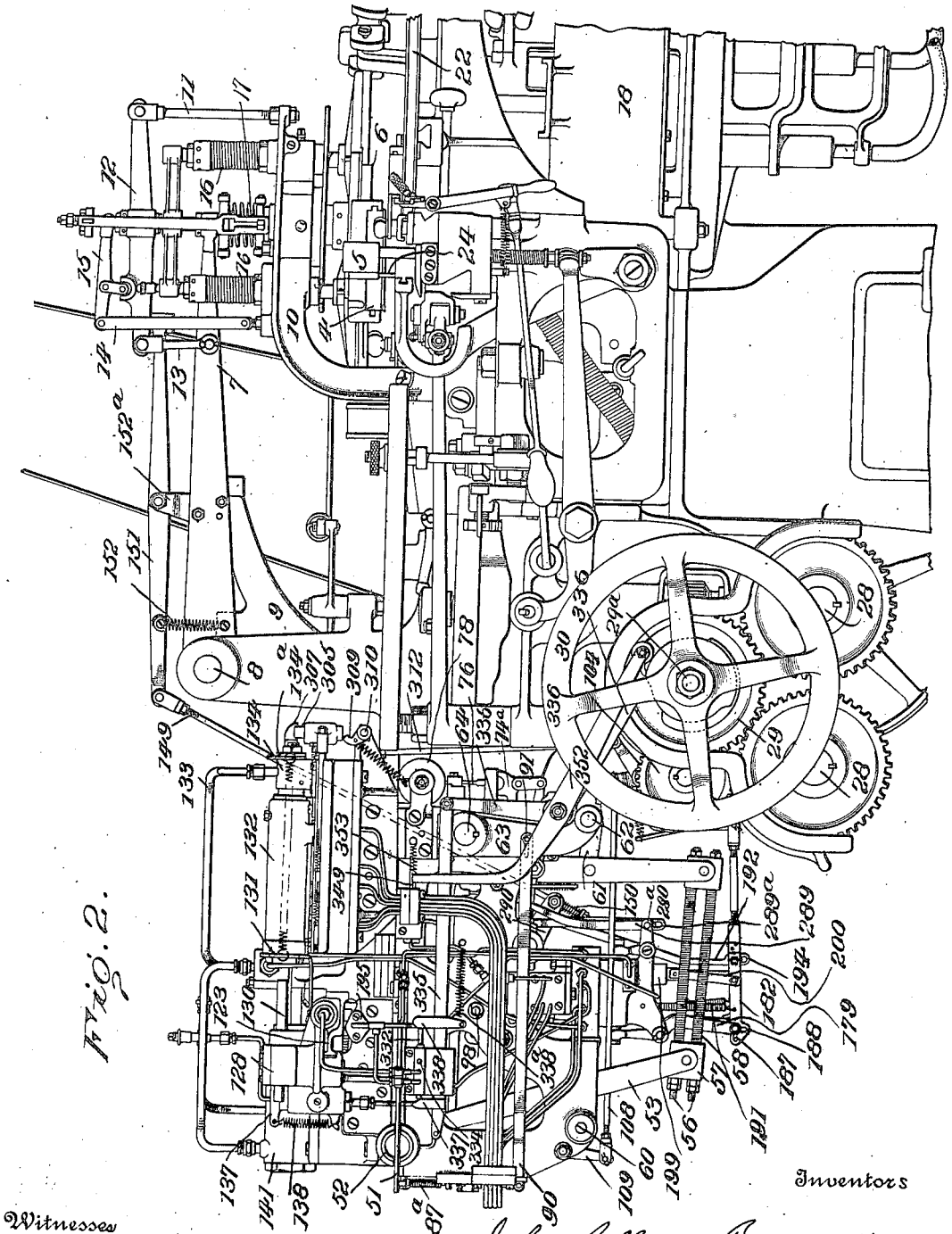
Figure 2 is an elevation looking at the right hand or front side of the machine, as seen in Figure 1, some of the parts being broken away in order to bring the drawing within the prescribed limits of the sheet.

The matrix case 4, Figure 1, is mounted to move in a sliding frame 5 which latter is in turn mounted on a carrying frame 6. The said sliding frame and matrix case are movable at right angles to each other in a horizontal plane so as to bring any matrix in the case into position for registering with the upper end of the mold cavity and the whole assembly to-wit, the frame 6, sliding frame 5 and matrix case 4, are adapted to be depressed so as to bring the matrix down into position over the mold cavity, and when in this position the particular matrix is centered by a centering pin mechanism of the usual construction. The mechanism for lowering and raising the matrix case assembly and operating the centering pin embodies a centering pin lever 7 fulcrumed at 8 to an upwardly projecting stand or bracket on the main frame and adapted to be operated by a downwardly extending centering pin cam lever 9 connected with the lever 7, and the upper end of which is shown in Figures 1 and 2. The lower portion is best seen in Figure 26.

The matrix case assembly is mounted in the bridge 10, which bridge also forms the support for the lower end of the bridge lever fulcrum rod 11, the bridge lever 12, its connecting link 13 by which it is jointed to the centering pin lever 7, also the centering pin auxiliary lever fulcrum link 14, centering pin auxiliary lever 15, and the usual springs 16 and 17, through which the movement of the several operating levers is communicated to the die case assembly and centering pin, all of which parts being well known in the art, particularly description of their functional operation is deemed unnecessary. The mechanism for centering the die case or moving the same directly from one position to another may, if desired, also be of the well known character and controlled in the well known way through the blowing up of locating pins with which pin jaws moved by the pin jaw tongs 16$^a$ co-operate; the said pin jaw tongs in turn control matrix jaw tongs 17$^a$, the arrangement of the tongs their operating mechanism and the mechanism for transmitting motion of the tongs to the die case being in all respects essentially the same as in said before mentioned patent and illustrated in detail in Figs. 23 to 30 of the said patent. In this connection it may be stated that the die case, when located, is locked and held in position by means of locking racks which it is not deemed necessary to describe herein.

The melting pot 18 is supported at one side of the main frame and the pump mechanism for injecting molten metal into the lower portion of the mold cavity is of known construction and embodies the usual parts which may be recognized from the pump lever 19, chimney 20 and handle 21, by which the melting pot and pump assembly may be swung into or out of its operative position. 22 indicates the galley, 23 the line hook by means of which the composed line is drawn into position to be pushed into the galley when the line supporting blade 24 is elevated. The paper tower is indicated generally by the number 25 (Figures 1 and 3), and the mechanism for feeding the paper step-by-step is actuated by a rod 26, which at the lower end is jointed to a paper feed lever 27, as shown in Figure 26, and the paper feed lever is actuated by cams on the two cam shafts 28. The cam shafts 28 are geared together so as to rotate in a definite relation to each other preferably by an intermediate gear 29 on a shaft 29$^a$ carrying the hand wheel 30 by means of which the machine may be turned over or backward and forward without the application of power. One of the cam shafts carries the fast and loose pulleys 30$^a$ or is adapted for the application of power from any suitable power source, the power in the present instance being derived through a belt 31.

All of the parts particularly referred to and their intermediate connections, correspond both in their construction and relative location with the parts of the commercial monotype machine and are substantially as shown in Patent 626,998, but it will be understood that in so far as the present invention is concerned, many or all of these parts may be changed in construction and relative location, and they are adopted for illustrating the embodiment of the present invention mainly because they are of well understood construction and their function and operation is well known to those skilled in the art, and will enable one so skilled in the art to more readily appreciate the objects aimed at and accomplished by the present improvements.

It is believed that a clearer and more comprehensive understanding of the present invention will result from a description of the several essential features in succession, and perhaps the most important of the mechanisms relates to the means for properly dimensioning the mold. This mechanism naturally sub-divides itself into a primary and a secondary dimensioning mechanism.

Primary dimensioning mechanism.

In previous commercial monotype machines, and in machines as disclosed in prior patents, mechanism has been provided for adjusting or dimensioning the mold so as to produce predetermined size type bodies for the several characters, and other mechanism has been provided for producing different size space bodies, the size of the latter being gaged to approximately absorb the line deficiency and produce what is known as a justified line. The mechanism for adjusting or dimensioning the mold to produce the several sizes of type bodies for the different characters, has commonly taken the form of what is known as a normal wedge, while the mechanism for adjusting or dimensioning the mold for making justification space bodies is what is commonly known as the justification wedge or wedges.

Various mechanisms have been provided for operating the normal wedge and justification wedges, either directly or indirectly responsive to signals in the record strip or controller.

It has also been proposed to provide the record strip or controller with signals or indications denoting line deficiency and the number of spaces in a line, and the casting and composing machine in this instance is provided with means responsive to said signals which will automatically distribute or apportion the line deficiency among the several justification space bodies; the type or character bodies in this instance being dimensioned by the usual normal wedge or equivalent mechanism which, in so far as its functions are concerned is quite independent of the deficiency and apportioning devices which are functionally active only when justification space bodies are to be formed.

In accordance with the present invention, a single mechanism is provided for adjusting or dimensioning the mold for both character and justification space bodies. It is responsive directly or indirectly to signals in the record strip indicating the character bodies, the line deficiency and number of justification spaces to be included in the line and space or justification body signals and automatically distributes or apportions the line deficiency among the several justification bodies or spaces so as to produce a justified line without remainder. Owing to this combination of active functions, it becomes possible to utilize the same record ribbon or strip for the production of justified lines of type in practically any set size. Furthermore, by the provision of a single mechanism for performing both dimensioning and apportioning functions, it becomes possible to control the several functions by combinations of signals in the record strip with the result that the size of the record strip required to control the manifold functions of the machine may be greatly reduced or, what is equivalent thereto, many additional functions may be controlled without increasing the size of the record strip or ribbon.

In the apportioning or line deficiency distributing mechanism heretofore proposed, as embodied, for example, in Patents 952,597 and 980,902, the position of the controlling member is determined by a gage or gages having a variable movement under the control of members which are suitably set in response to line deficiency and number of justification space signals; whereas, in the present invention the member or members controlling the adjusting or dimensioning devices are movable a normal predetermined distance for dimensioning type bodies of predetermined sizes and the same member or members have a predetermined movement which is a fractional part of the normal movement in order to properly dimension justification space bodies, i. e., to distribute the shortage or line deficiency among the several spaces of the line.

In the practical application of the invention, the primary dimensioning control members conveniently take the form of a plurality of wedges which singly or in unison or in combinations or permutations may by a full or normal movement be made to adjust or set a suitable dimensioning abutment in any position to produce type bodies from the smallest to the largest of the set for which the machine is designed, it being preferable, in order to reduce the number of wedges and give a maximum capacity, to proportion the taper or inclination of the wedges by the same unit of measurement, the relation between the wedges being in the proportion of 1, 2, 4, 8, 16, 32 and 64, for example, whereby, by permutation, any movement of the abutment may be effected from one unit to 127 units. With this capacity for adjusting the abutment to any position to form type bodies from the smallest to the largest, provision is made whereby any number of units from one to the maximum may be added to and apportioned among any desired number of space bodies by imparting to the adjusting or control member or members a movement less than normal movement and which will be in inverse proportion to the number of spaces. For example, a single space would require a full normal movement; two spaces would require one-half of a full normal movement; three spaces, one-third of a full normal movement; four spaces, one-fourth of a full normal movement, etc., and consequently by designating the number of control members representing by a full movement the line shortage or deficiency and by imparting to such designated member or members a movement which is inversely proportioned to the number of spaces in which the line shortage or deficiency is to be absorbed, the abutment may be adjusted or set accurately to produce each space of the proper dimension to effect perfect justification of the line. The proportional movement of the designated control member or members accurately effects the apportionment automatically and regardless of any fractional part of a unit of measure which may form the basis of the predetermined body sizes or length of the line. In other words, the division of the deficiency does not depend on any arithmetical division and is accurate regardless of the fact that the arithmetical division of the units of deficiency of the line may leave an indefinite remainder when divided by the number of spaces.

The function of the dimensioning mechanism is of course to determine the position which shall be occupied by the mold blade during the casting of type bodies, space bodies or quad bodies, as the case may be, and inasmuch as the primary dimensioning mechanism is, in the machine illustrated, located a considerable distance away from the mold, the intermediate mechanism, including the secondary dimensioning mechanism and the dimension transferring mechanism, will for the present be disregarded, it being sufficient to say that the primary dimensioning mechanism positions an abutment or determines the space between opposing abutments, and, through the secondary dimensioning mechanism and the dimension transferring mechanism, this positioning result is transferred to and controls the position of the mold blade. The dimensioning mechanism is located in that part of the machine shown at the bottom of Figure 1; in elevation in Figure 3 and in perspective in Figure 6, but it is so concealed within the overlying parts that only a few of the intermediate dimensioning parts are discernible. In Figure 7, however, which is a perspective view corresponding in point of view with Figure 6, the overlying parts have in part been removed, and in Figure 8 which is a somewhat similar perspective view the operating parts are shown in perspective without the supporting frame, and with only a portion of the co-operating devices.

Referring particularly to Figures 7, 8, 11, 12, 13, 14 and 36, it will be seen that a series of wedges numbered respectively 32, 33, 34, 35, 36, 37 and 38 are mounted to slide longitudinally through an abutment frame having top and bottom bars 39 and 40, the said wedges being separated by space blocks 41 having their wedge engaging faces corresponding in angularity or inclination to the faces of the co-operating wedges. At one end of the series of wedges is an abutment 42 which may, for convenience, be termed a fixed abutment, and at the other end of the series of wedges is an abutment 43 which may be termed a movable abutment, although, as a matter of fact, both abutments are movable and the longitudinal movement of the wedges simply serves to separate or permit the abutments to approach each other. The abutment frame formed by the bars 39 and 40 extends way through the machine or to the left, as shown in Figure 7, and directly opposite the abutment 42 is provided with an opposing fixed abutment 44. The bars or plates 39, 40, of the abutment frame have both of the abutments 42 and 44 rigidly connected with them and consequently longitudinal movement of the wedges will serve to position the abutment 43 with relation to the abutment 44 and through mechanism to be presently described this relative movement of the two abutments 43 and 44 as controlled by the primary dimensioning mechanism or wedges, in turn controls the dimensioning adjustment of the mold blade.

The wedges 32 to 38 inclusive may of course have their inclined faces at angles bearing different predetermined relation to each other, but they are preferably inclined at such angles that the value accorded the respective wedges, due to the inclination of their inclined faces will be respectively in the proportion of 1, 2, 4, 8, 16, 32 and 64; that is to say, with the adoption of any arbitrary unit of measure, the wedge 32, if given a full movement, would advance the abutment 43 with respect to the abutment 44, a distance of one unit; the wedge 33 if given a full movement will advance the abutment two units; the wedge 34, if given a full movement, will advance the abutment four units; the wedge 35, if given a full movement will advance the abutment eight units; the wedge 36, if given a full movement, will advance the abutment sixteen units; and the wedge 37, if given a full movement, will advance the abutment thirty-two units. The wedge 38, however, in the embodiment illustrated, is a duplicate of the wedge 37 and if given a full movement, would advance the abutment thirty-two units, but, in combination with the wedge 37, or if both wedges 37 and 38 are given a full movement, the abutment would be advanced sixty-four units.

With this arrangement of wedges, it is obvious that several highly important objects may be accomplished. For example, by permutation, the abutment may be moved any number of units within the total capacity of the whole series of wedges. For example, should three units be desired, the first and second wedges would be moved; should five units be desired, the first and third wedges would be moved; and should six units be desired, the second and third wedges would be moved. Furthermore, with this arrangement it becomes possible to select a number of wedges which will correspond to any total number of units, and by moving them a full stroke the abutments may be advanced a corresponding number of units, but by moving the wedges a proportionate part of their full movement, the abutment may be advanced a distance which will be an accurate division of the distance it would be advanced by a full movement of the wedges, and thus it becomes possible to divide the measurement accurately, regardless of whether or not the measurement is divisible into units or fractions of a unit.

A movement of the selected wedges one-half of their full or normal movement will divide the total measurement in half. One-third of their movement will divide the total measurement into thirds, and so on. Owing to the capacity just indicated, it will be seen that this primary dimensioning mechanism is competent to and, as hereinafter pointed out, does perform in the machine the important functions of first determining the dimensions of type bodies which are of predetermined and known or normal sizes and secondly determining the sizes of a known number of bodies of unknown sizes which will exactly absorb the line shortage and produce a correctly justified line.

The first function is performed by selecting the wedge or wedges having a unit value corresponding to the unit value of the desired body and giving the wedge or wedges a full movement. The second function is performed by selecting the wedge or wedges corresponding in value to the total number of units of shortage and moving them a distance which will be the full normal movement divided by the number of indefinite size bodies.

The full movement of the wedges is limited in each direction by a fixed stop bars 45 and 46 best seen in Figures 9 and 10, there being interposed between the forward ends of the wedges and the stop bar 46, a movable stop bar 47 which is adapted to be adjusted when the forward movement of the wedges is to be arrested at any point less than a full movement.

It is, as will hereinafter appear, quite essential in adjusting with great accuracy that there shall be afforded no opportunity for the parts to spring or yield or to work out of their final position of adjustment, and it is for this reason that the wedges are adapted to contact directly with their stop bars, although said wedges are mounted in carriers or carriages $32^a$ to $38^a$, respectively, which carriers or carriages engage opposite ends of the wedges, as shown clearly in Figure 7, and are the parts with which mechanism for moving the wedges is adapted to engage, and by which the wedges are maintained in their position of adjustment. The wedge carriers slide on fixed ways 48 forming a part of the frame work, said ways being in the form of bars between which a rib or extension 49 on each carriage is adapted to travel, whereby the carriages are held in alinement, and at the same time the fit of these parts is sufficiently loose so that a transverse clamping action will result in the carriages all being clamped and locked rigidly against longitudinal movement at the moment when the dimensioning result is to become effective. The clamping of the wedge carriages is effected by means of a clamp in the form of a pin 50 which projects through the side frame and is acted upon by the short arm of the lever 51, the long arm of which lever cooperates with a motor piston 52 operated pneumatically through connections which will be described in connection with the pneumatic system of the machine.

By clamping the wedge carriers or carriages transversely the wedges are firmly locked in their adjusted position against any tendency to squeeze back when the final pressure is applied thereto in obtaining the desired result. At the same time the wedges are perfectly free to adjust themselves laterally or transversely of their length in accord with the positions which they must assume when a greater or less number of wedges are advanced or moved.

The wedges are moved or advanced by mechanical means, preferably usually operated from the power shaft of the machine with yielding connections whereby the moving part may be arrested with the wedges in any desired position of advance, and the particular means preferably employed embodies a pair of tongs for each wedge. Said tongs in their action resemble somewhat the tongs heretofore employed for positioning the die case and sliding frame in the patent aforesaid to which reference has already been made. These tongs are best seen in side elevation in Figures 8ª, 9 and 10, and by reference to these figures it will be seen that each pair of tongs embodies a pair of tong arms or levers 53 and 54. These tong arms or levers 53 and 54 are pivotally connected at their upper ends with tong jaws 53ª and 54ª mounted to slide on guide rods 55 and the upper ends or edges of the tong jaws work in the slots between the bars 48 forming the guideways for the wedge carriages being in position to co-operate with the rib extensions 49 of said carriages and to move said carriages and wedges in one direction or the other, depending upon which one of the tong jaws advances toward the other. At the lower ends the tong arms or levers are connected by yielding connections conveniently formed by tie rods 56 working through blocks 57 on the arms with interposed spiral springs 58 surrounding the tie rods, the arrangement being such that the blocks 57 may pivot on the ends of the tong arms and the arms advance or recede independently, the approach of the lower ends, however, being resisted by the pressure of the interposed springs which proportionately tends to advance the upper ends. The tong arms are pivotally mounted intermediate their ends, the arms 53 being mounted on carriers 59 supported by cross shaft 60 and the arms 54 being pivotally connected with carrier links 61 mounted on a cross shaft 62 supported in the lower ends of arms 63 mounted on a wedge tong rock shaft 64. The wedge tong rock shaft 64 is oscillated by an arm 65 shown in dotted lines in Figure 26 through the medium of a link 66 pivotally connecting said arm 65 with a boss 67 on one side of the usual tongs lever 68 fulcrumed at 69 and extending down between the usual cams on the cam shafts 28. This chain of operating connections for the wedge tongs, it will be seen, is timed in accord with the operation of the die case positioning tongs and the arrangement is such that the wedge tongs and the matrix tongs close and open or tend to close and open simultaneously, but the pin tongs are adapted to open at the time when the wedge tongs close and vice versa. This arrangement will be understood when it is remembered that in the prior machine the two sets of tongs for positioning the die case operate alternately, the pin tongs which engage the pins for initial adjustment closing at the time when the matrix tongs are opening and vice versa.

The tong jaws 53ª are each provided with a vertically movable latch 53ᵇ normally adapted to project up into a position where it will engage the intermediate stop bar 47 whereby the tongs 53 will be held so that they cannot advance unless either the latches be released or the intermediate stop bar 47 advanced. The latches 53ᵇ are provided with slotted or recessed lower ends through which slots or recesses the rear ends of levers 70 are adapted to pass, said levers being pivoted at 71 on fixed pivots and normally occupying the position shown in Figures 8ª and 9. When said levers are moved to the position shown in Figure 10, however, the latches will be moved downwardly or permitted to move downwardly, and the tong arms 53 may advance. When the levers 70 are moved downwardly at the rear ends and upwardly at the front ends, said front ends at 72 are adapted to form locks or stops for preventing the advance of the tong jaws 54ª and consequently the jaw of each pair which will be advanced depends upon the position of the lever 70 for that pair of tongs. The levers 70 form a part of the locking and selecting devices which will be hereinafter described, provision being made whereby either directly or indirectly the said levers are responsive to signals in the record strip which indicate that type bodies are to be dimensioned, and produce the result of selecting the proper wedges for giving the dimensioning effect. Normally the levers are operated in response to signals indicating type bodies of predetermined or normal size, but they are also adapted to be operated in response to signals indicating that justification type bodies or bodies of indefinite dimension are to be dimensioned, the control being transferred from one set of selectors to the other by means to be presently referred to but which may be disregarded for the moment. Normally, and as shown in Figure 9, the forward end 72 of each lever 70 occupies a position directly above the upturned inner end 73 of a co-operating lever 74 (see Figure 15) pivoted on a laterally and vertically movable shaft 75. The outer ends of the levers 74 are provided with upwardly projecting pivoted pins 76, the ends of which are held loosely in guideways 77 on the frame in position to co-operate with a drum 78. The shaft 75 on which the levers 74 pivot is mounted on the upper ends of links 79 extending down and pivotally connected with arms 80 on a rock shaft 81. This rock shaft 81 is operated or oscillated through a link connection 82 (see Figures 9, 10 and 26) with the centering pin lever 9, there being a slot and pin connection between the link and rock shaft 81, whereby the shaft will be oscillated only during a portion of the movements of the centering pin lever.

It will be readily seen that by oscillation of the rock shaft 81, should the upper ends of any one or more of the pins 76 engage the drum 78 the inner ends 73 of the lever It will be readily seen that by oscillation lever or levers 70 will be moved upwardly to lock the tong jaw 54$^a$ and to release the tong jaw 53$^a$ of the particular pair. Should, however, the pin 76 pass through a perforation or opening in the drum 78, then the outer end of the lever 74 would be elevated and the tong jaw 54$^a$ would be advanced, while the corresponding tong 53$^a$ would be held retracted. The drum 78 is set in response to signals in the record strip indicating normal or type bodies of predetermined size and the perforations are formed in the said drum to permit of the passage of the necessary pins for effecting the selection of the particular tong jaws which it is desired to have operate and, through them, the selection of the proper wedges.

The drum 78 is shown diagrammatically in Figures 20 and 21, and opposite each of the lines of perforations therein are figures indicating the unit size of the type body which will be dimensioned when that particular row of perforations is in position for co-operation with the pins 76. The different rows of perforations in the drum 78 correspond to the different positions of the die case in forming normal character bodies of a unit size which corresponds to the indicated unit size on the drum in Figures 20 and 21 and connections are provided whereby the drum will be rotated in unison with the movement of the die case, so that, whenever the die case is in position to form a normal type body of predetermined dimension, the drum will be correspondingly set for the selecting mechanism for the wedges. Conveniently the shaft 83 (Figures 9, 10 and 15) on which the drum 78 is mounted is provided with a pinion 84 (Figure 25), with which a rack 85 meshes. The rack 85 extends across the machine and is coupled at 86 with the matrix jaw stop rack 87. This matrix jaw stop rack is the member which is positioned by the jaws of the pin tongs in the previous machine and which is locked in position and in turn serves as the means for positioning the matrix jaws so that it is always positioned in accord with the position of the die case or matrix carrier and is adjusted to a new position each time the matrix carrier is positioned for a type body of a different dimension. The pins which control the setting of the pin jaws are directly responsive to the signals in the record strip and through the connections described the drum 78 is set and the levers 70 which will become effective are determined and the desired wedges of the group of wedges are thereby selected.

The levers 70 are normally held in their position shown in Figures 8$^a$ and 9, or in their inoperative positions by springs 87$^a$, but when moved to their operative positions they are adapted to be held against the tension of their springs by a pivoted retainer or holder 88 which engages the left hand ends of the levers and is shown clearly in Figures 6, 9 and 10. This retainer or holder is operated periodically and in proper time through the medium of an arm 89 pivotally connected by a link 90 with one of the arms 63 on the tong rock shaft 64. The point of connection with the arm 63 is indicated at 91 and is best seen in Figure 6, the arrangement being such that the retainer or holder 88 is moved in over the ends of the operated levers 70 preliminary to the application of pressure to the tongs, so that the operated levers will invariably be in position to arrest the proper tong jaws on one side and to release the proper tong jaws on the opposite side, and will be locked or positively held during the operation of the tong jaws, but will be released so that the levers may return to normal position under the influence of their springs 87$^a$ before the next setting operation is inaugurated.

The primary adjusting or dimensioning mechanism is adapted to perform its size determining function in the production of all bodies both character and justification space type. It is normally under the control of mechanism responsive directly or indirectly to normal type or body signals in the controller, but inasmuch as the dimensions of the justification space bodies for the whole line is determined from the line shortage and space number signals in the record strip or controller preliminary to the formation of the line, provision must be made whereby, upon the presentation of a justification space signal at any time during the formation of the line, the proper elements of the primary dimensioning mechanism will be selected to produce a space of proper size. This necessitates the leaving of a record of some character or the setting of parts of the controlling means by the line shortage and space number signals which will, when brought into action, effect the selection of the proper elements of the dimensioning mechanism for the formation of justification spaces but which will leave the dimensioning mechanism free for dimensioning normal character bodies between the formation of justification space bodies. The record set up by the line shortage and justification space signals constitute a controlling means which, at the formation of each justification space body, performs two functions, i. e., first it selects the wedges of the dimensioning mechanism which, if given a full or normal movement, would equal in value a single body of proper size to fill the shortage in the line and, secondly, it arrests the movement of the selected wedges at a point which is determined by the number of spaces in the line, i. e., one-half movement for two spaces, one-third movement for three spaces, etc.

Conveniently the controlling means embodies selectors set through the operation of motor pistons under the control of the line shortage signals in the controller, which selectors are normally inoperative to perform their selecting functions, but are rendered operative, or the control of the dimension adjusting means transferred thereto through means responsive to each justification space signal in the controller, during the formation of a line of composition. The selectors when operated bring into action the proper primary dimensioning devices, (i. e., wedges) which, if given a full movement, would absorb the line shortage in a single space. To distribute this shortage equally among the several spaces a further control is effected by a shortage distributing mechanism set responsive to the space number signals in the controller to arrest the movement of the selected dimensioning devices in accord with the number of spaces in the line. This distributing mechanism conveniently takes the form of a stepped stop which is set under the control of the space number signals to bring the appropriate step in position to arrest the dimensioning devices at the proper position. The stepped stop remains set during the formation of the line and is re-set preliminary to the formation of each succeeding line in accordance with the number of spaces in the line. Functionally it is inactive, however, to arrest the movement of the dimensioning devices, except when a justification space is to be formed or dimensioned and the result is attained by the employment of a secondary or intermediate stop between the stepped stop and dimensioning devices and which is advanced into engagement with the stepped stop only when a justification space signal is presented. This intermediate or secondary stop when in normal or retracted position conveniently forms the stop for arresting the movement of the dimensioning devices when they are given their full movement in the formation of normal type bodies or non-justification bodies, and it forms a part of the means responsive to justification body or space signals for transferring the control of the dimension adjusting means or wedges to the controlling mechanism set in response to the line shortage and space number signals. The intermediate stop in the embodiment illustrated is the movable stop bar 47.

The mechanism which is responsive to the line shortage and space number signals in the record, in the embodiment adopted for illustrating the invention, is as follows:

Beneath each of the levers 70 is what might be termed a secondary selector lever 92 which is adapted to be moved into and out of operative position, preferably by a longitudinal movement. For this purpose the levers are mounted in slots or guideways in a fixed part of the frame 93 and at one end they are provided with bearing recesses 94 adapted to co-operate with a transverse pivot bar 95, and in addition they are provided with a downwardly extending projection 96 for co-operation with the mechanism for shifting the levers longitudinally so as to bring one or the other of the recess bearings 94 into engagement with the pivot bar 95. This movement of the secondary selector levers will be understood from an inspection of Figures 9 and 10, wherein in Figure 9 the levers are shown in full lines in one position and dotted lines in the other position, and in Figure 10 the first lever is shown in one position and the second lever in the other position. When one of these secondary selecting levers is swung upwardly it is adapted to co-operate with its main selector lever and to elevate the latter into position to co-operate with the tong jaw 54$^a$, as shown in full lines in Figure 10, this pivotal movement being effected by the ends 73 of the levers 74 when the latter are shifted from the position shown in Figure 9 to the position shown in Figure 10 and operated through the medium of the rock shaft 81 before referred to. The shifting of the lever 74 so as to shift the control of the selecting mechanism from that adapted to select the wedges for forming type of normal size to the mechanism for selecting the wedges for forming type of variable size for justification is under the control of the space or justification type signals in the record and will be hereinafter described.

The downwardly projecting ends 96 of the secondary selecting levers are located in a position to co-operate with T-shaped rock arms 97, one for each lever, and all journaled on a shaft 98 (see Figures 8$^a$, 9, 10 and 15). The downturned ends of the rock arms 97 are adapted to rest upon or be actuated by motor pistons 99 arranged in a row in a block 100, and during the revolution of the machine preliminary to beginning a line of composition the appropriate pistons are actuated in response to line shortage signals in the record to move the appropriate secondary selecting levers, so that only the desired levers will remain in position for performing the selecting function when actuated. The connections for supplying motive fluid to the cylinders will be described in conjunction with the pneumatic system of the machine. The secondary selecting levers are returned to their normal position by a rock frame 101 having upwardly extending arms 102 adapted to contact with the rear ends of the levers, and this rock frame is operated by mechanical means from the cam shaft 103 but under the control of one of the pneumatic motors. The cam shaft 103 is driven from shaft 29a through equal spur gears 104, Figure 9, and the connections embody a lever 105 having a roller 106, adapted to co-operate with the cam 107 and a long link 108 connected with the lower end of a secondary lever 109. The upper end of said lever 109 is pivotally connected with a slide 110 adapted to be held down by a spring 111 but normally held up against the tension of the spring 111 by resting on a stud 112 on the rear end of a lever 113 pivoted on the shaft 98, and at the forward end adapted to co-operate with and be actuated by the piston 114 preferably arranged in line with the pistons 99, (see Figures 9, 10, 15 and 35). The slide 110 is provided with a notch 115 in its lower edge, which when the slide is lowered is adapted to engage a pin 116 on an arm 117 projecting downwardly from the rock frame 101. Thus, when the first motor piston is actuated in response to a proper signal in the record strip, the slide 110 will be lowered and will engage the arm on the rock frame to return all of the secondary selecting levers to normal position.

In operation, the slide and connections thereto from the cam shaft 103 are moved during each revolution of the machine, but the positioning of the levers is only accomplished during a single revolution of the machine preliminary to beginning a line of composition, and while all the desired motor pistons may be advanced, including the motor piston 114, at the same time, the operation of the parts will be such as to move all of the secondary levers back to normal position, even though some of them may have been just moved by their motor pistons, but the desired secondary selecting levers will be again moved or will follow back against the rock frame arms as the latter retreat and will remain in their set or retracted position during the composition of the line.

From the foregoing it will be seen that the secondary selecting levers are set in response to line shortage signals in the record so that when actuated they will select the proper wedges representing in value the total shortage in the line which must be absorbed by increasing the size of the justification bodies, such justification bodies usually being the space type bodies.

It remains now to describe the means whereby mechanism may be set for controlling the movement of the wedges in such wise that when the signal for a justification body or space is presented the wedges will be moved a distance exactly proportioned to the number of spaces in the line, so as to effect a dimensioning which will be equal to the quotient of the total shortage divided by the number of spaces.

The intermediate stop bar 47 hereinbefore referred to as the part with which the wedges directly contact for limiting their forward movement normally stands in the position shown in Figure 9, against the fixed stop bar 46. This intermediate stop bar 47 is shown in perspective in Figure 17 and in bottom plan in Figure 16. The wedges are adapted to strike its straight edge 47a and it is provided with an actuating rack 118 forming part of a slide 119 movable longitudinally in bearings 120 in the cap frame, shown in bottom plan in Figure 16. It is provided with an adjustable stop projection 121 adapted to strike and be positioned by contact with one or the other steps of stepped stop 122, Figures 8a and 18.

The stepped stop is so arranged with relation to the intermediate stop bar that it will position said stop bar to arrest the movement of the wedges at one-half of their movement, where two justification spaces occur in the line, at one-third of their movement, where three justification spaces occur in a line, at one-fourth of their movement where four justification spaces occur in a line, and so on, it being obvious that the number of steps should be made sufficient to equal the number of justification bodies which may occur in any one line. In practice it is found that fifteen stop positions are usually ample for practical purposes, and therefore provision is made for positioning the bar at 15 positions. The steps of the stepped stop 122 are preferably formed by a series of bars 122a, Figure 18 and 19 in a carriage or slide 123 mounted in ways 124 in the cap frame of the machine and adapted to move in straight lines across the path of the intermediate stop bar 47 or across the path of the stop projection 121 thereon, and it is set or moved from one position to another in response to signals in the record indicating the number of spaces in the line. The movement is effected by motor mechanism controlled by parts responsive to the signal aforesaid, and while such mechanism may assume various mechanical forms, it is preferred that it shall be competent to move the stepped stop directly from one position to another, without the necessity of returning to a normal position. This result is accomplished in the present instance by a pair of motor cylinders and pistons which operate in opposition to each other, but one of dominant power and having its movement defined, limited or determined by stops which are set in response to signals in the record aforesaid. The slide or carriage 123 carrying the stepped stop is provided with a rack 125 meshing with a pinion 126 on the lower end of a vertical shaft 127 journaled in the stand 128 on the cap frame and at its upper end carrying a pinion 129 with which a rack bar 130 is in mesh. The rack bar 130 slides in bearings in the stand 128 and at one end projects into position to cooperate with the forward end of a motor driven pin positioned abutment 131. The abutment 131 is preferably formed or mounted on the end of a cylinder 132 working on a piston and adapted to be advanced by pneumatic pressure or other motive fluid admitted through a pipe 133, and to be returned by return springs 134. Its advance movement is arrested by stops which, as before stated, are controlled from the signals in the record, and when advanced it determines the position of the stepped stop through the action of the rack bars and pinions before described.

On the upper side of the carriage or stepped stop carrier 123 there is located a cylinder 135 working on a piston 136, this cylinder and piston constituting a motor which, when supplied with air or motive fluid, as will be described in connection with the pneumatic system of the machine, serves to move the carriage and stepped stop in a direction which will cause the rack 130 to advance toward the abutment 131.

The mechanism for positioning the abutment 131 is a modification of the mechanism disclosed in the patent to Bancroft No. 782,536, Feb. 14, 1905 and embodies means whereby with four motor pistons responsive to signals in the record the abutment may be positioned to any one of fifteen positions, this being possible by an arrangement whereby the value to be accorded to the motor pistons will be in the ratio of 1, 2, 4 and 8 and consequently by permutation any position corresponding to a value of from 1 to 16 may be attained.

The details of the mechanism are illustrated in Figures 37, 38, 39 and 40. By reference to these figures it will be seen that the abutment cylinder 132 is mounted to slide on a piston 132$^a$ being held against rotation thereon, and the long springs 134 attached to the cylinder and to a fixed part of the frame 134$^a$ serve to return the abutment and cylinder to normal position. The cylinder 132 is provided with a downward extension 132$^b$ (shown in perspective in Figure 37 and in section in Figure 38) which is adapted to travel in a path in alinement with a fixed stop or abutment 295, and this path of travel is adapted to be intersected by a series of movable abutments or interponents which are moved into and out of the path of the projection 132$^b$ by the motor pistons before referred to. Conveniently, each of the movable abutments or interponents 296, 296$^a$, 296$^b$, and 296$^c$ are mounted to slide and oscillate on fixed rods or shafts 297, and they are made of such length that they will represent values in the ratio of 1, 2, 4 and 8, respectively, so that, should the interponent 296 be turned in front of the projection 132$^b$, the abutment 131 would be arrested in its forward movement, to position the stepped stop at the fifteenth step (corresponding to two spaces in the line), and should the interponent 296$^a$ be in position it would be arrested with the stepped stop in the fourteenth position (corresponding to three spaces in a line) and should both the interponents 296 and 296$^a$ be in position, it would be arrested at the thirteenth position (corresponding to four spaces in a line). By permutation, therefore, the proper interponent or interponents may be thrown into position to position the abutment 131 and arrest the stepped stop at any desired position. Each of the movable abutments or interponents is formed with a long toothed gear segment on its hublike portion surrounding the rods or shafts 297 and these gear segments mesh respectively with racks on the upper portions of motor pistons 298, 298$^a$, 298$^b$ and 298$^c$ adapted to be operated by compressed air or other motive fluid in response to signals in the record as will be hereinafter explained. The motor pistons are adapted to be depressed by springs 299, and when elevated so as to turn the movable abutments or interponents into position for co-operation with the projection 132$^b$ they are caught and held in their elevated position by latches 300 pivoted on the fixed frame and loaded by springs 301 so as to snap into recesses 302 in the pistons when the latter are elevated. When any movable abutment or any interponent is moved into the path of the projection 132$^b$, the interponent will be carried forward with the projection until arrested by the fixed abutment 295 or by one of the other interponents which is turned into position in advance of it and the longitudinal movement of which is arrested by the fixed abutment 295.

For releasing the motor pistons 298, the catches or latches 300 are preferably made in the form of bell crank levers, the outer arms of which project through slots in longitudinally movable bars 303 which at their outer ends are connected by a cross head 304. The cross head 304 is provided with a vertically movable pin 305 normally held up by a spring 306 but adapted to be depressed by a lever 307 pivotally mounted on the fixed part of the frame and operated by a motor piston 308. In construction the latter corresponds to the motor pistons 298 and receives its motive fluid through pipe connections, to be hereinafter described, in proper time to release the latches for restoring the parts to normal position before a resetting operation of the stepped stop abutment and stepped stop itself. When the motor piston 308 is operated it depresses the spring-pressed pin 305 so that its lower end projects into the path of an arm 309 on a rock shaft 310. The rock shaft 310 is provided with a second arm 311, to which is jointed the upper end of a connecting rod 312 (see Figure 9). Rod 312 extends down and is jointed to a lever 313 adapted to be operated by a cam on the cam shaft 103 at a proper time during each revolution of the machine. With this arrangement it will be seen that normally the oscillation of the arm 309 performs no function whatever and it only becomes effective when the pin 305 is depressed as shown in Figure 40 with the result that a depression of the pin through the operation of its motor piston controls the release of the interponent motor pistons and the timing of such release is brought into accord with the operation of the machine and will invariably occur in that part of a revolution which is preliminary to the resetting of the stepped stop.

When the stepped stop is properly positioned preliminary to the composition of a line it is locked in such position by a locking pawl 137, Figures 22 and 24, normally held in operative or locking position by a spring 138 but adapted to be withdrawn by a motor piston 139, there being a spring 140 interposed between the piston and the pawl arm to permit of the piston invariably making a full stroke, inasmuch as it is utilized as a valve for controlling the motive fluid to the cylinder 132 for operating the locating abutment 131 for the stepped stop, all as will be hereinafter described.

The intermediate stop bar 47 before referred to, the position of which, determines the movement of the wedges in accordance with the number of justification bodies or spaces in a line, is adapted to be operated by a motor mechanism embodying two opposed cylinders 141 and 142 (Fig. 8ª) the pistons of which cylinders are connected by rack bar 143 meshing with the upper side of a pinion or gear wheel 144, said pinion on its lower side meshing with the rack 118 on the slide 119 carrying the stop bar 47. The motor mechanism embodying the cylinders 141, 142 and their pistons is operated each time a space or justification body is to be formed, and the motive fluid for operating the said mechanism is controlled in response to the proper signal in the record through valve and pipe connections to be presently described. The gear wheel or pinion intermediate the racks 143 and 118 on the slide 119, is shown in Figures 8ª and 12, and in perspective in the diagrammatic view in Figure 35, the outside appearance of the cylinders 141 and 142, together with a portion of the rack bar 143 being shown in perspective in Figure 6, from which a correct knowledge of the general appearance and location of these parts will be readily obtained.

Reference has hereinbefore been made to the fact that the control of the selecting devices for the wedges, is in response to space or justification body signals in the record, shifted from the selecting devices for dimensioning normal predetermined size bodies to the mechanism for dimensioning justification bodies and such shifting of the control is effected by moving the levers 74 so that the ends 73 of said levers will engage either the selecting levers 70 or the secondary selecting levers 92. The mechanism for effecting the direct shifting will now be described.

The shaft 75 on which the levers 74 are pivoted, it will be remembered, is mounted on the upper ends of links 79 and is capable of moving either vertically or laterally. This shaft is connected by end links 145, see Figures 9, 10 and 15, with upwardly extending arms 146 on a rock shaft 147, and this rock shaft 147 is provided with a third arm 148 to the end of which a long rod 149 is connected, preferably through a yielding connection formed by a spring 150. Rod 149 at its upper end is jointed to a justifying body or space lever 151 preferably lying substantially parallel with the centering pin lever 7, as will be seen by reference to Figures 2 and 25. This lever is normally held down at the rear end by a spring 152, and the upper ends of the arms 146 on the rock shaft 147 are adapted to work in slots or openings in the fixed cross piece 93 of the frame, whereby their movement in each direction is limited. Obviously, elevation of the rear end of lever 151 will result in turning the rock shaft from the position shown in Figure 9 to that shown in Figure 10 and the means (levers 74) for operating the selecting levers will be correspondingly shifted from the main selecting levers to the secondary selecting levers, and vice versa.

When the levers 74 are in the position shown in Figure 9 for co-operation with the main selecting levers 70, upward movement of the pivot 75 of the levers will, when no apertures are present in the drum 78 for the entry of pins 76, cause the upturned ends 73 to elevate the levers 70. When the levers 74 are in the position shown in Figure 10 for actuating the secondary selecting levers, they are preferably brought into position for co-operation with shoulders 76ª at their outer ends whereby the outer ends will be held down and only the inner ends can rise, but inasmuch as only those secondary levers which it is desired to have actuated are in position to be actuated the necessary selection will be effected without regard to the apertures in the drum, although it is obvious that apertures may be provided for that purpose should it be so desired, or, in fact, other known means responsive to signals in the record may be utilized for accomplishing the same ends.

The lever 151 is pivotally mounted on a bracket 152ᵃ (Figure 2) on the centering pin lever, and at its forward end is bifurcated at 153. This bifurcated end is adapted to co-operate with a retaining rod 154 pivotally mounted at the lower end in a support 155 connected with the fixed framework, as shown in Figures 4 and 30, and in section in Figure 25. A bell crank lever 156 adapted to be operated by a motor piston 157 serves to move the retaining lever 154 into a position where its adjustable head 158 will cooperate with the bifurcated end of the lever 151, thereby holding the forward end of the lever down and as the pivot of the lever is lifted by the upward movement of the centering pin lever, the rear end will be elevated and the shifting of the control from one set of selecting members to the other will be effected. The piston of the motor 157 responds to a space or justification body signal in the record.

It may here be remarked that the rod 154 and its bell crank lever 156 together with pull rods 159 and 160, with their operating bell crank levers 161 and 162 and motor pistons 157ᵃ and 157ᵇ correspond closely in construction to the parts heretofore employed for shifting the transfer block and for moving the justification wedges into position to be set. Mechanism for this purpose is well illustrated in the patent hereinbefore referred to, No. 625,998, in Figure 34 of the drawing, said parts being numbered in that patent 160, 163 and 175, but in the present instance the bell crank lever 161 responds to a pump lock signal in the record instead of to a justification signal, as heretofore, and the bell crank lever 162 responds to a galley trip signal in the record instead of to another justification signal, as heretofore. The pull rods 159 and 160 are adapted to cooperate with slots 163, Figure 1, in a slotted plate carried by the forward portion of the centering pin lever, and whenever they are in engagement therewith the pull rods will be lifted. Normally, however, all of the rods 154, 159 and 160 are held out of engagement with their co-operating parts on the centering pin lever and lever 151, respectively, and are only thrown into engagement therewith in response to the proper signals in the record.

The pull rod 159 at its lower end is pivotally connected with one arm of a bell crank lever 164 mounted in fixed bearings and the other arm of which is adapted to engage a pump lock slide 165, which at its lower end engages a pin 166 mounted in the pump lock levers 167, having the pump lock 168 pivotally connected with their lower ends.

The other pull rod 160 is pivotally connected with a similar bell crank lever 169, one arm of which co-operates with the head 170 of a galley trip slide or pin 171 normally held retracted by spring 172 (Figs. 25, 30 and 31) the arrangement being such that the pump lock may be operated independently of the galley trip but whenever the galley trip is operated the pump lock will necessarily be operated, this result being attained by mounting the head 170 on the galley trip rod 171 in such relation to the slide 165 that, whenever the head 170 is advanced the slide will be advanced in unison with it, although the slide may be advanced independently, in which instance it will be returned to normal position by a spring 173.

The galley trip rod 171 operates as heretofore to trip the catch lever and permit the galley mechanism to come into operation and the pump lock 168 also operates in the well known way; that is to say, when the collar or enlargement forming a part of the pump lock is in a position to co-operate with the end 284 of the latch 285, the latter will be lifted out of engagement with the lever 286, thereby disconnecting the levers 286 and 287, under which circumstances the lever 286 will make an independent movement and the lever 287 which controls the pump will remain inactive. This part of the mechanism is described herein in order that its relation to the commercial machine may be more readily comprehended and it is of course subject to considerable variation or modification in details of construction, the essential object to be attained being that the machine shall have a capacity for locking out the pump and tripping the galley, but when the galley trip is operated the pump must also be locked out of operation, while the converse is not true; that is to say, the pump may be locked out of action without tripping the galley, as, for example, when, during the formation of a line, no cast is desired during one or more revolutions of the machine.

The motor mechanism heretofore described is all operated preferably by elastic fluid pressure or compressed air, and, before taking up a description of the pneumatic system relating to the parts of the machine so far described, it is believed a better understanding will be had if the mechanical construction and control of certain of the valves is first described, inasmuch as the inter-dependent relation of the parts is largely effected through simultaneous or successive valve movements and which, as is well understood in this art, may be made to occur with extreme rapidity, and although the parts may be operated successively, the final results may be almost instantly accomplished.

Referring to Figure 12, it will be seen that below the motor piston block 100 there are located three mechanically operated valves 174, 175 and 176. The valve 174 controls the supply of air to the stepped stop lock and motor cylinder 132 while the valve 175 (Fig. 8ª) controls the supply of air to the motor cylinders 141 and 142 for moving the intermediate stop bar each time a justification body or space signal occurs in the record, while the valve 176 controls the supply of air to the motor mechanism for changing the set which mechanism has not been heretofore referred to but will be hereinafter described in connection with the secondary dimensioning mechanism. Each of these valves in the form shown is an ordinary slide valve of the D-valve type; that is to say, assuming that constant pressure is in the chamber around the valve, a movement of the valve in one direction will admit pressure to a suitable pipe connection, while a movement of the valve in the opposite direction will cut off the supply and permit exhaust from said pipe connection. Said valves are all adapted to be operated by sliding valve stems 174ª, 175ª and 176ª, respectively, working in the valve block 177 (Figure 15) and projecting at the end beyond said block and arranged for co-operation with the upwardly extending ends of levers 178, 179 and 180, respectively.

The levers 178 and 179 extend below their supporting bracket 181 (Figures 9, 10 and 15) and into position to co-operate with mechanically operated connections driven by cams on the cam shaft 103, but under the control of mechanism which will establish or break the operating connections in response to the signals in the record before referred to.

Referring particularly to Figures 8ª, 9, 10 and 15, it will be seen that a pair of links 182 and 183 both adjustable in length, are pivotally connected with a pair of levers 183ª, 184, adapted to be oscillated by cams 185 on the cam shaft 103, movement of the levers in a direction to hold their rollers against the cams being effected by springs 186. The links 182 and 183 at their ends opposite the levers to which they are jointed are provided with slots for the reception of pins on the lower ends of the levers 178 and 179. The slots are both right angle slots, the slot 187 in the link 182 being provided with a downwardly extending part 188 and the slot 189 in the link 183 being provided with an upwardly extending part 190. Springs 191 normally tend to hold the links elevated, with the result that the link 183 is held in such position that it may reciprocate without moving the lever 178, unless the link is depressed so that the pin in the lower end of the lever 178 will enter the upwardly extending portion 190 of the slot. The contrary is true of the link 182, for, in this instance, the spring tends to lift the link so that the pin in the lower end of the lever 179 will enter the downwardly extending portion 188 of the slot and consequently the lever 179 will be operated and its valve moved. Normally, however, the link 182 is held down against the tension of its spring by a push rod 192 which, at its upper end is connected with an arm 193 on the rock shaft 147, but the connection between said push rod 192 and the link 182 is a slot and pin connection 194 which will permit the link to remain depressed under certain conditions to be presently named, even though the rock shaft 147 be oscillated in response to a space or justification body signal in the record, as before described. The condition referred to is one in which but a single justification space or body is to be formed in the line, under which circumstances the intermediate stop bar 47 will remain in its normal position, as shown in Figure 9, and the selected wedges will advance a full stroke at the time when a space or justification body signal is presented. The mechanism for accomplishing this result embodies a piston valve 195 (Figures 6, 18 and 35), the stem 196 of which is adapted to be struck by the projection 197 on the stepped stop slide or carriage 123, whenever the latter is at its position of extreme advance, and this is always the position which it assumes whenever the locating abutment 131 is moved outwardly to its extreme position in response to a signal for a single space or justification body. When the projection 197 on the stepped stop carrier strikes the valve stem 196 it results in the admission of motive fluid to a motor cylinder 198 located immediately above the link 182. The piston 199 of said cylinder is connected through a connecting rod 200 with the said link to hold the said link down against the tension of its spring 191, even though the rock shaft 147 has been oscillated and would normally permit the link to rise and the valve 175 to be operated.

The second link 183 is normally held up by its spring 191 so that it will be ineffective for operating the valve lever 178, but it is adapted to be pushed down by the piston 201 of the motor cylinder 202 when motive fluid is admitted to said cylinder and this occurs simultaneously with the admission of motive fluid to the motor piston 114. The latter, it will be remembered, actuates the lever 113, for permitting the slide 110 to engage the secondary selector lever restoring mechanism. When the valve actuating lever 178 and its valve are actuated motive fluid is admitted by the valve to the piston valve 139 controlling the stepped stop lock 137 and through said piston valve motive fluid is admitted to the motor cylinder 132 for advancing the movable abutment 131 controlling the setting of the stepped stop. The pipe connections will be hereinafter specifically described.

*Secondary dimensioning means.*

The primary dimensioning or dimension adjusting means heretofore referred to and embodying the series of wedges proportioned in the relation of 1, 2, 4, 8, 16, 32 and 64, respectively, or any other primary dimensioning means, are usually designed for a certain set size of type body. In machines as heretofore proposed or made, a change in the set size of the type bodies has necessitated a change in the primary dimensioning means, but according to the present invention a secondary dimensioning means is introduced between the primary dimensioning means and the mold, said secondary dimensioning means having the capacity for varying the body sizes of the type proportionately or a certain proportion of the normal size; that is to say, each body size may be varied any desired amount, but the variation will always be in proportion to the normal size, a narrow body being varied in actual dimension less than a wide body, the correctly proportioned variation being preserved and the extent of variation depending upon the setting of the secondary dimensioning mechanism.

The secondary dimensioning mechanism, preferably employed, although it is subject to considerable variation, as will be apparent to those skilled in the art, takes the form of a lever, the angularity of which is determined by the primary dimensioning means, and the application of the force for setting the lever through the primary dimensioning means therefore represents the power applied to the lever. The fulcrum of the lever, as well as the point of application of power, are preferably made adjustable with relation to the load center which determines the ultimate movement imparted by the primary to the secondary dimensioning means, although it will be obvious that this arrangement may be reversed, the point of application of the load being made adjustable with relation to the fulcrum and point of application of the power. The effect produced by either arrangement is one well understood by mechanical engineers and, therefore, in describing the particular arrangement illustrated, it will be understood that it is not intended to limit the invention in this respect.

The adjustment of the relation of the fulcrum, load and point of application of the power to the differential lever arrangement constituting the secondary dimensioning means may be controlled manually or both manually and automatically and in order that the variation in this relation may preserve the proper proportions and a uniformly acting lever at all points of adjustment, the arrangement is such that the three centers, i. e., the fulcrum load center and power center of the lever are always in alinement. To accomplish this end without permitting of any yielding of the parts such as would introduce an element of uncertainty or irregularity in action, segmental bearings are provided, the pivotal centers of which are brought into alinement and the adjustment for changing the relation of the centers is effected by relative movement in a plane coincident with this alinement.

Obviously a double lever arrangement may be employed this being especially desirable where variation in the dimensioning, both larger and smaller than the normal dimensioning, is to be provided for, one lever being designed to effect variation to produce smaller dimensioning and the other to produce larger dimensioning than normal. With the use of a double lever arrangement it becomes possible to prevent any looseness or lost motion, inasmuch as pressure on the bearings and bearing surfaces may be always maintained in the same direction; in other words, a lever is never changed from one order to another.

Referring now particularly to Figures 7, 13, 14 and 36, it will be seen that the movable abutment 43 which is positioned by the primary dimensioning means or wedges is mounted in a transversely movable carriage preferably comprising top and bottom pieces 203, Figure 7, located above and below the bars 39 and 40 of the abutment frame and intermediate pieces 204 working between the parts 39 and 40. The proximate faces of the parts 204 form a slideway for the abutment 43. The abutment 43 rests against the parallel face of the first intermediate spacing block 41 of the wedge assembly, and at its opposite end is adapted to engage one edge of a member 205 pivotally supported on a movable support 206 pivoted at 207 on the abutment slide or carrier 204 and normally loaded by a spring 208 so that the member 205 will be constantly pressed toward the abutment 43. While the member 205 is pivotally supported on its carrier 206, the axis of the pivotal support does not coincide with the axis on which the effective lever is adapted to turn, for, in the preferable mechanical arrangement of the parts, the axes constituting the fulcrum, the load and the power of the lever must all be brought into alinement. This result is attained in a convenient and compact mechanism, free from lost motion or yielding under heavy strain, by greatly enlarging the pivots and making them in the form of segments. The pivot and the effective lever, therefore, are formed by a large segment 209 which takes its bearing in a slide 210. The face of the segment 209 with which the member 205 makes sliding contact is a straight face and will permit the said member, together with its carrier 204 to be shifted longitudinally while the segment 209 is held against such movement, with the result that the axis on which the lever turns will be maintained in a fixed position regardless of such longitudinal movement. This axis which is the center on which the segment 209 is struck coincides with the face of the member 205 on the right hand side in Figures 13 and 14 and other pivotal segments 211 and 212 are also provided with straight faces for engagement with the last mentioned face. The segment 211 is mounted to turn in the forward end of the abutment 43, while the segment 212 is mounted to turn in the carrier 204, and the centers on which these segments turn coincide with the face of the lever with which the segments engage. All three of the centers on which the segments turn are, therefore, brought into alinement and will remain in alinement, regardless of the angular position of the lever. The center of the segment in the abutment 43 may be considered as the point of application of the power, the center of the segment 209 as the point of application of the load, and the center of the segment 212 as the fulcrum. From this it will be seen that the lever is a lever of the second order, and a movement of the abutment 43 will move the slide 210 a less distance than the movement of the abutment and the movement may be increased or diminished by adjusting the abutment through the medium of its carriage 204 longitudinally of the lever.

Provision is made for shifting or adjusting the abutment 43 through its carriage 204 either manually or automatically at will, and this adjustment is desirable, because of the fact that in initially setting the machine the leverage should be adjusted to conform to the desired set of the composition, and at the same time in practical operation it sometimes becomes desirable to temporarily change the set, during the composition even of a single line, and to then return to the set which may be normal for the work being performed.

Figure 5:
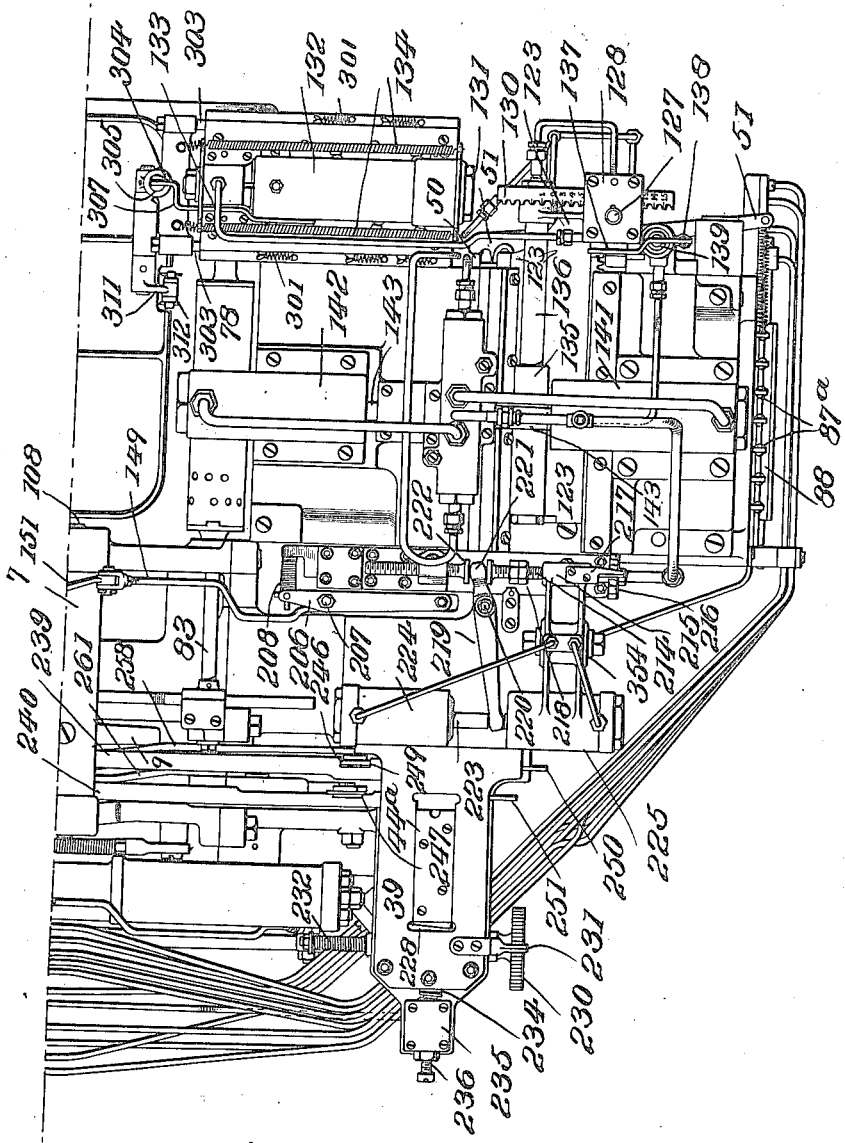

By reference to Figure 7 it will be seen that the abutment carriage 203—204 is provided with an upwardly extending boss 213, and an adjusting screw 214 is threaded through the boss 213. At its near end the said screw 214 is adapted to slide longitudinally in a fixed bearing 215, and at its outer end carries a head 216 by which the screw may be turned manually, said head having graduations thereon for registry with a fixed finger or gage 217. The head 216 constitutes an abutment for limiting the sliding movement of the screw in one direction and an adjustable abutment formed by lock nuts 218 forms an abutment for limiting said movement in the opposite direction. The screw 214, together with the abutment carriage, is normally held in the position to which it is adjusted manually by a lever 219 mounted on a fixed pivot 220 and having a forked end 221 engaging a pair of collars 222 on the screw 214. The further end of the lever 219 is operatively connected with a piston rod 223, Figures 5 and 7, and the piston rod 223 is a rod connecting pistons in opposed motor cylinders 224 and 225. Pressure is normally maintained in the cylinder 224 so as to hold the screw in the position shown in Figure 7; that is to say, with its outer abutment formed by the head 216 in engagement with the fixed bearing through which the screw works. With this arrangement the manual setting of the leverage is permitted and by automatically controlling the admission of air to the motor cylinders 224 and 225, the leverage may be instantly changed so that the size of the set may be changed from one set to another, and by adjusting the relation of the screw abutments 216 and 218 the relation of the sizes of the set may be varied.

Obviously pressure may be normally maintained in the cylinder 225 instead of in the cylinder 224, and shifted to the cylinder 224 when the size of the set corresponding to that cylinder is desired, the normal set in this instance corresponding to the set which will be formed with the lever in the position into which it is advanced by the motor cylinder 225.

Air pressure for operating the pistons in the cylinders 224, 225 reaches the cylinders through a reversing valve 354 which is controlled manually so as to maintain the pressure normally in one or the other of the cylinders, and the admission and exhaust of air to the cylinders is controlled by the valve 176, hereinbefore referred to.

The valve 176 is the first valve in the block 177 and its ports are so arranged that, when the valve is moved in one direction, pressure will be admitted to one cylinder and exhausted from the other cylinder, but when it is moved in the opposite direction the converse will be true. Its valve stem 176$^a$ projects at the opposite side of the block 177 from the valve stems 174$^a$ and 175$^a$ and its operating lever 180 (see Figure 15) is relatively short and preferably in the form of a bell crank lever, one arm of which engages the valve stem and the other arm of which projects horizontally and is provided with a pin for co-operation with slot bearings in the lower ends of the links 289 and 290. The link 289 at its upper end is jointed to a lever 74$^a$ which, in general construction, corresponds to the levers 74 save that it is not adapted to co-operate with a selector lever or a secondary selector lever, but, on the contrary, is adapted solely for operating the valve. At is forward end the lever 74ª is provided with a pin 76 adapted to co-operate with the cylinder 78 or with an aperture formed in that cylinder at a proper position on its periphery. The link 290 is at its upper end jointed to a lever 291 pivoted on a fixed center and coupled with the right hand end of the lever 74ª by a link 292. While each of the links 289 and 290 are provided with a slot 289ª and 290ª, respectively, for co-operation with the pin 180ª on the bell crank lever 180 the normal position of the links is such that the pin will normally rest in the upper end of the slot in the link 289 and in the center of the slot in the link 290 (see Figure 15ª) the result being that downward movement of the link 290 will first take up the lost motion between the pin and the upper end of the slot and then move the pin down and shift the valve leaving the pin at the center of the slot in link 289 whereupon the link 290 may return to its initial position without moving the pin and valve and the pin will then be at the lower end of the slot in link 290. The pin and valve are moved in the opposite direction by upward movement of link 289. Such movement of the link performs the same relative functions, i. e., it first takes up the lost motion between the pin and the lower end of the slot (in link 289) then moves the pin up to the center of the slot in link 290 whereupon link 289 may return to the position shown in Figures 15 and 15ª leaving the valve and pin in the position shown.

The lever 74ª is normally loaded by a spring 293 whereby its rear end or that end to which the link 289 is attached is normally held in contact with a fixed pin 294. This pin 294 constitutes a fulcrum for the lever 74ª when an aperture in the cylinder 78 is in position for the entry of its feeler pin 76. When the feeler pin enters the aperture in cylinder 78 the link 289 remains practically stationary, but the lever 291 will be operated to depress link 290 to operate the valve as before described. When no aperture is present for the entry of the feeler pin 76 on lever 74ª, the rear end of the lever 74ª and link 289 will be lifted and the valve returned to initial position, or if the valve is in initial position the lever and link will make an idle stroke. With this arrangement the pin in the valve operating lever 180 always occupies a position at the center of the slot in the link which is to operate it and the other link is then free to make an idle movement or a movement without affecting the position of the valve.

With this arrangement it will be seen that in response to a proper signal in the record the cylinder 78 may be set to a position where the valve will be shifted in either direction so that the set size may be changed through the operation of the secondary dimensioning mechanism and this operation may be made to take place during the formation of any desired characters; thus, in a single line we may have characters of two different set sizes, without interfering in any way with the proper justification of the line or the composition of the same.

The effect of the use of a lever of the second order is, as before stated, to proportionately reduce the dimensioning effect of the primary dimensioning means or wedges, but under some circumstances it is desirable to increase the dimensioning effect, and this is preferably accomplished by the arrangement shown in Figure 36, wherein it will be seen that to the left of the lever arrangement described, there is provided a reversed leverage arrangement employing a lever of the third order; that is to say, to which the power is applied between the load and the fulcrum. For this purpose the member 205ª is adapted to co-operate with a large segment 209ª reversely arranged with relation to the segment 209 and journaled in the opposite end of the slide 210. A secondary abutment 43ª is mounted in a carriage or carrier 204ª corresponding in construction to the carriage or carrier 204, and the fulcrum segments 211ª and 212ª are mounted in the secondary slide 43ª and carrier or carriage 204ª, respectively. The center of the application of the load in this instance is the axis of the segment 209ª while the fulcrum is the axis of the segment 212ª and the load is the axis of the segment 211ª. The arrangement is simply a reversal of the arrangement first described and the parts are in opposition thereto. In operation, if the centers of the segments 209 and 211 are made to coincide, no diminishing dimensioning will result and the centers of the segments 209ª, 211ª and 212ª may be adjusted so as to increase the dimensioning effect. In every instance the secondary dimensioning means will produce a change in dimensioning effect which is in exact proportion to the effect produced by the primary dimensioning means; that is to say, in making a small body or type, the secondary dimensioning means will make a correspondingly small change, and in making a large body or type the secondary dimensioning means will make a correspondingly large change, and hence, in the final results, the proportion is always preserved and at the same time, with the mechanical arrangement described there is no opportunity for lost motion or yielding of the parts through flexure or compressive strains.

The carriage 204ª may be adjusted by a screw adapted to be turned manually and corresponding to the screw 214 for adjusting the corresponding carriage 204. Illustration of this adjusting mechanism for the carriage 204ª is not deemed necessary, as it would be merely a duplication of the adjusting mechanism shown in connection with the carriage 204.

The slide 210 is conveniently mounted in slideways, 226, and it is preferably divided into two parts with interposed springs 227 which serve to keep the several elements under constant pressure so that they cannot by any possibility escape or admit dirt between their working faces which might cause irregularity in operative results.

In addition to the parts just described, to-wit, the lever mechanism and slides, etc., located in advance of the movable abutment 43, there is interposed between said abutment 43 and said so-called fixed abutment 44, an anchoring abutment 44ª rigidly attached to the main frame, and between this anchoring abutment and the abutment 44 there is an adjusting wedge 228 adjusted manually, so as to increase or decrease the distance between the face of the anchoring abutment 44ª and the face of the slide 210 or the secondary movable abutment 43ª of Figure 36. In effect, the abutment 44ª and the abutment 44 are one, and for convenience in effecting adjustment to take care of inaccuracies in manufacture, the wedge 228 is interposed and adapted to be moved by a screw 229 having a knurled head 230 with which a retaining and indicating finger 231 is adapted to co-operate. Lost motion may be eliminated and the wedge assisted in its movement in one direction by a coil spring 232 shown clearly in Figures 13, 14 and 36. The abutment 44ª is provided with top and bottom extensions forming ways 233 for the top plate 39 and bottom plate 40 before referred to, and as shown clearly in Figures 6 and 11.

The said top and bottom plates 39 and 40 constituting the frame with the fixed and movable abutments, wedges, etc., all mounted therein, is as a unit free to float, as it were, in the fixed frame of the machine, and in order to hold it in a definite normal position, a spring 234 is interposed between the left hand end of the floating frame and the fixed frame of the machine. This spring is conveniently housed in a box 235, which box is provided with an adjusting screw 236 by which the tension of the spring may be increased or decreased as desired.

The space which is dimensioned is the space between the part 44ª of the fixed abutment 44 and the slide or part which is in effect an extension of the movable abutment 43, to-wit, the slide 210 of Figures 13 and 14, or the secondary movable abutment 43ª of Figure 36. In order to transfer the dimension of this space across the machine to a point where it will be available for determining the position of the mold blade a dimension transferring mechanism is employed, which mechanism will be now described.

*Dimension transferring mechanism.*

Owing to limitations due to construction and arrangements of parts, it has been found desirable to locate the primary dimensioning means at a point remote from the mold and to employ a transfer mechanism between them having the capacity and function of transmitting accurate dimensions. Such an arrangement not only has manufacturing advantages, with accessibility of parts when assembled, but it has the further advantage of permitting the introduction of adjustments for varying uniformly the sizes of the bodies so that extreme accuracy may be attained and the normal body size or set of the font changed without affecting the capacity of the primary dimensioning means to vary the size of the bodies in accord with the size of the character or justification spaces to be produced.

In a transfer mechanism for the purpose stated, where extreme accuracy is essential, possible variation, due to temperature changes and differences in momentum acquired by the moving parts in controlling adjustments of different magnitude must be off-set or nullified. With the above limitations in mind, the objects sought have been attained in a practical way by the employment of a double wedge or incline arrangement adapted to admeasure the adjustment effected by the primary dimensioning mechanism, the relative movement of the wedges varying in accord with the adjustment effected by the primary dimensioning mechanism and the variation due to difference in relative movement and consequent inertia being nullified and the result rendered uniform by a secondary relative movement of the wedges and final admeasuring adjustment under a uniform pressure and at uniform relative speed, which secondary movement and final adjustment recurs after each initial adjustment and consequently no variation, due to difference in inertia during initial adjustment, can affect the final adjustment.

The relatively movable wedges forming the admeasuring mechanism are each formed on or connected with a bar which at its opposite end is provided with or connected to an incline or wedge which inclines in the same direction as does the wedge at the measuring end. The wedges and bars form a couple and relative movement determined by the position of the abutments set by the primary dimensioning mechanism serves to position an abutment for determining the position of the final dimensioning device or mold blade. The two members of the couple expand and contract equally under variations in temperature and consequently temperature variation does not produce inaccuracy in operative effect nor does the length of the couple make any difference in this respect, hence the primary and final mechanisms may be located at widely separated points.

The mechanism preferably employed and adopted for illustrating this portion of the invention embodies (see Figures 8, 13, 14 and 29) a pair of wedges 237 and 238 located between the fixed abutment 44—44ª and movable abutment 43—210 adapted to be set by the primary dimensioning mechanism or by the primary and secondary dimensioning mechanisms. These two wedges are formed on the ends of bars 239, 240 extending across the machine and having at their opposite ends wedges 241, 242 located between a fixed abutment 243 and a movable abutment 244, the latter constituting the stop for the mold blade 3, whereby its rearward movement and the set dimension of the type body is determined.

The wedges 237, 238 and 241, 242 are preferably formed with their abutment engaging faces parallel and the proximate faces inclined, the arrangement being such that relative movement in one direction will cause relative lateral movement away from each other and vice versa simultaneously at both ends of the couple and by forming the inclines at equal angles accurately equal dimensioning results will be effected at opposite ends of the couple.

For operating the wedges the bars are provided with seats 246, 247 for the reception of projections 248, 249 on actuator slides 250, 251 guided in the frame at one end and at the opposite end pivotally connected with bell crank levers 252, 253, both mounted on fixed axes. The lever 252 is a relatively long lever and normally urged by spring pressure in a direction to advance the wedge 237 in a direction to co-operate with the wedge 238 and fill the space between the dimensioning abutments. The lever 253 is preferably a short lever having on one arm a roller pin 254 working in a cam slot 255 in the end of an arm 256 pivoted on a fixed center, conveniently the journal for the lever 252, all as shown in Figures 27, 28 and 26. A power lever 257 operated by cams on the cam shafts 28 of the machine in proper timed relation to the other mechanisms is connected with the lever 252 by a link 258 which forms a lost motion connection adapted to retract the wedge and to allow it to advance under the pressure of its actuating spring. The lost motion connection is conveniently formed by a pin 259 working in a slot 260 in the link 258, Figure 27. The arm 256 is also connected with the lever 257 by a lost motion connection formed by a link 261 pivotally connected with the arm and having a slot 262 for a pin on the end of the lever 257, but in this case the lever 257 moves the arm in each direction with a dwell in the movement of the arm after each reversal in the direction of movement of the lever. The shape of the cam slot 255 is such that the wedge 238 will be held against recession under the pressure or impact of the wedge 237, but when the lever 253 is moved it will cause the wedge to recede for a limited distance and after the dimensioning operation and the recession of the wedge 237 the reverse movement of the lever will restore the wedge 238 to advanced position.

A spring-pressed plunger 266 (Figures 26 and 27) bearing against the lever 256 is preferably employed to form a yielding resistance to the movement of the lever 256 to prevent overthrow and also to move or assist in moving the lever and wedge in one direction so that the return movement will take place as soon as the pressure of wedge 237 is relieved by its retrograde movement.

The operation will now be readily understood and is as follows: The relative position of the abutments having been set and the wedge 238 in its advanced position, the lever 257 advances, allowing the wedge 237 to seat between the wedge 238 and the abutment. Wedge 237 will move a greater or less distance, depending upon the space between the abutments and will acquire greater or less velocity, depending upon its range of movement, and, owing to the inherent elasticity of the metal, etc., a variable factor necessarily exists. Immediately after it is seated the wedge 238 is caused to recede and as the wedge 237 is now impelled to follow the wedge 238 by a constant and uniform force and the velocity of the two wedges is practically uniform, the parts will assume a definite relation to each other in the final seating which, in so far as momentum is concerned, is always uniform and the variable factor due to this variable force is nullified.

The follow-up movement of the wedge 237 is made uniform, preferably by a load represented by a spring, the tension of which is kept uniform by a weight. Conveniently, the lever 252 for advancing the wedge is a bell-crank lever and its horizontally projecting arm 252ª supports a weight 263 having an internal chamber for a coil spring 264 (Figure 26). A rod 265 having a head at the lower end of the spring passes up through the weight and is jointed to the arm of the bell crank lever 252. The weight is thus supported through the spring and will exert a practically uniform pressure on the wedge, regardless of the position of the wedge between the abutments.

The abutment or stop 244 for the mold blade 3 (see Figures 8 and 32 to 34, inclusive) is positioned by the wedges 241 and 242 at the ends of the couple or dimension transferring mechanism, and it preferably embodies a hublike portion 267 surrounding a fixed head pin 268 with an interposed spring 269 whereby the abutment or stop is held in contact with the wedges and the wedges are held in contact with the fixed abutment 243. The stop or abutment 244 is capable of rotation on the pin 268 and for this purpose it is conveniently formed with a gear section 270 with which a rack 271 is in mesh and said rack is adapted to be moved back and forth by hand to rotate the stop or abutment into proper position for one or the other of its abutment extensions 244$^a$, 244$^b$ or 244$^c$, to come into position for co-operation with the rear end of the mold blade. The stop extensions referred to are of different length or height so that by bringing the proper extension into position, the device may be adapted for casting type of widely different size. The mold blade is reciprocated to discharge the type from the mold and is drawn back against its stop or abutment by mechanism which is in no wise essentially different from mechanism heretofore employed and well understood. For example, referring to Figures 1, 3, 4 and 32, it will be seen that the mold blade is connected through a coupling 272 with a mold blade operating rod 273 working through a fixed bearing in the main frame and adapted to be reciprocated by the usual bell crank lever 274, which latter derives its motion through a lever 275 (Figure 3) from cams on the cam shafts of the machine. The forked end of the lever 274 embraces a flat sided sleeve or collar 276 mounted on the mold blade operating rod 273. Said collar 276 is held against a shoulder 277 on the rod 273 and between that shoulder and the end of a sleeve 274$^a$ on the outer end of the rod adapted to be clamped in position by an end nut 278. Sliding on the ends of the rod and sleeve 274$^a$ are collars 279 and 280 between which the forked end of the lever 274 is located and permitted a limited independent movement. Both of the collars 279 and 280 are held in position by springs which will permit them to yield, the spring for holding the collar 280 being located between that collar and the end nut or collar 278 and the spring 281 for holding the collar 279 is located between the collar and a second sleeve 282, and the latter is held up to its work by a second spring 283 located between the end of the sleeve and the coupling 272, the arrangement being such that the mold blade is moved in each direction through the intermediary of a spring or springs and may be arrested in any position of its movement, while the operating lever continues to make a full stroke, and as a result the mold blade may be located through the dimensioning mechanism in any position necessary for forming a type of proper dimension in which position it will be held rigidly against any pressure which may be exerted in the mold and so as to secure accurate results.

*Pneumatic system.*

The record strip preferably employed and for which the machine is specifically designed is a strip of paper which is prepared in a keyboard machine or strip composing machine adapted to form in the strip apertures or perforations to furnish the desired information, as it were, to the casting machine. The particular keyboard or record strip composing machine for preparing the record strip itself for the machine of this application is disclosed in a contemporaneous application and forms no part of the present invention, but is is assumed for the present purposes that the record strip is prepared in any convenient or preferred manner by forming perforations therein which will admit air or motive fluid to the desired ducts for performing the several functions heretofore and hereinafter described. The prepared record strip is as heretofore fed over a cross girt having the terminals of the several ducts flush with its convex face and during each control period the record strip is clamped down on the cross girt by an air bar through which air is admitted and from which the air will pass through any perforations registering with the ducts and will become effective in operating the desired mechanism.

Referring particularly to Figure 35 the cross girt is indicated at 314 and the constant air supply is indicated by the short section of duct 315 which may conveniently be assumed to be part of the well known air bar indicated at 315$^a$ in Figure 1.

From each of the openings or duct terminals 316 in the cross girt, a duct extends down through the paper tower and in the machines as heretofore constructed, these ducts lead to the so-called B and C pin blocks indicated in Figure 35 at 317 and 318 and to the galley, space and pump lock motor cylinders or pistons which find their analogue in the present machine in the motor pistons 157, 157$^a$, 157$^b$. The pin blocks 317 and 318 correspond in construction and function to similar parts found in the previous machine, and as embodied in the patent first hereinabove referred to. Each block embodies a series of motor pistons or pins adapted to be projected when pressure is admitted to them and the particular pins projected serve to position the pin tongs which latter in turn position the matrix jaw stop rack, and the latter positions the matrix jaws whereby the die case or matrix carrier is moved to center the proper matrix over the mold.

In accordance with the present invention the ducts which lead from the cross-girt to the several motor pistons are branched at a point intermediate the cross girt and motor pistons above referred to, one branch leading to said motor pistons and the other branch leading to a valve mechanism for opening or closing the latter branches, the continuation of the branches beyond the valve mechanism leading to the several parts of the machine before described for dimensioning the mold. The valve mechanism serves as a means whereby the perforations or signals in the record strip in the same location with relation to the body of the strip may at one time perform one function and at another time perform an entirely different function; that is to say, a perforation located at a certain point in the record strip may set one of the pin block motor pistons in action, and do nothing else, and at another time it may, according to the setting of the valve, perform an entirely different function in connection with the dimensioning mechanism or parts associated therewith, and therefore a means whereby a perforation in the same location in the record may be made to perform either function becomes an important factor. For example, in one instance, a perforation at a given point in the record strip may perform, as above stated, one function, and by making the valve responsive to a signal in the record strip which is presented to the proper duct simultaneously with the presentation of the first mentioned signal the valve may be shifted and the other function of the machine controlled; thus, in combination with a valve shifting perforation a signal in the record strip in a given location may be made to perform a different function or control the operation of a different part of the machine from that which would be controlled or operated were the valve shifting perforation omitted.

In the particular machine adopted for illustrating an embodiment of the present invention, the setting of the mechanism for dimensioning the mold in the formation of justification bodies must take place preliminary to the casting of the bodies which will constitute the line and it so happens that the functions of this portion of the mechanism require but a limited number of ducts for supplying the motive fluid to the motor devices and hence it becomes unnecessary to utilize all of the ducts which lead to the pin blocks in order to perform these functions which may, for convenience, be termed the secondary functions of the signals in the record. In other words, as illustrated in the drawings, it is only necessary to control, by a separate valve mechanism such as that heretofore described, eleven of the ducts, a twelfth duct being utilized to shift the valve itself.

Referring again to Figure 35 of the drawings it will be seen that the group of ducts leading from the cross girt and indicated generally by the reference number 319 are provided with two branches, the branches $319^a$ and $319^b$ leading off to the pin blocks 317 and 318 and the branches indicated generally at $319^c$, leading down to a base or valve blocks 320. Eleven of these branches $319^c$ terminate in the valve face 321 of the block 320 in position to be closed by a sliding valve 322 or to register with ports leading through that valve whereby they are put into communication with continuations of said ducts. Seven of these continuations indicated at $319^d$ lead to the motor pistons 99 in the piston block 100 whereby the appropriate pistons will be operated to shift the secondary selector levers 92 from the position shown in Figures $8^a$ and 9 to position shown in Figure 10. Four of the continuations beyond the valve 322, indicated at $319^e$ lead to the motor pistons 298, $298^a$, $298^b$ and $298^c$, respectively, which latter, it will be remembered, as described in connection with Figures 37 to 40, control the position of the stepped stop abutment 131.

It is, of course, obvious that all of the thirty-one ducts leading from the cross girt may be similarly branched to control different functions of the machine when the valve 322 is shifted, and hence it is not desired to limit the present invention to the particular embodiment illustrated.

The valve 322 is connected with a motor piston in a cylinder 323 at the base of the paper tower as shown in Figures 1, 3 and 35, and this cylinder receives motive fluid through a branch of a duct 324 leading from a relay 325. The relay 325 contains a motor valve which is actuated against the tension of a spring or constant pressure by pressure admitted through a branch 336, leading from the end duct of the group 319 and which may, for convenience, be termed the justification duct. The other branch of this duct leads to the motor piston $157^b$ which, as heretofore explained, operates the pump lock, and, inasmuch as the valve 322 is only to be operated during that revolution of the machine when the pump is locked out of action, both branches of the duct are made to act simultaneously in performing their functions, one to lock the pump out of action and the other to shift the valve 322 in such wise that the branches of the other ducts necessary for setting the mechanism to determine the size of justification bodies will be in communication with the air bar. As a convenient arrangement of the relay 325, the motor valve therein, when operated through pressure admitted through the cross girt, in turn admits pressure from a constant air supply 326 to the duct 324 for operating the motor piston of the valve 322 against the pressure of a return spring, and simultaneously with the admission of air to the motor cylinder 323 the relay admits air through a duct 327 for performing several functions. First, it admits air to the motor piston 114, thereby shifting the lever 113 so as to permit the link for operating bar 110 to engage with the secondary selector lever returning mechanism, whereby any of said levers which have been theretofore shifted are returned to normal position, and those to be utilized during the formation of the next line will follow back with the return mechanism as heretofore explained. Secondly, through a branch duct 327$^a$ pressure is admitted to the motor piston 308, whereby the lever 307 (Figures 37, 38 and 40) is operated to depress the plunger 305 and thereby release the motor pistons 298, 298$^a$, 298$^b$, 298$^c$, respectively, preliminary to being reset through the medium of motive fluid admitted through the valve 322. Thirdly, pressure admitted through the ducts 327 and the branch 327$^b$ actuates the motor cylinder 202 to depress the piston 201 and link 183 so as to couple that link with the valve operating lever 178, which lever, it will be remembered, is adapted to operate the valve 174, but normally and when no pressure is admitted through the duct 327—327$^b$, the link is held elevated and, although mechanically operated at each revolution of the machine, it performs no function.

The valve 174 when shifted by the lever 178 admits pressure from the constant supply 326 to a duct 328 which leads to the motor valve 139, thereby actuating the latter to release the locking lever 137 for the stepped stop. The motor valve 139 in turn controls the admission of pressure from the constant supply 326 to the duct 133, leading to the motor cylinder 132 for the stepped stop abutment 131. The motor valve 139 is conveniently provided with a port 329 which is adapted to register with the constant air supply and duct 133, when the valve is in one position, and to put the duct 133 into communication with an exhaust port 330 when in the other position, whereby the stepped stop will be shifted at the time when the locking lever is disengaged from the rack 125.

The motor cylinder and piston 135—136 for directly shifting the stepped stop receives motive fluid through a duct 331 controlled by a valve 332 mounted to slide in a valve block 333 (see Figures 6 and 35). A branch 326$^a$, leads from the constant pressure supply 326 to the valve block 333, and when the valve 332 is in one position air is admitted to the stepped stop cylinder and piston 135—136, but when the valve is in the other position, the said piston is open to exhaust port 334. The valve 332 is conveniently operated mechanically by an operating link 335 sliding in the valve box, and at one end connected with one arm of a bell crank lever 336, the other arm of which co-operates with a cam on the shaft 29$^a$ (see Figures 2 and 6). The operating slide 335 is provided with upwardly extending projections 337 and 338 engaging the ends of the valve and a return spring 338$^a$ serves to return the valve and hold the lever against its cam. The valve may be operated at every revolution of the machine, but owing to the fact that the stepped stop is locked by its locking lever, except during the setting revolution, pressure admitted to the cylinder 135 will have no effect save when the locking lever is released, as before explained.

The valve 196 which is adapted to be struck by the projection 197 on the stepped stop carrier when the stepped stop is moved to its extreme position in one direction, receives air from the constant air supply through branch 326$^a$, which air pressure tends to hold the valve stem projected. When the stem is pressed inwardly against said air pressure, however, the valve is moved to admit pressure to the duct 339 leading to the motor piston 199 in the cylinder 198. The piston 199 is as before explained in connection with Figures 9, 10 and 15 connected with the link 182 for operating the valve lever 179, so that when the stepped stop moves to its extreme position, the link will be shifted so as to connect the valve operating lever with the power shaft of the machine through the levers and cams before described, thereby shifting the valve 175. When the valve is so shifted pressure from the constant supply 326 is admitted to the duct 340 and through said duct to one end of a relay valve cylinder 341. When the valve 175 is in normal position, as shown for example in Figure 35, constant pressure is admitted to a duct 342, which leads to the opposite end of said cylinder 341 and normally tends to hold the relay valve 343 in the cylinder at one extreme of its movement. The relay valve 343 controls the admission of pressure to the motor cylinders 141 and 142 for moving the stop bar 47 so as to advance the latter into position as determined by the stepped stop for arresting the selected wedges during the formation of each justification body and while the cylinders 141 and 142 might receive their motive fluid directly under the control of the valve 175, it is desirable that said cylinders 141 and 142 shall be of considerable power and consequently a relay valve is a convenient means for accomplishing the desired end and at the same time permitting of the employment of a small light valve 175. The relay valve 343 is designed to effect the direct control of the pressure to and from the cylinders 141, 142, and to perform this function, it is provided with inlet and exhaust ducts or ports, the inlet port 344 being in direct communication with the constant supply duct 326, and the ports for the ducts 345 and 346 being located on either side of said inlet port, and in such position that one or the other of said duct ports may be put into communication with the inlet port when the valve is shifted in one direction or the other, and at the same time, the duct not in communication with the inlet port is put into communication with one or the other of the exhaust ports 347. The valve 175, it will be remembered, is operated each time a signal is presented in the record for the production of a justification body, and pressure is admitted to the motor cylinder 142 to advance the stop bar 47 into contact with the stop on the stepped stop which has been positioned for determining the size of the justification body. Immediately upon the reverse movement of the valve 175 pressure is admitted to the cylinder 141 and the cylinder 142 is open to exhaust with the result that the stop bar 47 is instantly returned to its normal position where it serves as the direct abutment for arresting the movement of the dimensioning wedges when given a full or normal movement. In its advanced position, as determined by the stepped stop, it arrests the selected wedges in a position which is a proportion of their normal movement determined by the number of justification bodies included in the line being formed.

The means whereby the wedge carrier locking or clamping lever 51 is operated has been heretofore referred to as a motor piston 52. This motor piston receives its motive fluid through a duct 348 under the control of a valve 349. The valve 349 is open to constant pressure through a branch duct 326ᵉ, whereby it is held at one extreme of its movement and the duct 348 in communication with an exhaust port 350. The valve 349 is adapted to be moved against the pressure tending to hold it at one extreme of its movement by a projection 351 on a lever 352 adapted to be actuated by a cam on the shaft 29 (as shown in Figure 2). Spring 353 serves to hold the lever and projection normally retracted, and with the valve in position to keep the motor piston 52 normally open to exhaust. When the wedges have been positioned, however, and their dimensioning effect is to be secured, the lever and projection advance so as to shift the valve and admit pressure to the piston 52, with the result that, at this time the wedge carriages are all locked or clamped in position, thereby eliminating any danger of the wedges backing out of position during that period when they are subjected to extreme lateral pressure, such as is set up by the secondary dimensioning mechanism and dimension transferring mechanism, during the dimensioning operation.

The valve 176, which, it will be remembered, is operated by the lever 180, as described, in connection with Figure 15, is adapted to control the admission of pressure to the motor cylinders 224 and 225 for shifting the lever 219 for automatically changing the dimensioning effect of the wedges through the secondary dimensioning mechanism. This valve 176 is adapted to keep one or the other of the cylinders 224 and 225 in communication with the constant pressure supply. Which one of the cylinders depends upon the position of a reversing valve 354 through which the ducts 355, 356, leading to the cylinders 224 and 225, respectively, pass. The reversing valve is adapted to be turned manually so that the shifting of the valve 176 may be made to supply pressure to either one of the cylinders 224 or 225 at will, and consequently, the normal size of the dimension as determined by the secondary dimensioning mechanism may be either the large or the small size. The ducts 355 and 356 are adapted to be controlled by the valve 176 so that when the valve is in one position pressure is admitted to one cylinder 224, for example, and the cylinder 225 is open to exhaust. A shift of the valve 176 produces the opposite condition, namely, the cylinder 224 will be open to exhaust while pressure will be admitted to the cylinder 225, and by turning the reversing valve the relative conditions may be reversed.

From the foregoing description it will be apparent to those skilled in the art that in the operation of the machine successive bodies are produced in successive periods of time, each of which corresponds as heretofore to one revolution of the cam shafts. In the production of the line of composition there is one period or revolution of the cam shafts during which no body is formed, because the pump is, during that revolution, locked out of operation. This revolution occurs at the beginning or preliminary to the formation of the bodies constituting the line of composition, and, in the commercial machine, is commonly called the justification revolution.

In the machine of this application the pump is locked out of operation during this preliminary revolution, as heretofore, and parts are set for performing two functions when, during any subsequent revolution, a signal in the record is presented for the formation of a justification body. These two functions are, first, the setting of parts which will, when operated, select the desired wedges corresponding in value to the line shortage to be absorbed by justification, and secondly, the setting of parts which will arrest the movement of the wedges at a point which is a proportion of the normal movement equal to a normal movement divided by the number of spaces in the line.

Each revolution, when a non-justification such as an ordinary character body signal in the record is presented which is not a justification body, results in the die case being positioned to bring the proper matrix over the mold (this position being determined by the pins blown up in the pin blocks 317—318, as heretofore); the selection of the proper dimensioning wedges; and their operation a full or normal movement to position the mold blade for the size of the body to be formed.

Each revolution, when the signal for a justification body is presented, results in the positioning of the die case over the mold, the selection of the wedges to dimension the justification body, which wedges have already been designated during the preliminary revolution, and the operation of those wedges, until arrested by the mechanism which was set during the preliminary revolution to accord with the number of spaces or justification bodies in the line or portion of the line to be justified. This results in the mold blade being positioned in accord with the movement and value of the wedges for forming a body of proper size to absorb its proportion of the total shortage to be absorbed by the whole number of justification bodies in the line.

In the present machine, as in the previous machines, now in commercial use, while one body is being cast, the mold blade is locked or held in its adjusted position. While the molten metal is being injected into the mold and the cast body is being ejected, the parts of the machine which effect the dimensioning of the mold blade are not required to hold the mold blade in position and the mechanism is so arranged that these parts of the machine are being positioned to dimension the mold for casting the succeeding type or body. This timing of the parts results in a more satisfactory and economical operation, but for the present purposes may be disregarded and with this understanding a brief description of the parts and their operation is as follows:

We will first assume that the record is in position to present the proper signals for dimensioning and casting an ordinary character body. At this time the valve 322 (Figure 35 of the drawing) is in position to close the branches 319° of the ducts 319 and consequently the air or motive fluid admitted through the perforation or signals in the record blows up the proper pins in the pin blocks 317—318, which will, as heretofore, determine the position of the pin jaws. The pin jaws are immediately brought up to the position determined by the pins in the pin blocks and, in so moving, they set the stop rack 87 (Figures 8ᵃ—25) and through the rack 85 set the cylinder 78 to a position where the proper feeler pins 76 (Figure 15) may enter apertures in the cylinder and other of said feeler pins be held against movement by contact with the cylinder, so as to effect the operation of the proper selectors 72. Immediately after the cylinder 78 is positioned, the shaft 81 is operated through its connection with the lever 9 (Figure 10) in a direction to operate the levers 74 with the result that the desired selectors 72 (Figure 9) are elevated and other of said selectors left depressed. As a result of this the jaws 53ᵃ and 54ᵃ will be held or left free to move, as the case may be. One or the other of each pair of jaws is always held and the other left free to move, for it will be remembered that each selector lever 70, when in one position, holds its latch 53ᵇ up in locking position and when moved to the other position it releases the latch and itself engages and locks the other jaw 54ᵃ. The jaw tongs now begin their operation to position the selected wedge or wedges and to return previously operated but undesired wedges to normal position. If wedges previously operated are to be used again, they remain in their operated position, or if previously moved part of a normal movement, as in setting for justification, their movement will be completed by the jaws. The tongs are operated through their connections 61, 62 with the shaft 64. The shaft 64 is operated through the link 66 and arm 67 on the ordinary tongs lever 68 (Figure 26). The effect of the connection described is to operate the tong levers and wedges at the same time that the matrix tongs are being operated to position the die case and desired matrix over the mold, and hence the dimensioning mechanism is set and the matrix brought to position simultaneously. Those wedges not advanced by the jaws 54ᵃ are returned to normal position by the jaws 53ᵃ and consequently the abutment 43 will be positioned with relation to the abutment 44. To prevent the wedges from moving after they are positioned, they are now clamped by the clamp 51, the motor piston of which is set in action by motive fluid admitted from the valve 349 which latter is operated through the engagement of lever 352 (Figure 2) operated at the proper time from its cam on the shaft 29ᵃ. The dimension determined by the operation of the wedges (disregarding for the present the action of the secondary dimensioning devices) is now transferred to the mold blade abutment by allowing the transfer wedges 237—238 to come to their seats in the manner heretofore described, through the action of the lever 257, bell crank levers 252, 256 and weight 263, Figure 27.

When the mold blade returns after ejecting a previously cast type it is arrested by the abutment and locked through the usual means ready to cast the next body.

As soon as the wedges have been positioned and locked or clamped the tong levers 53, 54 begin their return movement, leaving the wedges in position, and the record is fed or advanced to bring signals into position for the next body to be cast, and as before explained, during the casting and ejecting of the body, the dimensions of which have been determined; the cycle of operations for dimensioning the next succeeding body takes place.

It may be here remarked that the parts are so proportioned that should no dimensioning wedges be operated the mold blade abutment will be positioned for casting a body having a dimension of four units, this, of course, being an arbitrary matter, but is conveniently embodied in the present machine, inasmuch as a four unit body is as small as practice has shown to be necessary in composition work, and, of course, the wedges are proportioned to increase this minimum dimension proportionately.

In order to explain a concrete example of the operation of the machine during the preliminary revolution when the parts are set for designating the wedges to be used whenever a justification body is to be cast and for limiting the movement of the wedges in accordance with the number of such justification bodies in the line, we will assume that a line is to be cast in which there are nine units of shortage to be absorbed and that line contains four spaces.

By reference to Figure 35 it will be seen that the cross girt 314 having the opening therein with which the signals in the record register is provided with openings which, for purposes of identification, are lettered and numbered as follows:

Beginning with the perforation marked "A" at about the center of the cross girt, those openings toward the left are marked successively, B, C, galley trip, D, E, space, F, G, etc.

To the right of the opening marked A, the openings are marked successively, 1ª to and including 14ª, and the end opening is marked "Pump lock" and "Jus.".

The three openings marked "Space," "Galley trip" and "Pump lock" communicate, respectively, with the motor pistons 157, 157ª and 157ᵇ, which motor pistons perform the functions heretofore ascribed to them, and referred to particularly in connection with the description of the mechanism shown in Figure 25, the space motor piston 157 operating to effect the movement of the lever 151 and through the connection 149 serving to transfer the control from the primary to the secondary selecting means, by shifting the levers 74 from the position shown in Figure 9 to the position shown in Figure 10.

The signals in the record for setting the parts for absorbing nine units of shortage in four spaces will register with the openings 3ª and 6ª; 9ª and 10ª also with the galley trip opening, also with the pump lock jus. opening at the right hand end of the cross girt.

Inasmuch as the pump lock motor piston is operated at this time, no cast can be made, and consequently the blowing up of pins in the pin blocks 317, 318 is of no consequence, because the position of the die case is immaterial, and may be disregarded although, as will be apparent to those skilled in the art, the branches leading to the pin blocks might, at this time, be closed, if so desired. The effects of the motive fluid admitted to the openings referred to are as follows:

Motive fluid admitted through the pump lock jus. opening, besides locking the pump, causes the operation of the relay 325 against the tension of a spring or normal pressure tending to hold the relay valve in one position, and when the relay valve is operated, pressure is admitted from the constant supply 326 through the duct 324 to the motor cylinder 323 of the valve 322, thereby shifting the valve 322 so as to open the branches 319ᶜ, thereby putting the openings in the cross girt into communication with other parts of the mechanism, as before explained. In addition to admitting pressure to the motor cylinder 323 for operating the valve 322 pressure is admitted from the relay through the pipe 327, thereby operating the motor piston 114 in the block 100 to permit the link 110 to engage with the restoring mechanism of the secondary selectors. When the link 110 engages with this restoring mechanism the restoring mechanism will be operated from the cam shaft to push all of the secondary selectors back to their initial or normal positions. At the same time pressure admitted through the valve 322 from the openings 3ª and 6ª will blow up or operate motor pistons 99 for moving the corresponding secondary selectors to thereby set them and designate the first and fourth wedges as the wedges to be operated or selected whenever a signal for a justification space is thereafter presented, as will be presently described. The restoring operation overcomes the pressure exerted through the motor pistons 99, but the motor pistons 99 continue to exert their pressure, and as the restoring mechanism returns to normal position the desired secondary selectors are moved to their operated positions so that the final result is to leave the secondary selectors set for the selection of the proper wedges when operated.

The duct 327 which admits pressure to the motor piston 114, as before explained, has other branches 327ª, 327ᵇ. The branch 327ª leads to the motor piston 308 which constitutes a part of the restoring mechanism for the operating devices of the stepped stop abutment 131. When this motor piston 308 is operated, the catches holding the motor pistons 298, 298ª, 298ᵇ, 298ᶜ, are released through the operation of the lever 307, spring pin 305 and rock arm 309, as explained in connection with Figures 37 to 40, the restoring operation being effected by mechanical means at the proper time from the cam shaft. The parts are immediately released after the restoration, ready to be re-set by pressure admitted through the branches of the ducts 319ᶜ and valve 322. The branches are indicated at 319ᵉ and lead to the four motor pistons 298, 298ª, 298ᵇ, 298ᶜ. Inasmuch as the wedges must make only one-fourth of a full or normal movement, the abutment 131 for the stepped stop must be brought to position for arresting the stepped stop. To accomplish this the motor pistons 298 and 298ª are operated by pressure from openings 9ª and 10ª admitted through valve 322 and ducts 319ᵉ to position the abutment for arresting the stepped stop in the thirteenth position in accord with the four spaces in the line (see Figure 22).

Following the operation of the motor pistons 298, 298ª for determining the travel of the abutment 131, air is admitted to the motor cylinder 132 for operating the abutment 131 through the following connections. The duct 327 has another branch 327ᵇ which admits pressure to the motor piston 202, and the latter, when operated, depresses the link 183 (Figure 15) thereby coupling that link with the valve operating lever 178, and through the operation of the cam on the cam shaft, the valve 174 is shifted to admit pressure from the constant pressure supply through the duct 328 to the stepped-stop lock releasing piston 139. The latter, when operated, releases the lock 137 for the stepped stop 123 and at the same time serves as a valve to open communication from the constant pressure supply through the duct 133 to the motor cylinder 132, thereby advancing the stepped stop abutment 131 until it is arrested by the stop or interponent set in position by the motor pistons 298 and 298ª. After the abutment 131 has been positioned, pressure is admitted to the motor cylinder 135 directly connected with the stepped stop 123 for positioning the latter with relation to its abutment 131. The connections for admitting pressure to the motor cylinder 135 of the stepped stop are as follows:

The said cylinder 135 communicates through a duct 331 with a valve 332 which valve, when operated, will open communication from the constant pressure supply branch 326ª to the said duct 331 leading to the motor cylinder. The valve 332 is operated by the slide connection 335, and lever 336 (see Figures 35 and 6). The lever is operated from a cam on the cam shaft and timed to operate the valve for admitting pressure to the cylinder 135 after the abutment 131 has been positioned, although the stepped stop is released from its lock before that time, in order that it may be moved by the abutment 131, should the abutment have to advance for the next setting operation. The result of this arrangement is that the stepped stop is moved in one direction or the other, directly to its new position of adjustment without the necessity of returning to a normal or zero position, preliminary to such movement.

It will be noted that the stepped stop abutment 131 does not advance immediately in response to the signal in the record, but the signal effects the operation of the motor piston 202 for coupling the link 183 with the valve operating lever, when the latter is moved by its cam, so that the motor pistons or pins 298, 298ª, 298ᵇ, 298ᶜ, and the blocks set thereby have time to be set before the abutment 131 advances. The cam for operating the valve is timed to effect this delay. The delay is also necessary, when in the operation of the machine, the last previous body cast before the preliminary revolution of the machine takes place, is a justified space, inasmuch as the secondary abutment 47 must be out of the way when the stepped stop is set. This will be more apparent after the operation of the secondary abutment is understood, which operation will be described in connection with the revolution of the machine where the signal for a justification body is presented.

The stepped stop having been positioned by the admission of pressure to the motor cylinders 132, 135, as described, the valve 174 through the operation of its cam is immediately restored to normal position with the result that the stepped stop lock 137 returns to its locking position, thereby holding the stepped stop at the point to which it has been adjusted. At the same time the cylinder 132 is opened to exhaust and returns to its normal position under the influence of its springs 134.

At each revolution when a signal is presented for a justification body, (usually the space bodies in the line), pressure is admitted to the proper openings in the cross girt for positioning the die case to present a blank matrix over the mold, as is usual in the present commercial machine, and pressure is admitted through the opening in the cross girt marked "Space." This results in the operation of the motor piston 157, Figure 35, and results in the coupling of the rod 154 with the lever 151, Figure 25, which lever is then operated during the upward movement of the die case and centering pin to shift the control of the operating mechanism from the primary to the secondary selectors. By reference to Figure 15 it will be seen that in accomplishing this end the shaft 147 is rocked so as to move the levers 74 from the position shown in Figure 9 to the position shown in Figure 10, and in performing this function the rod 192 extending from an arm 193 on the rock shaft down to the link 182 is lifted and the link 182 rises under the influence of its spring 191, thereby coupling the link with the operating lever 179 for the valve 175. The cam on the cam shaft for operating the link now causes the valve to shift from the position shown in Figure 35 to the opposite extreme of its movement, thereby admitting pressure to the motor cylinder 142 and opening the motor cylinder 141 to exhaust, so that the secondary abutment 47 is brought up against the proper step of the stepped stop to arrest the wedges when they have advanced a distance equal to one-fourth of their full or normal movement. The wedges are clamped in this position and the operations completing the cycle proceed as heretofore described in connection with ordinary non-justification or character bodies. The return of the valve 175 to the position shown in Figure 35 restores the secondary abutment 47 to its normal position and the machine is ready for another cycle of operations which may be either the making of another character body, another justification body or a preliminary revolution for resetting the parts for a new line of composition.

In referring to the operation of the valve 175 in its effect on the motor cylinders 141, 142, the action of the relay valve 343 has been disregarded, inasmuch as the latter is employed simply to enable a sufficient supply of air to be furnished for holding the secondary abutment 47 without the necessity of employing a large valve 175.

The movement of the pistons in the motor cylinders 141, 142 is transferred to the secondary abutment or stop 47 through the intermediate gear wheel 144 and racks 118 and 143 which have been hereinbefore fully described.

In referring to the part 122—122ª as the stepped stop, it will be understood that such name has been adapted as a convenient designation suggested by the preferred form of the device, but it is obvious that its functions may be performed by many kinds of stop devices which may be positioned in accordance with space number signals in the record to arrest the movement of the wedges at points corresponding to the total shortage in the line divided by the number of spaces, and hence by the use of said name it is not intended to limit the invention to a construction in which the stop has stop surfaces arranged in the form of steps.

What is claimed is:—

1. In a pattern controlled composing machine, the combination with a pattern controlled operating mechanism, a type body dimensioning mechanism, means whereby the said dimensioning mechanism is made responsive to character body signals and also to space, number and line deficiency signals of the pattern, and means whereby when responsive to space, number and line deficiency signals, said body dimensioning mechanism apportions the line deficiency among the several bodies to effect justification of the line.

2. In a pattern controlled composing machine for producing justified lines of type, a mold adjusting or dimensioning mechanism embodying dimensioning means responsive to character body signals of the pattern to form bodies of desired set sizes for the characters indicated, and means responsive to space, number and line deficiency signals of the pattern co-operating with said dimensioning means to modify the operation of the same to form space bodies each of a size equal to the line shortage or deficiency divided by the number of spaces in which the shortage is to be absorbed, and means responsive to space signals for effecting the modified operation of the dimensioning means.

3. A pattern controlled composing machine for producing justified lines, provided with mold adjusting or dimensioning mechanism embodying a common means for dimensioning the mold to form type bodies of desired predetermined sizes and also to apportion or distribute the line shortage or deficiency equally among the justification spaces, means responsive to character signals in the pattern for controlling the operation of the dimensioning mechanism in forming character bodies, means responsive to space signals in the pattern for controlling the operation of the same in forming space bodies, and means responsive to space, number and deficiency signals in the pattern for governing the operation of the same to apportion the shortage among the bodies in which the shortage is to be absorbed.

4. In a pattern controlled composing machine for producing justified lines of type, a mold adjusting or dimensioning mechanism embodying dimensioning means movable a uniform normal predetermined distance to produce bodies of predetermined sizes and means for limiting such movement to predetermined fractional parts of the normal uniform movement to produce justifying space bodies each of a size equal to the line deficiency divided by the number of spaces in which the shortage is to be absorbed.

5. In a pattern controlled composing machine, an automatic shortage distributing or apportioning mechanism controlled by pattern signals designating the number of justifying spaces and amount of line shortage to be absorbed by justification, embodying means selectively controlled by the shortage signals or designations representing the total shortage and means under the control of the space number signals or designations for controlling the movement of the first mentioned means different distances in accord with the number of justification spaces in which the shortage is to be absorbed.

6. In a composing machine, mechanism for positioning an abutment to determine the body size of type and spaces, embodying a plurality of movable members having faces inclined different degrees to the direction of movement of the members to conform singly or in groups to body sizes from the smallest to the largest in increments of a unit of measure common to the various body sizes, means for selectively operating such of said members as conform to the number of units desired in the body size, and means for moving the selected members a predetermined distance to position the abutment.

7. In a composing machine, mechanism for positioning an abutment to determine the body sizes of type and spaces to produce a justified line embodying a plurality of movable members, means for selectively moving said members a normal distance to position the abutment for producing type bodies of predetermined size measured in units, and means for moving said members predetermined fractional parts of the normal movement for positioning the abutment to form space bodies of a definite size, equal to the quotient of the line shortage divided by the number of spaces, the completed bodies of the spaces thus formed being of exactly the correct size to absorb the line shortage.

8. In a composing machine, a dimensioning mechanism embodying a series of wedges of differing inclinations and arranged to operate in selected series, means responsive to signals in a record for selecting and operating any wedges in the series, and means for arresting the movement of the operated wedges when a predetermined range of movement has been effected.

9. In a composing machine, a dimensioning mechanism embodying a series of wedges of differing inclination arranged in sequence to operate singly or in selected series, means responsive to signals in the record for selecting and operating any wedge or plurality of wedges in the series, and means for arresting the movement of the operated wedge or wedges when a predetermined range of movement has taken place.

10. In a composing machine, a dimensioning mechanism embodying a series of wedges arranged to operate in selected series, means responsive to signals in a record for selecting and operating the desired wedges of the series, and for simultaneously returning to normal position other previously operated wedges of the series, and means for arresting the movement of the operating wedges when a predetermined range of movement has been effected.

11. In a composing machine, a dimensioning mechanism embodying a series of wedges and an operating mechanism therefor responsive to signals in a record and embodying oppositely movable members for each wedge and means for locking one or the other of said members out of operation.

12. In a composing machine, a dimensioning mechanism embodying a series of wedges, and an operating mechanism for said wedges responsive to signals in a record and embodying oppositely movable members for advancing and retracting the wedges respectively, a locking mechanism co-operating with said oppositely movable members and operating to lock one or the other out of operation, and means for arresting the movement of the operated wedges when a predetermined range of movement has been effected.

13. In a composing machine, a dimensioning mechanism embodying a series of wedges, a corresponding series of oppositely movable wedge operating members, a locking mechanism co-operating with each pair of oppositely movable operating members to lock one or the other out of operation, and mechanism responsive to signals in the record to control the position of the respective locking mechanisms whereby the desired wedges may be advanced and other previously operated wedges retracted.

14. In a composing machine, a dimensioning mechanism embodying a series of wedges movable both longitudinally and laterally, a longitudinally movable carriage in which each wedge is mounted, means co-operating with said carriage for advancing and retracting the wedge, and means for locking the carriages in adjusted position for holding the wedges against longitudinal movement.

15. In a composing machine, a dimensioning mechanism embodying a series of wedges movable longitudinally and laterally, a corresponding series of longitudinally movable carriages in which the wedges are mounted to move laterally, means for advancing and retracting the carriages with their wedges to position the wedges for effecting the desired dimensioning results, and means for clamping the carriages in their adjusted position for holding the wedges against longitudinal movement while subjected to dimensioning pressure.

16. In a composing machine, a dimensioning mechanism embodying a series of wedges, a corresponding series of pairs of wedge operating jaws, movable in opposite directions for advancing and retracting the wedges, tong levers pivotally connected with the jaws, spring connections intermediate the levers whereby either jaw of each pair may be locked against operation, and means for locking one or the other of the jaws of each pair, whereby but one jaw of a pair will be advanced for moving its wedge at each operation.

17. In a composing machine, a dimensioning mechanism embodying a series of longitudinally and laterally movable wedges, oppositely movable jaws for each wedge for advancing and retracting the same, and means for operating said jaws embodying tong levers pivotally connected with the jaws and mounted on axes intermediate their ends, springs interposed between the ends of the tong levers opposite the jaws, and means for advancing the pivotal axes of one of the levers of each pair, whereby either jaw may be advanced when the other is held against movement.

18. In a composing machine, a dimensioning mechanism embodying a series of wedges mounted to move longitudinally and laterally, and an operating mechanism for said wedges embodying a pair of oppositely movable jaws for each wedge, a pair of tong levers pivotally connected with the respective jaws at one end, with a spring connection interposed between said levers at the opposite end, means for advancing the axial support of one lever of each pair, whereby pressure will be exerted on both jaws tending to advance the same, and locking mechanism co-operating with the jaws for holding one or the other of said jaws out of operation.

19. In a composing machine, a dimensioning mechanism embodying a series of wedges, a longitudinally movable carriage for each wedge, oppositely movable jaws for moving each carriage longitudinally in one direction or the other, guiding ways supporting said carriages and jaws respectively, operating mechanism for said jaws embodying tong levers pivotally connected with the jaws at one end with springs interposed between said levers at the opposite end, operating mechanism for advancing the axial support of one of the levers of each pair, whereby pressure will be exerted, tending to advance the jaws in opposite directions, and locking mechanism cooperating with either but not both jaws of a pair, whereby either jaw may be locked out of operation, and any desired wedge advanced or retracted.

20. In a composing machine, a dimensioning mechanism embodying a series of wedges, a corresponding series of wedge carriages in which the wedges are mounted to move laterally, for dimensioning adjustment, a series of pairs of oppositely movable jaws, one pair for each carriage, with means for advancing said jaws to move the carriages and wedges in one direction or the other, and a transversely acting clamp co-operating with the carriages for holding the same against longitudinal movement when in adjusted position.

21. In a pattern controlled composing machine, the combination of the following instrumentalities, to-wit, a single adjusting means for determining the dimensions of all bodies both normal and justification or variable size bodies, two means controlling the setting of the adjusting means and responsive one to normal body signals and the other to line shortage and space number signals in the controller, and means responsive to justification body signals for transferring the control from one controlling means to the other.

22. In a pattern controlled composing machine, the combination of the following instrumentalities, to-wit, a single adjusting means for determining the dimensions of all bodies both normal and justification or variable size bodies, a means controlling the setting of the adjusting means responsive to normal body signals, a second means also controlling the setting of the adjusting means responsive to line shortage and space number signals, and means responsive to space signals for transferring the control of the adjusting means from the first mentioned controlling means to the second to dimension justification bodies.

23. A pattern controlled composing machine for producing justified lines embodying mold dimensioning mechanism having a common means for dimensioning the mold to form bodies of desired predetermined sizes, also to form bodies of variable size for justification, also to apportion or distribute the line shortage or deficiency equally among the justification spaces, means responsive to normal signals for type bodies of predetermined sizes controlling the setting of the dimensioning means, a second means responsive to line shortage and space number signals, also controlling the setting of the dimensioning mechanism, and means responsive to space signals for transferring the control of the dimensioning mechanism from one of said controlling means to the other.

24. In a composing machine, mechanism for positioning an abutment to determine the body sizes of type and spaces to produce a justified line, embodying a plurality of movable members, means for selectively moving said members a normal distance to position the abutment for producing type bodies of predetermind size measured in units, and means for moving said members a predetermined fractional part of the normal movement which is inversely proportioned to the number of spaces in which the line shortage or deficiency is to be absorbed to form space bodies of a definite size equal to the quotient of the line shortage divided by the number of spaces, the completed bodies of the space thus formed being of exactly the correct size to absorb the line shortage.

25. In a composing machine, mechanism for positioning an abutment to determine the body sizes of type and spaces to produce a justified line, embodying a plurality of movable members, means for selectively moving said members a normal distance to position the abutment for producing type bodies of predetermined size measured in units, and means responsive to line shortage and space number signals for arresting the movement of said members at points which are inversely proportioned to the number of spaces in which the line shortage or deficiency is to be absorbed, whereby the abutment will be positioned to form space bodies of a definite size equal to the quotient of the line shortage divided by the number of spaces, the completed bodies of the spaces thus formed being of exactly the correct size to absorb the line shortage.

26. In a composing machine, mechanism for positioning an abutment to determine the body sizes of type and spaces to produce a justified line embodying a plurality of movable members, means for selectively moving said members a normal distance to position the abutment for producing type bodies of predetermined size measured in units, and a stepped stop responsive to space number signals in the record for arresting the movement of said members at a point which is inversely proportioned to the number of spaces in which the line shortage is to be absorbed, whereby the abutment will be positioned to produce space bodies of a size equal to the quotient of the line shortage divided by the number of spaces.

27. In a composing machine, a dimensioning mechanism embodying a series of wedges arranged to be operated in selected series, means responsive to signals in the record for selecting and operating any wedges in the series, and a stepped stop responsive to space number signals in the record for arresting the movement of the operated wedges at a point which is inversely proportioned to the number of spaces in which the line shortage or deficiency is to be absorbed.

28. In a composing machine a dimensioning mechanism embodying a series of wedges arranged to be operated in selected series, means responsive to signals in the record for selecting and operating any wedges in the series, and a stop for arresting the movement of said wedges for the production of justification bodies, said stop having operative faces for arresting the wedges at a point for the production of two spaces which is one half of their normal movement for the production of three spaces at a point which is one third of their normal movement and so on in accord with the number of spaces in the line.

29. In a composing machine, a dimensioning mechanism embodying a series of wedges of differing inclination and arranged to be operated in selected series, means responsive to signals in the record for selecting and operating any wedges in the series, and a stepped stop responsive to space number signals in the record and having its stop surfaces positioned to arrest the movement of the wedges at points which are fractional parts of their normal movement equal to the normal movement divided by the number of spaces.

30. In a composing machine, a dimensioning mechanism embodying a series of wedges of differing inclinations and arranged to be operated in selected series, means responsive to signals in the record for selecting and operating any wedges in the series, a stepped stop responsive to space number signals in the record and having its stop surfaces positioned to arrest the movement of the wedges at points which are fractional parts of their normal movement equal to the normal movement divided by the number of spaces to dimension justification bodies which will absorb the line shortage without remainder.

31. In a composing machine, a dimensioning mechanism embodying a series of wedges for determining the dimensions of all bodies, both normal and justification or variable size bodies, primary and secondary selecting means for selecting and operating any wedge or plurality of wedges in the series, means responsive to normal body signals for rendering effective one of said selecting means, and means responsive to justification body signals for rendering effective the other of said selecting means, whereby proper wedges of the series will be rendered effective for dimensioning both normal and justification bodies in the line.

32. In a composing machine, a dimensioning mechanism embodying a series of wedges for determining the dimensions of all bodies, both normal and justification or variable size bodies, a primary selecting mechanism responsive to normal body signals in the record for selecting the wedges to determine the dimension of normal bodies, and a secondary selecting means responsive to line shortage and justification body signals in the record for selecting the wedges to be operated in the formation of justification bodies.

33. In a composing machine, a dimensioning mechanism embodying a series of wedges arranged in sequence to be operated singly or in selected series, primary and secondary selecting means for determining the wedges to be operated, and means responsive to justification body signals in the record for determining which of said selecting means shall perform its selecting function.

34. In a composing machine, a dimensioning mechanism embodying a series of wedges arranged in sequence to be operated singly or in selected series, primary and secondary selecting means for determining which of said wedges shall be operated in the production of normal and justification bodies respectively, operating mechanism for said selecting means, and means responsive to justification body signals in the record for shifting said operating mechanism from a position in which it will co-operate with one of said selecting means into a position in which it will co-operate with the other of said selecting means.

35. In a composing machine, a dimensioning mechanism embodying a series of wedges arranged in sequence to be operated singly or in selected series, primary and secondary selecting means for determining the wedges to be operated, means responsive to line shortage signals in the record for setting the secondary selecting means, an operating mechanism for the selecting means, and means responsive to justification body signals for transferring the control of said operating mechanism from the primary to the secondary selecting means.

36. In a composing machine, a dimensioning mechanism embodying a series of wedges arranged in sequence to be operated singly or in selected series, primary and secondary selecting means for determining the wedges to be operated, means responsive to line shortage signals in the record for setting the secondary selecting means to select the desired wedges when operated and operating mechanism for the selecting means responsive to signals in the record.

37. In a composing machine, a dimensioning mechanism embodying a series of wedges arranged in sequence to be operated singly or in selected series, primary and secondary selecting means for determining the wedges to be operated, means responsive to line shortage signals in the record for setting the secondary selecting means to select the desired wedges when operated, an operating mechanism for the selecting means, and means responsive to justification body signals for transferring the control of said operating mechanism from the primary to the secondary selecting means.

38. In a composing machine, a dimensioning mechanism embodying a series of wedges arranged in sequence to be operated singly or in selected series, selecting means for determining which of the wedges shall be operated, and movable into or out of operative position responsive to line shortage signals in the record, and operating mechanism co-operating with the selecting means in operative position and responsive to justification body signals in the record.

39. In a composing machine, a dimensioning mechanism embodying a series of wedges arranged in sequence to be operated singly or in selected series, a pair of operating members for each wedge movable respectively in opposite directions to advance or retract the wedges, selecting mechanism normally co-operating with one of the operating members of each pair to prevent its movement, and means responsive to signals in the record for transferring the engagement of the selecting mechanism from one operating member to the other of the pair.

40. In a composing machine, a dimensioning mechanism embodying a series of wedges arranged in sequence to be operated singly or in selected series, a pair of operating members for each wedge movable respectively in opposite directions to advance or retract the wedges, a primary selecting mechanism normally co-operating with one of the operating members of each pair, a secondary selecting mechanism co-operating with the primary selecting mechanism in the selection of desired wedges, means responsive to signals in the record for moving the primary selecting mechanism to transfer the engagement from one operating member to the other of the pair, and means for shifting the control from the primary to the secondary selecting mechanism.

41. In a composing machine, a dimensioning mechanism embodying a series of wedges arranged in sequence to be operated singly or in selected series, and selecting means for the wedges embodying a series of motors responsive to signals in the record for determining which of the wedges shall be operated.

42. In a composing machine, a dimensioning mechanism embodying a series of wedges arranged in sequence to be operated singly or in selected series and selecting mechanism for the wedges embodying a series of motors, one for each wedge, said motors being responsive to signals in the record and an operating mechanism for the selected wedges.

43. In a composing machine, a dimensioning mechanism embodying a series of wedges arranged in sequence to be operated singly or in selected series, a selecting mechanism for the wedges embodying a series of motors, one for each wedge, said motors being responsive to line shortage signals in the record, and an operating mechanism for the selected wedges responsive to justification body signals in the record.

44. In a composing machine, a dimensioning mechanism embodying wedges and operating mechanism for the wedges embodying a series of pairs of tong levers co-operating at one end with the wedges and yieldingly connected at the opposite end whereby the movement of either lever of the pair at the wedge operating end may be arrested, operating means co-operating with one of the levers of each pair at a point intermediate the ends, and means for arresting the movement of the wedges at predetermined points.

45. In a composing machine, a dimensioning mechanism embodying a series of wedges, and wedge operating mechanism embodying a series of pairs of tong levers co-operating at one end with the wedges and yieldingly connected at the opposite end, whereby the movement of either lever of a pair at the wedge operating end may be arrested, operating means co-operating with one of the levers of each pair, at a point intermediate the ends, and means responsive to signals in the record, for arresting the movement of the wedges at predetermined points intermediate the extremes of wedge movement.

46. In a composing machine, a dimensioning mechanism embodying a series of wedges and operating mechanism for the wedges embodying a series of pairs of tong levers co-operating at one end with the wedges and yieldingly connected together at the opposite end whereby either lever may be held against movement at the wedge operating end and means responsive to signals in the record for locking either one or the other of the levers against effective movement at the wedge operating end.

47. In a composing machine, a dimensioning mechanism embodying a series of wedges with means for selectively operating the wedges and means for arresting the movement of the wedges embodying a series of stops, means responsive to signals in the record for designating the stop to arrest the movement of the wedges, and means responsive to a signal in the record for rendering said stop effective to arrest the movement of the wedges.

48. In a composing machine, a dimensioning mechanism embodying a series of wedges, operating mechanism therefor, and a series of stops for arresting the movement of the wedges, with means responsive to signals in the record for designating the stop to be effective in arresting such movement, and means responsive to justification body signals in the record for rendering said stop effective, whereby the stop to become effective may be designated preliminary to the composition of a line and rendered effective for dimensioning each justification body in the line of composition.

49. In a composing machine, a dimensioning mechanism embodying a series of wedges, operating mechanism for the wedges and means for arresting the movement of the wedges embodying a series of stops, means responsive to signals in the record for designating the stop of the series to become effective during the composition of a line, a secondary stop positioned by the series of stops, and motor mechanism responsive to signals in the record for bringing said secondary stop into operative position for being positioned by the designated stop and in turn arresting the movement of the wedges.

50. In a composing machine, a dimensioning mechanism embodying a series of wedges, operating mechanism therefor, a stepped stop, mechanism responsive to signals in the record for setting said stepped stop, a secondary stop positioned by the stepped stop and in turn serving to arrest the movement of the wedges, and motor mechanism responsive to signals in the record for setting the secondary stop.

51. In a composing machine, a dimensioning mechanism embodying a series of wedges, operating mechanism therefor and mechanism for arresting the movement of the wedges embodying a stepped stop, motor mechanism responsive to signals in the record for setting the stepped stop, in accordance with the number of justification bodies in a line of composition, a secondary stop adapted to be positioned by the stepped stop and in turn to arrest the movement of the wedges, and motor mechanism responsive to justification body signals in the record for moving the secondary stop to the position determined by the stepped stop and into position to arrest the movement of the wedges.

52. In a composing machine, a dimensioning mechanism embodying a series of wedges, operating mechanism therefor, and mechanism for arresting movement of the wedges embodying a stepped stop having stepped surfaces proportioned to arrest, when brought to position, the movement of the wedges when the latter have completed one-half of their normal movement, one-third of their normal movement, or one-fourth of their normal movement, etc., in accordance with the number of justification bodies in a line of composition, motor mechanism for positioning the stepped stop in response to justification body number signals in the record, a secondary stop, motor mechanism responsive to justification body signals in the record, for bringing said secondary stop into the position determined by the stepped stop and into position for arresting the movement of the wedges.

53. In a composing machine, a dimensioning mechanism embodying a series of wedges, operating mechanism for the wedges, a stepped stop for determining the movement of the wedges in dimensioning justification bodies, a lock for the stepped stop, motor mechanism responsive to signals in the record for positioning the stepped stop, motor mechanism for operating the lock, and means whereby the lock operating mechanism controls the motor mechanism for positioning the stepped stop.

54. A typographic composing machine, embodying a primary mold dimensioning mechanism, an adjustable mold controlled by the said primary dimensioning mechanism and a secondary dimensioning mechanism interposed between the primary dimensioning mechanisms and mold embodying means for proportionately varying the effect of one upon the other.

55. A pattern controlled composing machine for producing justified lines, provided with a primary mold dimensioning mechanism responsive to signals in the record, an adjustable mold dimensioned through the instrumentality of the primary dimensioning means, and a secondary dimensioning means embodying means for proportionately varying the motion transmitted from the primary dimensioning means to the mold.

56. A pattern controlled composing machine for producing justified lines, provided with a primary mold dimensioning mechanism responsive to signals in the record, an adjustable mold dimensioned through the instrumentality of the primary dimensioning means, and a secondary dimensioning means interposed between the primary dimensioning means and mold embodying means for proportionately varying the motion transmitted from one to the other.

57. A pattern controlled composing machine for producing justified lines, provided with primary mold dimensioning mechanism, and adjustable mold controlled by the primary dimensioning mechanism, and a secondary dimensioning mechanism interposed between the primary dimensioning mechanism and mold embodying a lever with means for varying the effective ratio of the lever, whereby the movement transmitted from the primary dimensioning means to the mold may be varied.

58. A pattern controlled composing machine for producing justified lines of type, embodying the following instrumentalities, to-wit, a primary mold dimensioning mechanism responsive to signals in a pattern to produce bodies of various sizes in accord with the width of the character, an adjustable mold controlled by the primary dimensioning mechanism, and a secondary mold dimensioning mechanism interposed between the primary dimensioning mechanism and mold and having adjustable means for proportionately varying the effect of the primary dimensioning means.

59. A mechanism for dimensioning a type mold embodying a lever having a face in a single plane and three bearings constituting the axes for the load power and fulcrum of the lever respectively, each bearing being formed by a segment having a plane face, the plane faces of two of said bearings co-operating with the face of the lever, whereby the axes of said bearings are located in a single plane.

60. A mechanism for dimensioning a type mold embodying a lever having three bearings constituting the axes for the load, power and fulcrum of the lever, respectively, each bearing being formed by a segment having a plane face and two of said segmental bearings co-operating with the other, the axes of all being located in a single plane.

61. A mechanism for dimensioning a type mold embodying a lever having three bearings constituting the axes for the load, power and fulcrum of the lever, respectively, each bearing being formed by a segment having a plane face, two of said bearings co-operating with the other, and means for effecting relative adjustment between one of said bearings and the other two in a direction longitudinally of the lever, whereby the effective proportions of the lever may be varied.

62. A mechanism for dimensioning a type mold embodying relatively movable abutments and a pair of oppositely arranged independently adjustable levers interposed between said abutments, one of said levers having its axes arranged to form a lever of the second order and the other of said levers having its axes arranged to form a lever of the third order, whereby the dimensioning effect due to the relative movement of the abutments may be either diminished or increased.

63. A mechanism for dimensioning a type mold embodying a primary dimensioning mechanism and a secondary dimensioning mechanism interposed between the primary dimensioning mechanism and mold, said secondary dimensioning mechanism embodying a lever and co-operating bearings having plane surfaces facing in diametrically opposite directions and constituting the axes for the load, power and fulcrum of the lever, respectively, and means for effecting a relative adjustment between the bearings, whereby the effective proportions of the lever may be changed.

64. A mechanism for dimensioning a type mold embodying three bearings constituting the axes for the load, power and fulcrum, respectively, of a lever, each of said bearings being formed by a segment having a plane face, and one of said segments having a diameter greater than the distance between the other two segments, with means for adjusting the relation between the axis formed by the segment of greater diameter and the axes formed by the segments of lesser diameter, whereby the effective leverage may be changed.

65. A mechanism for dimensioning a type mold embodying a primary dimensioning mechanism, a secondary dimensioning mechanism interposed between the primary dimensioning mechanism and mold, motor mechanism responsive to signals in the record for setting the secondary mechanism independently of the primary dimensioning mechanism, and manually operable adjusting mechanism for determining the position to which the motor mechanism may set the secondary dimensioning mechanism.

66. A mechanism for dimensioning a type mold embodying a primary dimensioning mechanism, a secondary dimensioning mechanism interposed between the primary dimensioning mechanism and mold, opposed motor cylinders and pistons controlling the secondary dimensioning mechanism, a valve responsive to signals in the record controlling the supply of motive fluid to said cylinders, and a reversing valve intermediate said first mentioned valve and motor cylinders, whereby the secondary dimensioning mechanism may be normally held under the control of either motor piston and automatically shifted to the control of the other motor piston.

67. In a type casting machine, the combination with an adjustable mold and a mold dimensioning mechanism, of a dimension transferring mechanism intermediate the mold and dimensioning mechanism, embodying two pairs of wedges operatively connected together, whereby the relative position of one pair determines the relative position of the other pair, and means whereby the dimensioning mechanism determines the relative position of one pair, and the dimension of the mold is determined by the other pair of wedges.

68. In a type casting machine, the combination with an adjustable mold and a mold dimensioning mechanism, of a dimension transferring mechanism intermediate the mold and dimensioning mechanism embodying a plurality of co-operating wedges, means for seating the wedges, and means for effecting a recession of one wedge and the advance of the co-operating wedge at a velocity substantially coinciding with the velocity of the receding wedge.

69. In a type casting machine, a dimension transferring mechanism for determining the dimension of the mold embodying co-operating wedges having a relative movement to seat against each other, means for effecting the preliminary advance of one of said wedges to its seat against the other wedge, whereby its momentum is dissipated, means for thereafter imparting a motion of recession to one of the wedges, and yielding means for advancing the other wedge substantially in unison with the recession of the first-mentioned wedge.

70. A dimension transferring mechanism embodying a plurality of co-operating wedges, means for preliminarily effecting movement of the wedges to seat the same and overcome momentum, and means for thereafter effecting a recession of one wedge and reseating under uniform pressure to nullify the effect of variations in momentum.

71. A dimension transferring mechanism embodying a plurality of co-operating wedges, means for seating the wedges and means for effecting a recession of one wedge and the advance of the co-operating wedge at substantially the velocity of the receding wedge.

72. A dimension transferring mechanism embodying co-operating wedges movable relatively in opposite directions to seat against each other, means for effecting the advance of one of said wedges to its seat against the other wedge, means for imparting a motion of recession to said other wedge and means for advancing the seating wedge substantially in unison with said movement of recession whereby the velocity of the wedges is made substantially the same.

73. A dimension transferring mechanism embodying co-operating wedges having a relative movement to seat against each other, means for effecting the preliminary advance of one of said wedges to its seat against the other wedge, whereby its momentum is dissipated, means for thereafter imparting a motion of recession to one of the wedges, and means for advancing the other wedge under a uniform pressure and at a velocity substantially equal to the movement of recession.

74. A pattern controlled composing machine embodying motor operated mechanism controlling the setting of parts in position to perform their functions in the operation of the machine, a valve controlling the motive fluid supply to the motor actuated setting mechanism and a motor responsive to signals in the record for operating said valve and through said valve the motor actuated setting mechanism.

75. A pattern controlled composing machine embodying pneumatic motor operated mechanism controlling the setting of parts in position to perform their functions in the operation of the machine, a valve for opening and closing the duct supplying pneumatic pressure to said motor operated mechanism and a pneumatic motor responsive to signals in the record for operating said valve and through said valve controlling the motor actuated setting mechanism.

76. A pattern controlled composing machine embodying a plurality of motor operated mechanisms controlling the setting of parts to perform their functions in the operation of the machine, a valve having a plurality of ports therein controlling the supply of motive fluid to the respective motor operated setting mechanisms, and a motor responsive to a signal in the record for operating said valve.

77. A pattern controlled composing machine embodying the following instrumentalities, to-wit, mechanism responsive to signals in the record for positioning the matrix, mechansm responsive to signals in the record for dimensioning the mold cavity, and a valve responsive to a signal in the record and controlling the connections through which the mold dimensioning mechanism is made responsive to its signals whereby signals in the same relative location in the body of the record may control both the matrix positioning and mold dimensioning functions of the machine.

78. A pattern controlled composing machine embodying the following instrumentalities, to-wit, two independent mechanisms responsive to signals in the same location with relation to the body of the record strip for controlling successive functions in the machine, and a valve responsive to a signal in the record strip and controlling the connections through which one of said mechanisms is rendered responsive to its signals whereby said mechanism may through the operation of the valve be made non-responsive to said signals.

79. A pattern controlled composing machine embodying a series of pneumatic motor operated mechanisms controlling the setting of parts to perform their functions in the operation of the machine, a valve having a series of ports controlling the supply of pneumatic pressure to the said motor operated mechanisms, a pneumatic motor mechanically associated with said valve for operating the same, a constant pressure supply, and a duct intermediate the pressure supply and valve operating motor having a port adapted to be opened and closed by the controlling record.

80. A pattern controlled composing machine embodying a mechanism adapted to be set in position to perform its functions in the operation of the machine, a pneumatic motor controlling the movement of the same into its set position, a lock for holding the same in its set position, a pneumatic motor for operating the lock and a valve for the setting motor controlled by the lock motor, whereby motive fluid is supplied to the setting motor only when the lock is released.

81. In a composing machine, a mold dimensioning mechanism embodying a series of independently movable dimensioning members adapted to co-operate in performing the dimensioning function, means for designating the members for dimensioning a type body of the desired size, and means for simultaneously moving the designated members into dimensioning position.

82. In a composing machine, the combination with a mold, and a matrix case movable in two directions to center any one of a series of matrices carried thereby over the mold, of a mold dimensioning mechanism embodying a plurality of independently movable dimensioning members adapted to cooperate in performing the dimensioning function, means movable in accord with the matrix case movement for selectively designating the dimensioning members for a type body for the matrix centered over the mold, and means for moving the selectively designated members into operative position to dimension the mold.

83. A composing machine embodying a series of wedges arranged in sequence to be operated singly or in selected series, and selecting means for the wedges embodying a series of motors responsive to signals in the record for determining which of the wedges shall be operated.

84. A composing machine embodying a series of wedges arranged in sequence to be operated singly or in selected series and selecting mechanism for the wedges embodying a series of motors, one for each wedge, said motors being responsive to signals in the record and an operating mechanism for the selected wedges.

85. A composing machine embodying wedges and operating mechanism for the wedges embodying a series of pairs of tong levers co-operating at one end with the wedges and yieldingly connected at the opposite end whereby the movement of either lever of the pair at the wedge operating end may be arrested, operating means co-operating with one of the levers of each pair at a point intermediate the ends, and means for arresting the movement of the wedges at predetermined points.

86. A composing machine embodying a series of wedges, and wedge operating mechanism embodying a series of pairs of tong levers co-operating at one end with the wedges and yieldingly connected at the opposite end, whereby the movement of either lever of a pair at the wedge operating end may be arrested, operating means co-operating with one of the levers of each pair, at a point intermediate the ends, and means responsive to signals in the record, for arresting the movement of the wedges at predetermined points intermediate the extremes of wedge movement.

87. A composing machine embodying a series of wedges and operating mechanism for the wedges embodying a series of pairs of tong levers co-operating at one end with the wedges and yieldingly connected together at the opposite end whereby either lever may be held against movement at the wedge operating end and means responsive to signals in the record for locking either one of the levers against effective movement at the wedge operating end.

88. A composing machine embodying a series of wedges with means for selectively operating the wedges and means for arresting the movement of the wedges embodying a series of stops, means responsive to signals in the record for designating the stop to arrest the movement of the wedges, and means responsive to a signal in the record for rendering said stop effective to arrest the movement of the wedges.

89. A composing machine embodying a series of wedges, operating mechanism therefor, a stepped stop, mechanism responsive to signals in the record for setting said stepped stop, and a secondary stop positioned by the stepped stop and in turn serving to arrest the movement of the wedges.

90. In a type casting machine, a mold and means for dimensioning the mold to form type bodies of a predetermined set size to produce a justified line, of means for proportionately varying the action of the dimensioning mechanism to produce type bodies of a different set size to produce a justified line of a length different from that of the first mentioned line.

91. In a type casting machine, a mold and means for dimensioning the mold to form type bodies of a predetermined set size to produce a justified line, of an adjustable lever forming a part of the dimensioning mechanism to proportionately vary the action of the latter to produce type bodies of a different set size to produce a justified line of a length different from that of the first mentioned line.

92. In a type casting machine embodying a plurality of pneumatically controlled mechanisms for operating the parts to perform their functions in the operation of the machine, a multiple port valve governing through said ports the supply of motive fluid through which control of said parts is effected, and means for shifting said valve to control a different set of parts.

93. In a type casting machine embodying a plurality of pneumatically controlled mechanisms for operating the parts to perform their functions in the operation of the machine, a movable multiple port valve governing through said ports when the valve is in one position the supply of motive fluid through which control of some of said parts is effected and in another position the supply of motive fluid through which other of said parts are controlled, and means for shifting said valve to determine which of said parts shall be operated.

94. In a type casting machine embodying a plurality of pneumatically controlled mechanisms for operating the parts to perform their functions in the operation of the machine, a constant pressure air supply, and a record signal-controlled pneumatically-operated relay valve controlling the communication of said constant pressure air supply with the pneumatic control mechanism.

95. A pattern controlled composing machine provided with mold adjusting or dimensioning mechanism embodying a common means for dimensioning the mold to form type bodies and also justification space bodies, said means comprising a plurality of wedge or inclined face members, means responsive to character signals in the pattern for selecting wedges for operation in forming character bodies, means responsive to justification signals in the pattern for selecting wedges for operation in forming justification space bodies, means for operating the character selected wedges upon the presentation of a character signal and means responsive to space signals in the pattern for operating the wedges selected by the justification signal.

96. A type casting machine provided with mold adjusting or dimensioning mechanism embodying a plurality of wedge or inclined face members, means for selectively moving said members a definite, predetermined distance to produce bodies of predetermined sizes, and means for varying said distance to produce bodies of proportionally different sizes.

97. In a typographic composing machine, a means for determining the position of a part in any one of an equally spaced series of positions comprising a series of wedging members of geometrically progressively different value and less in number than the number of said positions.

98. In a typographic composing machine, a means for determining the position of a part in any one of an equally spaced series of positions, comprising a series of wedging members movable individually or in unison and having their wedging faces increasing in angularity in geometrically progressive order, and means for operating any one or more of said wedging members.

JOHN SELLERS BANCROFT.
MAURITZ C. INDAHL.